United States Patent
Ichino et al.

(10) Patent No.: US 10,131,726 B2
(45) Date of Patent: Nov. 20, 2018

(54) ETHYLENE/α-OLEFIN/NON-CONJUGATED POLYENE COPOLYMER, AND PRODUCTION PROCESS AND USE THEREOF

(71) Applicant: MITSUI CHECMICALS, INC., Tokyo (JP)

(72) Inventors: Kotaro Ichino, Ichihara (JP); Yoshiharu Kikuchi, Ichihara (JP); Yasushi Tohi, Kawasaki (JP); Tomoaki Matsugi, Kisarazu (JP); Yasushi Yanagimoto, Ichihara (JP); Mitsunao Arino, Ichihara (JP); Keisuke Shishido, Ichihara (JP); Mikio Hosoya, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 1 day.

(21) Appl. No.: 15/117,635

(22) PCT Filed: Feb. 13, 2015

(86) PCT No.: PCT/JP2015/053989
§ 371 (c)(1),
(2) Date: Aug. 9, 2016

(87) PCT Pub. No.: WO2015/122495
PCT Pub. Date: Aug. 20, 2015

(65) Prior Publication Data
US 2016/0355622 A1  Dec. 8, 2016

(30) Foreign Application Priority Data

Feb. 14, 2014 (JP) .................. 2014-026531
Mar. 19, 2014 (JP) .................. 2014-056313
Mar. 27, 2014 (JP) .................. 2014-066495
Mar. 27, 2014 (JP) .................. 2014-066496

(51) Int. Cl.
C08J 3/24 (2006.01)
C08L 9/00 (2006.01)
C08F 210/18 (2006.01)
C08F 4/6592 (2006.01)
C08K 3/34 (2006.01)
(Continued)

(52) U.S. Cl.
CPC .......... *C08F 210/18* (2013.01); *C08F 4/6592* (2013.01); *C08J 3/24* (2013.01); *C08J 3/28* (2013.01); *C08K 3/34* (2013.01); *C08K 5/098* (2013.01); *C08K 5/14* (2013.01); *C08K 5/54* (2013.01); *C08L 7/00* (2013.01); *C08L 9/00* (2013.01); *C08L 21/00* (2013.01); *C08L 23/16* (2013.01); *H01B 3/44* (2013.01);
(Continued)

(58) Field of Classification Search
CPC .... C08F 210/18; C08F 210/06; C08F 4/6592; C08F 236/20; C08F 2500/25; C08F 2500/17; C08F 2500/09; C08J 3/28; C08J 2323/16; C08J 2321/00; C08L 21/00; C08L 23/16; C08L 7/00; C08L 9/00; C08L 2203/202; C08K 5/089; C08K 5/14; C08K 5/54; H01B 3/44
See application file for complete search history.

(56) References Cited

U.S. PATENT DOCUMENTS 159,662 A    2/1875  Foss
2,823,218 A  2/1958  Speier et al.
(Continued)

FOREIGN PATENT DOCUMENTS

CN    1384140 A    12/2002
CN    1388813 A    1/2003
(Continued)

OTHER PUBLICATIONS

Patsidis et al., "The synthesis, characterization and polymerization behavior of ansa cyclopentadienyl fluorenyl complexes; the X-ray structures of the complexes [(C$_{13}$H$_8$)SiR$_2$(C$_5$H$_4$)]ZRCI$_2$ (R=Me or PH)," J. Organomet. Chem. 509:63-71 (1996).
(Continued)

*Primary Examiner* — Sanza L. McClendon
(74) *Attorney, Agent, or Firm* — Foley & Lardner LLP

(57) ABSTRACT

A novel ethylene/α-olefin/non-conjugated polyene copolymer comprising structural units derived from ethylene (A), an α-olefin (B) of 3 to 20 carbon atoms, and a non-conjugated polyene (C) containing intramolecularly two or more partial structures in total selected from the group consisting of structures of Formulae (I) and (II), and having a small number of long-chain branches,

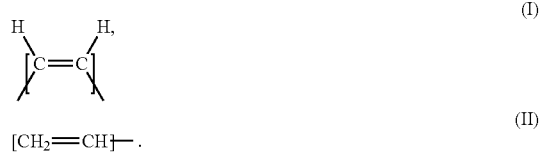

The novel ethylene/α-olefin/non-conjugated polyene copolymer contains a non-conjugated polyene such as VNB as a copolymerization component and a small long-chain branch content and is excellent in curing properties in the case of crosslinking using peroxide; and a process for producing the ethylene/α-olefin/non-conjugated polyene copolymer, and a use thereof are provided.

27 Claims, No Drawings

(51) Int. Cl.

| | | |
|---|---|---|
| *C08K 5/098* | (2006.01) | |
| *C08K 5/14* | (2006.01) | |
| *C08K 5/54* | (2006.01) | |
| *C08L 7/00* | (2006.01) | |
| *H01B 3/44* | (2006.01) | |
| *C08J 3/28* | (2006.01) | |
| *C08L 21/00* | (2006.01) | |
| *C08L 23/16* | (2006.01) | |
| *F16L 11/04* | (2006.01) | |

(52) U.S. Cl.
CPC ........ *C08J 2321/00* (2013.01); *C08J 2323/16* (2013.01); *C08L 2203/202* (2013.01); *F16L 11/04* (2013.01)

(56) References Cited

U.S. PATENT DOCUMENTS

| | | | |
|---|---|---|---|
| 2,970,150 | A | 1/1961 | Bailey |
| 3,159,601 | A | 12/1964 | Ashby |
| 3,516,946 | A | 6/1970 | Modic |
| 3,775,452 | A | 11/1973 | Karstedt |
| 3,814,780 | A | 6/1974 | Woodhall |
| 5,155,080 | A | 10/1992 | Elder et al. |
| 5,321,106 | A | 6/1994 | Lapointe |
| 5,387,568 | A | 2/1995 | Ewen et al. |
| 5,519,100 | A | 5/1996 | Ewen et al. |
| 5,614,457 | A | 3/1997 | Ewen et al. |
| 5,663,249 | A | 9/1997 | Ewen et al. |
| 5,883,202 | A | 3/1999 | Ewen et al. |
| 6,743,862 | B2 | 6/2004 | Hakuta et al. |
| 6,939,928 | B1 | 9/2005 | Kawai et al. |
| 2003/0013818 | A1 | 1/2003 | Hakuta et al. |
| 2003/0045624 | A1 | 3/2003 | Matsunaga et al. |
| 2006/0142437 | A1 | 6/2006 | Hakuta et al. |
| 2006/0161013 | A1 | 7/2006 | Tohi et al. |
| 2006/0205900 | A1 | 9/2006 | Windmuller et al. |
| 2006/0270812 | A1 | 11/2006 | Tohi et al. |
| 2007/0219320 | A1 | 9/2007 | Ichino et al. |
| 2008/0188621 | A1 | 8/2008 | Ichino et al. |
| 2008/0220193 | A1 | 9/2008 | Tohi et al. |
| 2009/0209672 | A1 | 8/2009 | Ebata et al. |
| 2014/0088214 | A1 | 3/2014 | Okamoto et al. |

FOREIGN PATENT DOCUMENTS

| | | | | |
|---|---|---|---|---|
| CN | 103476809 | A | 12/2013 | |
| JP | H01-501950 | A | 7/1989 | |
| JP | H01-502036 | A | 7/1989 | |
| JP | H03-179006 | A | 8/1991 | |
| JP | H03-189005 | A | 8/1991 | |
| JP | H03-207703 | A | 9/1991 | |
| JP | H03-207704 | A | 9/1991 | |
| JP | H10-127753 | A | 5/1998 | |
| JP | 2000-212194 | A | 8/2000 | |
| JP | 2001-123025 | A | 5/2001 | |
| JP | 2003-082174 | A | 3/2003 | |
| JP | 2004-168744 | A | 6/2004 | |
| JP | 2004-175759 | A | 6/2004 | |
| JP | 2006-348095 | A | 12/2006 | |
| JP | 2007-521371 | T | 8/2007 | |
| JP | 2010-275446 | A | 12/2010 | |
| JP | 2011-016907 | A | 1/2011 | |
| JP | 2011-231260 | A | 11/2011 | |
| WO | WO-88/05792 | A1 | 8/1988 | |
| WO | WO-88/05793 | A1 | 8/1988 | |
| WO | WO-01/27124 | A1 | 4/2001 | |
| WO | WO 2004/083299 | A1 | 9/2004 | |
| WO | WO-2005/100410 | A1 | 10/2005 | |
| WO | WO-2005/105912 | A1 | 11/2005 | |
| WO | WO-2005/105913 | A1 | 11/2005 | |
| WO | WO-2006/123759 | A1 | 11/2006 | |
| WO | WO-2009/072503 | A1 | 6/2009 | |
| WO | WO-2009/081794 | A1 | 7/2009 | |
| WO | WO-2012/157709 | A1 | 11/2012 | |
| WO | WO 2013/137231 | A1 | 9/2013 | |
| WO | WO-2013137231 | A1 * | 9/2013 | ............ C08F 210/18 |

OTHER PUBLICATIONS

International Search Report issued in International Patent Application No. PCT/JP2015/053989 dated Apr. 7, 2015.
Office Action dated Jul. 4, 2017 in Chinese Patent Application No. 201580008521.4.
Extended European Search Report dated Jul. 26, 2017 in European Patent Application No. 15749292.7.

* cited by examiner

ETHYLENE/α-OLEFIN/NON-CONJUGATED POLYENE COPOLYMER, AND PRODUCTION PROCESS AND USE THEREOF

CROSS-REFERENCE TO RELATED APPLICATIONS

The present application is a U.S. national stage application claiming the benefit of International Patent Application No. PCT/JP2015/053989, filed Feb. 13, 2015, which claims the benefit of priority to Japanese Patent Application No. 2014-026531, filed Feb. 14, 2014; Japanese Patent Application No. 2014-056313, filed Mar. 19, 2014; Japanese Patent Application No. 2014-066495, filed Mar. 27, 2014; and Japanese Patent Application No. 2014-066496, filed Mar. 27, 2014, the entireties of which are hereby incorporated by reference.

FIELD OF THE INVENTION

The present invention relates to an ethylene/α-olefin/non-conjugated polyene copolymer. Specifically, the invention relates to a novel ethylene/α-olefin/non-conjugated polyene copolymer having a structural unit derived from a specific non-conjugated polyene such as 5-vinyl-2-norbornene (VNB) and exhibiting a rapid crosslinking rate and an excellent formability, and also relates to a production process and a use thereof.

The invention also relates to a crosslinked shaped article which is obtained by using the ethylene/α-olefin/non-conjugated polyene copolymer and suitably usable, for example, for tires, and also relates to a production process and a use thereof.

Further, the invention relates to a resin composition containing the ethylene/α-olefin/non-conjugated polyene copolymer and to a shaped article made from the resin composition. Specifically, the invention relates to a resin composition which contains the ethylene/α-olefin/non-conjugated polyene copolymer and is suitable for producing anti-vibration shaped articles, and also relates to the shaped articles.

BACKGROUND OF THE INVENTION

Since ethylene/α-olefin rubbers represented by ethylene/propylene/non-conjugated diene copolymer rubber (EPDM) have no unsaturated bonds in the backbone of their molecular structure, they exhibits thermal resistance and weatherability superior to those of generally used conjugation diene rubbers, and accordingly, they are widely used in automobile parts, materials for electrical wire, materials for construction and civil engineering, parts of industrial members, modifiers for various resins, and so on.

When ethylene/α-olefin system rubbers are crosslinked by using peroxide, and in particular, when they contain an non-conjugated polyene such as 5-vinyl-2-norbornene (hereinafter, also referred to as VNB) as a copolymerization component, they exhibit a rapid crosslinking rates.

However, ethylene/α-olefin/VNB terpolymers produced by using existing catalysts have many long-chain branches derived from terminal vinyl groups of VNB. In this case, since many terminal vinyl groups of VNB in the copolymers have been consumed, improvement in crosslinking rate is not sufficient, and moreover, the long-chain branches may worsen the processability of the copolymers during their formation and their physical properties after the formation.

Such long-chain branches may also be generated by using vanadium-based catalysts, and the long-chain branch content was observed to have a tendency to increase especially when metallocene-based catalysts are used for polymerization.

Patent document 1 and Patent document 2 describe ethylene copolymers which are polymerized by using metallocene-based catalysts and contain structural units derived from ethylene, an α-olefin, and VNB, and Patent document 1 describes that the copolymer is suitable for foam shaping, and Patent document 2 describes that a rubber shaped article can be formed which has an excellent surface appearance, strength property, heat aging resistance, and light resistance, and a small compression set. However, ethylene copolymers obtained by these techniques have a large long-chain branch content.

Patent document 3 describes a process for producing a polymer containing monomer units of ethylene, an α-olefin, VNB, and 5-ethylidene-2-norbornene (ENB) by using a Group 4 metal compound having a single cyclopentadienyl ligand and a monosubstituted nitrogen ligand, aluminoxane and a catalyst-activating agent as a catalyst system, and also describes the production of an EPDM polymer having a high VNB content and a low degree of branching. However, the EPDM polymer described in Patent document 3 has a problem that it is unsuitable to obtain a shaped article having an enough heat aging resistance because of too many dienes per molecule of the copolymer.

In this situation, a novel ethylene/α-olefin-based rubber has been required which contains, with a small long-chain branch content, a non-conjugated polyene such as VNB as a copolymerization component.

Styrene-butadiene rubber (SBR) is conventionally widely used for tires, for example, for automobile uses. Diene rubbers such as styrene-butadiene rubber singly have insufficient weatherability, and when they are used for a long outdoor use such as for a tire use, an amine-based rubber antioxidant or a paraffin-based wax are usually added to improve weatherability. However, diene-rubber products in which the amine-based antioxidant or the paraffin-based wax are blended may undergo the bleed out of these components and discoloration on the surface thereof with time. Appearance worsening, such as discoloration and blooming due to the bleeding out during storage in shops may also cause lowering their commercial value. For these reasons, weatherability improvement by rubber components themselves has been required.

Although improving weatherability by blending ethylene-propylene-diene rubber (EPDM) to styrene-butadiene rubber has been studied in order to solve these problems, another problem occurs that styrene-butadiene rubber and EPDM tend to cause phase separation during heat crosslinking, resulting in insufficient fatigue-resistance.

The present applicants have proposed a rubber composition containing not only a random copolymer rubber consisting of structural units derived from ethylene, an α-olefin, and a specific triene compound, but also a diene rubber, carbon black, and a vulcanizer (See Patent document 4). This rubber composition is suitable for a tire sidewall use since the ethylene/α-olefin/triene random copolymer rubber shows fast vulcanization rate comparative to that of the diene rubber and consequently it is unlikely to cause phase separation from the diene rubber with no damage of the excellent mechanical strength intrinsically possessed by diene rubbers.

The present applicants have also found and proposed a rubber composition obtained by mixing a composition containing a non-conjugate polyene copolymer containing structural units derived from an α-olefin and from a non-conjugate polyene and a softening agent, and a diene rubber, and the rubber composition is suitable for forming a tire excellent in braking performance and fuel economy performance (See Patent documents 5 and 6).

Recently in tire production, there is mainly adopted a process including steps of forming an uncrosslinked composition mainly composed of a diene rubber such as styrene/butadiene rubber and natural rubber, for example, into a sheet-like shape, subsequently crosslinking only the surface of the shaped composition by electron beam to prevent sagging, and then assembling into a tire shape, followed by sulphur-crosslinking.

Further, diene rubbers such as natural rubber (NR), styrene-butadiene rubber (SBR), and butadiene rubber (BR) are known as a rubber excellent in dynamic fatigue resistance and dynamical properties, and are used as a raw material rubber for car tires and for anti-vibration rubbers. However nowadays, environmental conditions under which these rubber products are used have been greatly changed, and improvement in thermal resistance and weatherability of the rubber products has been required. For car tires, tread and tire sidewall are particularly required to have weatherability. However, there is so far no rubber having not only excellent mechanical properties, fatigue-resistance, and dynamical property, all being possessed by current diene rubbers, but also good weatherability.

For this reason, there are studied various blended rubber compositions of a diene rubber and an ethylene/α-olefin of 3 to 20 carbons/non-conjugate polyene copolymer such as ethylene/propylene/non-conjugate diene copolymer rubber (EPDM), the diene rubber being excellent in mechanical properties, dynamic fatigue resistance, and dynamical properties, and the copolymer being excellent in thermal resistance and weatherability. However, because the dynamical properties of the ethylene/α-olefin of 3 to 20 carbons/non-conjugate polyene copolymer and those of the diene rubber are at different levels, no blend-based rubber composition exhibiting uniform physical properties has been achieved. Note that the dynamical properties in car tires are used only to estimate whether a subject material worsens fuel economy or not, and the index of the properties is tan δ (loss tangent), a lower value of which means better dynamical properties.

On the other hand, anti-vibration rubber products for cars based on natural rubber which is a currently used diene rubber have been made difficult to provide a fatigue resistance sufficient to practical use due to increase in temperature in engine rooms. Accordingly, a novel rubber material is required which is excellent in thermal resistance, and exhibits mechanical properties, dynamical properties, and fatigue-resistance which are equal to or better than those of diene rubbers.

In general, in order to improve the dynamical properties, crosslinking density must be high. However in existing techniques, in order to make the dynamical properties of ethylene/α-olefin of 3 to 20 carbons/non-conjugated polyene copolymers be comparative to those of diene rubbers such as NR, the crosslinking density becomes too high, resulting in degradation of mechanical properties such as tensile break elongation and causing incompatibility between the dynamical properties and the physical properties.

In this situation, the applicants propose; an anti-vibration rubber composition containing a specific ethylene/α-olefin/polyene amorphous copolymer, a crosslinking agent, and a filler, which composition is able to reduce the used amount of the organic peroxide crosslinking agent and has an excellent thermal resistance, a durability equal to or larger than that of natural rubber, and also exhibits an excellent dynamic-to-static modulus ratio (See Patent document 7); a rubber composition containing an ethylene/α-olefin/non-conjugated polyene copolymer, a powdered silica, a metal unsaturated carboxylate, and an organic peroxide, which composition not only is excellent in dynamical properties and mechanical strength, but also has an improved heat aging resistance (See Patent document 8); and an anti-vibration rubber composition containing a specific ethylene/α-olefin/non-conjugated polyene copolymer having a small B value and containing a powdered silica, a metal unsaturated carboxylate, and an organic peroxide, which composition is not only excellent in thermal resistance and fatigue resistance, but also well-balanced between dynamical properties and mechanical strength (See Patent document 9).

In anti-vibration rubbers made from ethylene/α-olefin/non-conjugated polyene copolymers, in order to improve anti-vibration property, in other words, decrease dynamic-to-static modulus ratio, it has been thought to be effective to use copolymers with a high molecular weight, to suppress the used content of fillers, and to increase crosslinking density, and various processes to achieve these strategies have been studied.

However, there is a problem that ethylene/α-olefin/non-conjugated polyene copolymers with a high molecular weight are difficult to knead because of the high viscosity of the polymers themselves. Moreover, there is also a problem that the increase in crosslinking density, required to become higher as mentioned above in order to improve anti-vibration property, in some cases causes deterioration of mechanical physical properties such as elongation property. In addition, anti-vibration rubber products such as anti-vibration rubbers for an automobile use and specifically for muffler hanger are required to have a particularly high thermal resistance.

DOCUMENTS OF RELATED ART

Patent Documents

Patent Document 1: JP-A-2011-231260
Patent Document 2: WO 2009/072503
Patent document 3: JP-T-2007-521371
Patent document 4: JP-A-2001-123025
Patent document 5: WO 2005/105912
Patent document 6: WO 2005/105913
Patent document 7: JP-A-H10(1998)-127753
Patent document 8: JP-A-2003-82174
Patent document 9: JP-A-2006-348095

DISCLOSURE OF THE INVENTION

Problems to be Solved by the Invention

An object of the present invention is to provide a novel ethylene/α-olefin/non-conjugated polyene copolymer which contains a specific non-conjugated polyene such as VNB as a copolymerization component, and which has a small long-chain branch content and is excellent in curing properties in the case of crosslinking by using peroxide, a production process, and a use thereof.

Another object of the invention is to provide a crosslinked shaped article without phase separation during its production, the crosslinked shaped article being excellent in weatherability and prevented from worsening of its appearance due to the improved weatherability of rubber components such as styrene/butadiene rubber and natural rubber.

Still another object of the invention is to provide a resin composition suitable for producing anti-vibration rubber products and the anti-vibration rubber products, the resin composition having a crosslinking density easy to be increased, excellent anti-vibration properties, an elongation property unlikely to deteriorate even with increased crosslinking density, a sufficient strength even with its molecular weight within a range for easy kneading, and an excellent thermal resistance.

Means for Solving the Problems

The present inventors have earnestly studied to achieve the above-mentioned objects, and found that a novel ethylene/α-olefin/non-conjugated polyene copolymer specified by the following requirements from (i) to (v) contains a structural unit derived from a specific non-conjugated polyene such as VNB, and that the copolymer has a small long-chain branch content and is crosslinkable by peroxides at a rapid rate, and moreover, excellent in properties after crosslinking, and thus the invention has been completed.

The inventor have also found that a crosslinked shaped article obtained by crosslinking a composition which contains the specific ethylene/α-olefin/non-conjugated polyene copolymer and a rubber component such as diene rubber is not accompanied by phase separation during its production, particularly during crosslinking, and in addition, it is excellent in weatherability, and thus the invention has been completed.

The invention relates to the following items.

[1] An ethylene/α-olefin/non-conjugated polyene copolymer comprising structural units derived from ethylene (A), an α-olefin (B) of 3 to 20 carbon atoms, and a non-conjugated polyene (C) containing intramolecularly two or more partial structures in total selected from the group consisting of structures represented by Formulae (I) and (II), and satisfying the following requirements of from (i) to (v):

[Chem. 1]

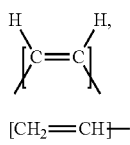
(I)

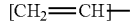
(II)

(i) the molar ratio of the ethylene/α-olefin is from 40/60 to 99.9/0.1;
(ii) the weight fraction of the structural unit derived from the non-conjugated polyene (C) is from 0.07% by weight to 10% by weight in 100% by weight of the ethylene/α-olefin/non-conjugated polyene copolymer;
(iii) the weight-average molecular weight (Mw) of the ethylene/α-olefin/non-conjugated polyene copolymer, the weight fraction of the structural unit derived from the non-conjugated polyene (C) (weight fraction of (C) (% by weight)), and a molecular weight of the non-conjugated polyene (C) (molecular weight of (C)) satisfy Formula (1), $$4.5 \leq Mw \times \text{weight fraction of } (C)/100/\text{molecular weight of } (C) \leq 40 \quad \text{Formula (1);}$$

(iv) the ratio of a complex viscosity $\eta^*_{(\omega=0.1)}$ (Pa·sec) at a frequency of ω=0.1 rad/s to a complex viscosity $\eta^*_{(\omega=100)}$ (Pa·sec) at a frequency of ω=100 rad/s, both obtained by linear viscoelastic measurement (190° C.) by using a rheometer, represented by $P(\eta^*_{(\omega=0.1)}/\eta^*_{(\omega=100)})$, an intrinsic viscosity represented by [η], and a weight fraction of the structural unit derived from the non-conjugated polyene (C) (weight fraction of (C)) satisfy Formula (2), $$P/([\eta]^{2.9}) \leq \text{weight fraction of } (C) \times 6 \quad \text{Formula (2); and}$$

(v) the number of long-chain branches per 1000 carbon atoms represented by ($LCB_{1000C}$) and the natural logarithmic number of the weight-average molecular weight (Mw) represented by [Ln(Mw)], obtained by using 3D-GPC, satisfy Formula (3), $$LCB_{1000C} \leq 1 - 0.07 \times Ln(Mw) \quad \text{Formula (3).}$$

[2] The ethylene/α-olefin/non-conjugated polyene copolymer according to [1], wherein the intrinsic viscosity [η] is from 0.1 to 5 dL/g, and the weight-average molecular weight (Mw) is from 10000 to 600000.

[3] The ethylene/α-olefin/non-conjugated polyene copolymer according to [1] or [2], wherein the non-conjugated polyene (C) is 5-vinyl-2-norbornene (VNB).

[4] The ethylene/α-olefin/non-conjugated polyene copolymer according to any one of [1] to [3], further comprising a structural unit derived from a non-conjugated polyene (D) containing intramolecularly only one partial structure selected from the group consisting of structures represented by Formulae (I) and (II), at a weight fraction of from 0% by weight to 20% by weight (with the proviso that the sum of the weight fractions of (A), (B), (C), and (D) is 100% by weight), and satisfying the following requirement (vi);

(vi) the weight-average molecular weight (Mw) of the ethylene/α-olefin/non-conjugated polyene copolymer, the weight fraction of the structural unit derived from the non-conjugated polyene (C) (weight fraction of (C) (% by weight)), the weight fraction of the structural unit derived from the non-conjugated polyene (D) (weight fraction of (D) (% by weight)), the molecular weight of the non-conjugated polyene (C) (molecular weight of (C)), and a molecular weight of the non-conjugated polyene (D) (molecular weight of (D)) satisfy Formula (4), $$4.5 \leq Mw \times [(\text{weight fraction of } (C)/100/\text{molecular weight of } (C)) + (\text{weight fraction of } (D)/100/\text{molecular weight of } (D))] \leq 45 \quad \text{Formula (4).}$$

[5] The ethylene/α-olefin/non-conjugated polyene copolymer according to [4], wherein the non-conjugated polyene (D) is 5-ethylidene-2-norbornene (ENB).

[6] The ethylene/α-olefin/non-conjugated polyene copolymer according to any one of [1] to [5], obtained by copolymerizing monomers in the presence of at least one kind of metallocene compound represented by Formula [A1],

[Chem. 2]

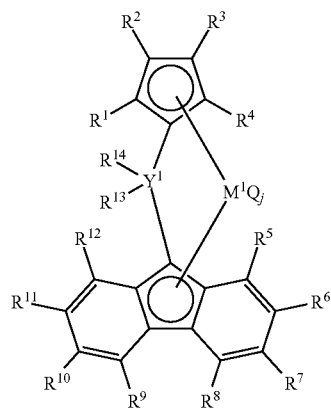
[A1]

[In Formula [A1], $R^1$, $R^2$, $R^3$, $R^4$, $R^5$, $R^3$, $R^9$, and $R^{12}$ each independently represent a hydrogen atom, a hydrocarbon group, a silicon-containing group, or a heteroatom-containing group other than any silicon-containing group, and adjacent two groups among $R^1$ to $R^4$ may together form a ring;

$R^6$ and $R^{11}$ are the same atom or the same group selected from the group consisting of a hydrogen atom, a hydrocarbon group, a silicon-containing group, and a heteroatom-containing group other than any silicon-containing group, $R^7$ and $R^{10}$ are the same atom or the same group selected from the group consisting of a hydrogen atom, a hydrocarbon group, a silicon-containing group, and a heteroatom-containing group other than any silicon-containing group, $R^6$ and $R^7$ may together form a ring, and $R^{10}$ and $R^{11}$ may together form a ring, with the proviso that all of $R^6$, $R^7$, $R^{10}$, and $R^{11}$ are not a hydrogen atom simultaneously;

$R^{13}$ and $R^{14}$ each independently represent an aryl group; $M^1$ represents a zirconium atom;

$Y^1$ represents a carbon atom or a silicon atom;

Q represents a halogen atom, a hydrocarbon group, a halogenated hydrocarbon group, a neutral conjugated or non-conjugated diene of 4 to 20 carbon atoms, or a neutral ligand coordinatable by an anionic ligand or a lone pair, and j represents an integer from 1 to 4, and when j is an integer from 2 or more, a plurality of Qs may be the same or different from each other.]

[7] A process for producing an ethylene/α-olefin/non-conjugated polyene copolymer, the process including performing copolymerization in the presence of at least one kind of metallocene compound represented by Formula [A1] to produce the ethylene/α-olefin/non-conjugated polyene copolymer according to any one of [1] to [5].

[Chem. 3]

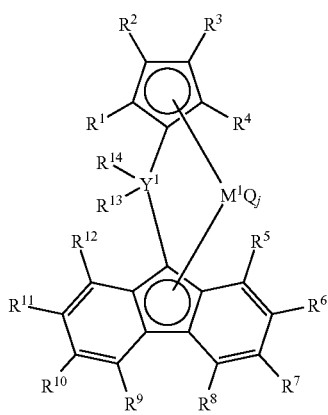

[In Formula [A1], $R^1$, $R^2$, $R^3$, $R^4$, $R^6$, $R^8$, $R^9$, and $R^{12}$ each independently represent a hydrogen atom, a hydrocarbon group, a silicon-containing group, or a heteroatom-containing group other than any silicon-containing group, and adjacent two groups among $R^1$ to $R^4$ may together form a ring;

$R^6$ and $R^{11}$ are the same atom or the same group selected from a hydrogen atom, a hydrocarbon group, a silicon-containing group, and a heteroatom-containing group other than any silicon-containing group, $R^7$ and $R^{10}$ are the same atom or the same group selected from hydrogen atom, a hydrocarbon group, a silicon-containing group, and a heteroatom-containing group other than any silicon-containing group, $R^6$ and $R^7$ may together form a ring, and $R^{10}$ and $R^{11}$ may together form a ring, with the proviso that all of $R^6$, $R^7$, $R^{10}$, and $R^{11}$ are not a hydrogen atom simultaneously;

$R^{13}$ and $R^{14}$ each independently represent an aryl group; $M^1$ represents a zirconium atom;

$Y^1$ represents a carbon atom or a silicon atom;

Q represents a halogen atom, a hydrocarbon group, a halogenated hydrocarbon group, a neutral conjugated or non-conjugated diene of 4 to 20 carbon atoms, or a neutral ligand coordinatable by an anionic ligand or a lone pair, and j represents an integer from 1 to 4, and when j is an integer of 2 or more, a plurality of Qs may be the same or different from each other.]

[8] The process for producing an ethylene/α-olefin/non-conjugated polyene copolymer according to [7], wherein the process includes continuously feeding to a reactor and copolymerizing ethylene (A), an α-olefin (B) of 3 to 20 carbon atoms, a non-conjugated polyene (C) containing intramolecularly two or more partial structures in total selected from the group consisting of structures represented by Formulae (I) and (II), and as necessary, a non-conjugated polyene (D) containing intramolecularly only one partial structure selected from the group consisting of structures represented by Formulae (I) and (II),

[Chem. 4]

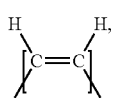 (I)

 (II)

[9] The process for producing an ethylene/α-olefin/non-conjugated polyene copolymer according to [8], wherein the non-conjugated polyene (C) is 5-vinyl-2-norbornene (VNB), and the non-conjugated polyene (D) is 5-ethylidene-2-norbornene (ENB).

[10] A thermoplastic resin composition comprising the ethylene/α-olefin/non-conjugated polyene copolymer according to any one of [1] to [6].

[11] A thermoplastic resin composition comprising the ethylene/α-olefin/non-conjugated polyene copolymer according to any one of [1] to [6] and an organic peroxide, wherein the content (mol) of the organic peroxide satisfies Formula (7), content (mol) of organic peroxide×number of oxygen-oxygen bonds per molecule in organic peroxide≤weight fraction of (C)/molecular weight of (C)×100    Formula (7).

(In formula (7), the weight fraction of (C) represents the weight fraction (% by weight) of the structural unit derived from the non-conjugated polyene (C) in the ethylene/α-olefin/non-conjugated polyene copolymer, and the molecular weight of (C) represents the molecular weight of the non-conjugated polyene (C).)

[12] A rubber composition comprising the ethylene/α-olefin/non-conjugated polyene copolymer according to any one of [1] to [6].

[13] A vulcanized rubber shaped article obtained by crosslinking the rubber composition according to [12].

[14] A hose for an automobile use obtained by crosslinking the rubber composition according to [12].

[15] A turbocharger hose obtained by crosslinking the rubber composition according to [12].

[16] A muffler hanger obtained by crosslinking the rubber composition according to [12].

[17] An engine mount obtained by crosslinking the rubber composition according to [12].

[18] A conveyance belt obtained by crosslinking the rubber composition according to [12].

[19] A material for a wire cover obtained by crosslinking the rubber composition according to [12].

[20] A crosslinked shaped article obtained by crosslinking a rubber composition (X) comprising the ethylene/α-olefin/non-conjugated polyene copolymer (S) according to [1] and a rubber component (T) selected from the group consisting of diene rubber, butyl rubber, and halogenated butyl rubber, in a mass ratio of (S)/(T)=5/95-50/50.

[21] The crosslinked shaped article according to [20] obtained by crosslinking the rubber compositions (X) by irradiation with electron beam.

[22] The crosslinked shaped article according [20] or [21], wherein the conjugated polyene (C) comprises 5-vinyl-2-norbornene (VNB).

[23] The crosslinked shaped article according to any one of [20] to [22], wherein the rubber component (T) comprises one or more kinds selected from the group consisting of natural rubber, isoprene rubber, styrene-butadiene rubber, butadiene rubber, butyl rubber, and halogenated butyl rubber.

[24] The crosslinked shaped article according to [20] to [23], wherein the rubber component (T) comprises styrene-butadiene copolymer rubber.

[25] A process for producing a crosslinked shaped article comprising the step of crosslinking a rubber composition (X) comprising the ethylene/α-olefin/non-conjugated polyene copolymer (S) according to [1] and a rubber component (T) selected from the group consisting of diene rubber, butyl rubber, and halogenated butyl rubber, in a mass ratio of (S)/(T)=5/95-50/50.

[26] A process for producing a crosslinked shaped article according to [25], wherein the crosslinking step is performed by irradiation with electron beam.

[27] A tire member using the crosslinked shaped article according to any one of [20] to [24].

[28] A tire tread using the crosslinked shaped article according to any one of [20] to [24].

[29] A tire sidewall using the crosslinked shaped article according to any one of [20] to [24].

[30] A tire comprising one or more kinds of tire members selected from the group consisting of a tire inner liner, a tire inner tube, a tire flap, a tire shoulder, a tire bead, a tire tread, and a tire sidewall, the members being composed of the crosslinked shaped article according to any one of [20] to [24].

[31] A resin composition comprising:
(S) 100 parts by weight of the ethylene/α-olefin/non-conjugated polyene copolymer according to [1];
(E) 5-90 parts by weight of a powdered silica and/or a powdered silicate salt having a specific surface area within the range of 5-500 m$^2$/g;
and, as crosslinking agents,
(G) 0.1-15 parts by weight of an organic peroxide; and/or
(H) 0.1-100 parts by weight of a SiH group-containing compound comprising at least two SiH groups per molecule.

[32] The resin composition according to [31], wherein the ethylene/α-olefin/non-conjugated polyene copolymer (S) has an intrinsic viscosity [η] of 1.0-4.0 dl/g measured in decalin at 135° C.

[33] The resin composition according to [31] or [32], comprising 0.1-20 parts by weight of (F) an metal α,β-unsaturated carboxylate with respect to 100 parts by weight of the ethylene/α-olefin/non-conjugated polyene copolymer (S).

[34] The resin composition according to [33], wherein the metal α,β-unsaturated carboxylate (F) comprises at least one kind selected from the group consisting of metal methacrylate and metal maleate.

[35] The resin composition according to any one of [31] to [34], comprising (J) a compound comprising at least one unsaturated hydrocarbon group and at least one hydrolysable silyl group, in an amount of less than 8×10$^{-6}$ mol per 1 m$^2$ of the surface area of the powdered silica and/or the powdered silicate salt (E) having the specific surface area within the range of 5-500 m$^2$/g.

[36] A crosslinked shaped article made of the resin composition according to any one of [31] to [35].

[37] An anti-vibration rubber product obtained by crosslinking the resin composition according to any one of [31] to [35].

[38] An anti-vibration rubber product according to [37] which is an anti-vibration rubber for an automobile use.

[39] An anti-vibration rubber product according to [37] which is a muffler hanger for an automobile use.

[40] An anti-vibration rubber product according to [37] which is an anti-vibration rubber for railroad use.

[41] An anti-vibration rubber product according to [37] which is an anti-vibration rubber for use in an industrial machine.

[42] An anti-vibration rubber product according to [37] which is a quake-absorbing rubber for construction.

Advantageous Effect of the Invention

The present invention can provide a novel ethylene/olefin/non-conjugated polyene copolymer which contains a specific non-conjugated polyene such as VNB as a copolymerization component, and which has a small long-chain branch content and is excellent in curing properties in the case of crosslinking by using peroxide, and the invention can also provide a production process and a use thereof.

In addition, the ethylene/α-olefin/non-conjugated polyene copolymer according to the invention is excellent in formability, crosslinking properties, and curing properties, yielding a shaped article well-balanced in physical properties such as mechanical properties and particularly excellent in heat aging resistance.

The invention can also provide a crosslinked shaped article exhibiting no phase separation, excellent weatherability even when used in situations exposed to environmental atmosphere and daylight for a long period of time, and no worsening of appearance due to bleeding out, for example, of an additive, and can provide a production process thereof. In addition, according to the process for producing the shaped article of the invention, which uses compositions with extremely excellent crosslinking properties, the crosslinking using only electron-beam is made possible, so that crosslinking at high temperature for a long period of time can be avoided, and phase separation can be prevented in the crosslinked shaped article. The resultant article, which exhibits not only excellent mechanical properties and surface properties but also excellent weatherability, can be suitably used for applications requiring weatherability, such as tire members and materials for wire cover.

Still further, the invention can provide a shaped article having a crosslinking density easy to be increased, an elongation property unlikely to deteriorate even with the increased crosslinking density, and a sufficient strength and thermal resistance even with a molecular weight within the range for easy kneading, and the invention can also provide a resin composition suitable for producing anti-vibration rubber products. In other words, the invention can provide an excellent resin composition and an anti-vibration rubber product which have a striking effect capable of achieving not only anti-vibration properties but also heat aging resistance and which are well-balanced between kneadability and mechanical properties such as anti-vibration properties and elongation. In addition, anti-vibration rubber products of the invention have good rubber properties and exhibit excellent anti-vibration properties and an excellent thermal resistance, enabling suitable applications which require high thermal resistance such as anti-vibration rubber products for an automobile use, particularly for muffler hanger.

DETAILED DESCRIPTION OF THE INVENTION

The present invention will be hereinafter explained specifically.

<Ethylene/α-Olefin/Non-Conjugated Polyene Copolymer>

The ethylene/α-olefin/non-conjugated polyene copolymer according to the invention (ethylene/α-olefin/non-conjugated polyene copolymer (S)) has structural units derived from ethylene (A), an α-olefin (B) of 3 to 20 carbon atoms, and a non-conjugated polyene (C) containing intramolecularly two or more partial structures in total selected from the group consisting of structures represented by Formulae (I) and (II),

[Chem. 5]

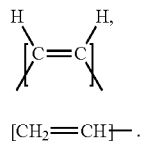

(I)

[CH$_2$=CH]—.

(II)

The ethylene/α-olefin/non-conjugated polyene copolymer of the invention may have, in addition to the structure units derived from the above-mentioned (A), (B), and (C), a structural unit derived from a non-conjugated polyene (D) containing intramolecularly only one partial structure selected from the group consisting of the structures of Formulae (I) and (II).

Examples of the α-olefin (B) of 3 to 20 carbon atoms include propylene, 1-butene, 1-pentene, 1-hexene, 4-methyl-1-pentene, 1-heptene, 1-octene, 1-decene, 1-dodecene, 1-tetradecene, 1-hexadecene, 1-eicocene, and so on. Among them, α-olefins of 3 to 8 carbon atoms are preferable, such as propylene, 1-butene, 1-hexene, 1-octene, and particularly propylene is preferable. Such α-olefins are preferable because they are relatively inexpensive in raw material cost, and provide not only an ethylene/α-olefin/non-conjugated polyene copolymer excellent in mechanical properties but also a shaped article exhibiting rubber elasticity. These α-olefins may be used singly or in combination of the two or more kinds.

In other words, the ethylene/α-olefin/non-conjugated polyene copolymer of the invention contains a structural unit derived from at least one kind of α-olefin (B) of 3 to 20 carbon atoms, and may contain structural units derived from two or more kinds of α-olefins (B) of 3 to 20 carbon atoms.

Examples of the non-conjugated polyene (C) containing intramolecularly two or more partial structures in total selected from the group consisting of the structures of Formulae (I) and (II) include 5-vinyl-2-norbornene (VNB), norbornadiene, 1,4-hexadiene, dicyclopentadiene, and so on. Among them, the non-conjugated polyene (C) preferably contains VNB, and the non-conjugated polyene (C) is more preferably VNB because of its easy availability and its good crosslinking reactivity with peroxide during crosslinking after polymerization, and easy improvement in thermal resistance of its polymerized composition. The non-conjugated polyene (C) may be used singly or in combination of the two or more kinds.

The ethylene/α-olefin/non-conjugated polyene copolymer of the invention may contain, in addition to the structural units derived from ethylene (A), the α-olefin (B) of 3 to 20 carbon atoms, and the non-conjugated polyene (C), a structural unit derived from a non-conjugated polyene (D) containing intramolecularly only one partial structure selected from the group consisting of the structures of Formulae (I) and (II). Examples of the non-conjugated polyene (D) include 5-ethylidene-2-norbornene (ENB), 5-methylene-2-norbornene, 5-(2-propenyl)-2-norbornene, 5-(3-butenyl)-2-norbornene, 5-(1-methyl-2-propenyl)-2-norbornene, 5-(4-pentenyl)-2-norbornene, 5-(1-methyl-3-butenyl)-2-norbornene, 5-(5-hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methyl-5-hexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene, and so on. Among them, ENB is preferable because of its easy availability and its high reactivity with sulphur and a vulcanization enhancer during crosslinking reaction after polymerization, easy controllability of its crosslinking rate, easiness to obtain its good mechanical physical properties. The non-conjugated polyene (D) can be used singly or in combination of the two or more kinds. When the ethylene/α-olefin/non-conjugated polyene copolymer of the invention contains a structural unit derived from the non-conjugated polyene (D) containing intramolecularly only one partial structure selected from the group consisting of the structures of Formulae (I) and (II), the unit is usually contained in a weight fraction of from about 0 to about 20% by weight, preferably from about 0 to about 8% by weight, and more preferably from about 0.01 to about 8% (with the proviso that the sum of the weight fractions of (A), (B), (C), and (D) is 100% by weight) although the fraction of the unit is not especially limited so long as the purposes of the present invention are not harmed.

The ethylene/α-olefin/non-conjugated polyene copolymer of the invention is, as described above, a copolymer containing structural units derived from ethylene (A), an α-olefin (B) of 3 to 20 carbon atoms, the above non-conjugated polyene (C), and as necessary, the above non-conjugated polyene (D), and satisfies the following requirements (i) to (v):

(i) the molar ratio of the ethylene/α-olefin is from 40/60 to 99.9/0.1;

(ii) the weight fraction of the structural unit derived from the non-conjugated polyene (C) is from 0.07% by weight to 10% by weight;

(iii) the weight-average molecular weight (Mw) of the ethylene/α-olefin/non-conjugated polyene copolymer, the weight fraction of the structural unit derived from the non-conjugated polyene (C) (weight fraction of (C) (% by weight)), and the molecular weight of the non-conjugated polyene (C) (molecular weight of (C)) satisfy Formula (1), $$4.5 \leq Mw \times \text{weight fraction of } (C)/100/\text{molecular weight of } (C) \leq 40 \quad \text{Formula (1)};$$

(iv) the ratio of a complex viscosity $\eta^*_{(\omega=0.1)}$ (Pa·sec) at a frequency of $\omega=0.1$ rad/s to a complex viscosity $\eta^*_{(\omega=100)}$ (Pa·sec) at a frequency of $\omega=100$ rad/s, both obtained by linear viscoelastic measurement (190° C.) by using a rheometer, represented by $P(\eta^*_{(\omega=0.1)}/\eta^*_{(\omega=100)})$, an intrinsic viscosity represented by [η], and the weight fraction of the structural unit derived from the non-conjugated polyene (C) (weight fraction of (C)) satisfy Formula (2), $$P/([\eta]^{2.9}) \text{ weight fraction of } (C) \times 6 \quad \text{Formula (2)};$$

(v) the number of long-chain branches per 1000 carbon atoms represented by ($LCB_{1000C}$) and the natural logarithmic number of the weight-average molecular weight (Mw) represented by [Ln(Mw)], obtained by using 3D-GPC, satisfy Formula (3), $$LCB_{1000C} \leq 1 - 0.07 \times Ln(Mw) \quad \text{Formula (3)}.$$

In the present specification, the above (i) to (v) are also described as requirements (i) to (v), respectively. In the present specification, "α-olefin of 3 to 20 carbon atoms" is also simply described as "α-olefin."

(Requirement (i))

The requirement (i) specifies that the mole ratio of ethylene/α-olefin in the ethylene/α-olefin/non-conjugated polyene copolymer of the invention falls within the range from 40/60 to 99.9/0.1, and this mole ratio is preferably within the range from 50/50 to 90/10, more preferably from 55/45 to 85/15, and still preferably from 55/45 to 78/22. Such an ethylene/α-olefin/non-conjugated polyene copolymer of the invention is preferable because when it is used as a raw material for crosslinked shaped articles, resultant crosslinked shaped articles are not only excellent in rubber elasticity but also excellent in mechanical strength and flexibility.

The amount of ethylene (content of a structural unit derived from ethylene (A)) and the amount of the α-olefin (content of a structural unit derived from the α-olefin (B)) in the ethylene/α-olefin/non-conjugated polyene copolymer can be obtained by using $^{13}$C-NMR.

(Requirement (ii))

The requirement (ii) specifies that in the ethylene/α-olefin/non-conjugated polyene copolymer of the invention, the weight fraction of the structural unit derived from non-conjugated polyene (C) is within the range from 0.07% by weight to 10% by weight in 100% by weight of the ethylene/α-olefin/non-conjugated polyene copolymer (i.e. 100% by weight in total of the weight fractions of all the structural units). This weight fraction of the structural unit derived from the non-conjugated polyene (C) is preferably from 0.1% by weight to 8.0% by weight, and more preferably from 0.5% by weight to 5.0% by weight.

It is preferable that the ethylene/α-olefin/non-conjugated polyene copolymer of the invention satisfies the requirement (ii) because it has sufficient hardness and exhibits excellent mechanical properties, and because it is suitable for producing crosslinked shaped articles due to its rapid crosslinking rate when crosslinked by using peroxide.

The amount of the non-conjugated polyene (C) (content of the structural unit derived from the non-conjugated polyene (C)) in the ethylene/α-olefin/non-conjugated polyene copolymer can be obtained by using $^{13}$C-NMR.

(Requirement (iii))

The requirement (iii) specifies that in the ethylene/α-olefin/non-conjugated polyene copolymer of the invention, the weight-average molecular weight (Mw) of the ethylene/α-olefin/non-conjugated polyene copolymer, the weight fraction of the structural unit derived from the non-conjugated polyene (C) in the copolymer (weight fraction of (C): % by weight), and the molecular weight of the non-conjugated polyene (C) (molecular weight of (C)) satisfy Formula (1), $$4.5 \leq Mw \times \text{weight fraction of } (C)/100/\text{molecular weight of } (C) \leq 40 \quad \text{Formula (1)}.$$

It is preferable that the ethylene/α-olefin/non-conjugated polyene copolymer of the invention satisfies the requirement (iii) not only because the copolymer has an appropriate content of the structural unit derived from the non-conjugated polyene (C) such as VNB and exhibits sufficient crosslinking performance, but also because when crosslinked shaped articles are produced by using the ethylene/α-olefin/non-conjugated polyene copolymer of the invention, they are excellent in crosslinking rate, resulting in crosslinked shaped articles excellent in mechanical properties after crosslinking.

The ethylene/α-olefin/non-conjugated polyene copolymer of the invention more preferably satisfies Formula (1'), $$4.5 \leq Mw \times \text{weight fraction of } (C)/100/\text{molecular weight of } (C) \leq 35 \quad \text{Formula (1')}.$$

The weight-average molecular weight (Mw) of the ethylene/α-olefin/non-conjugated polyene copolymer can be obtained as a numerical value in terms of polystyrene by using gel permeation chromatography (GPC).

When the ethylene/α-olefin/non-conjugated polyene copolymer of the invention has "Mw×weight fraction of (C)/100/(molecular weight of (C))" satisfying Formula (1) or (1'), it has an appropriate degree of crosslinking, enabling production of shaped products well-balanced between mechanical physical properties and heat aging resistance. When "Mw×weight fraction of (C)/100/molecular weight of (C)" is too low, crosslinkability may be insufficient, causing slow crosslinking rate, and when it is too high, excessive crosslink may happen, causing worsened mechanical physical properties.

(Requirement (iv))

The requirement (iv) specifies that the ratio of a complex viscosity $\eta^*_{(\omega=0.1)}$ (Pa·sec) at a frequency of $\omega=0.1$ rad/s to a complex viscosity $\eta^*_{(\omega=100)}$ (Pa·sec) at a frequency of $\omega=100$ rad/s, both obtained by linear viscoelastic measurement (190° C.) by using a rheometer, represented by $P(\eta^*_{(\omega=0.1)}/\eta^*_{(\omega=100)})$, of the ethylene/α-olefin/non-conjugated polyene copolymer of the invention, the intrinsic viscosity [η], and the weight fraction of the structural unit derived from the non-conjugated polyene (C) (weight fraction of (C): % by weight) satisfy Formula (2), $$P/([\eta]^{2.9}) \leq \text{weight fraction of } (C) \times 6 \quad \text{Formula (2)},$$

where the ratio of the complex viscosity $\eta^*_{(\omega=0.1)}$ at the frequency $\omega=0.1$ rad/s to the complex viscosity $\eta^*_{(\omega=0.1)}$ at the frequency $\omega=100$ rad/s, represented by $P(\eta^*_{(\omega=0.1)}/\eta^*_{(\omega=100)})$, represents frequency dependence of the viscosity, and $P/([\eta]^{2.9})$ which corresponds to the left side of Formula (2) tends to be higher with increase in the number of long-chain branches, although depending on, for example, short-chain branching and molecular weight. In general, ethylene/α-olefin/non-conjugated polyene copolymers containing a larger amount of structural unit derived from the non-conjugated polyene tend to contain a larger number of long-chain branches, but the ethylene/α-olefin/non-conjugated polyene copolymer of the invention is thought to be able to satisfy above Formula (2) due to its fewer long-chain branches than those of conventional well-known ethylene/α-olefin/non-conjugated polyene copolymers. In the invention, the P value is a ratio (η*ratio) calculated from a complex viscosities at 0.1 rad/s and 100 rad/s obtained by using a viscoelastic measurement apparatus Ares (manufactured by Rheometric Scientific) under a measurement condition of 190° C. and 1.0% of distortion at the different frequencies.

The ethylene/α-olefin/non-conjugated polyene copolymer of the invention preferably satisfies Formula (2'), $$P/([\eta]^{2.9}) \leq \text{weight fraction of } (C) \times 5.7 \quad \text{Formula (2')}.$$

The intrinsic viscosity [η] means a value measured in decalin at 135° C.

(Requirement (v))

The requirement (v) specifies that the number of long-chain branching per 1000 carbon atoms ($LCB_{1000C}$) and the natural logarithmic number of the weight-average molecular weight (Mw) represented by [Ln(Mw)], obtained by using 3D-GPC of the ethylene/α-olefin/non-conjugated polyene copolymer, satisfy Formula (3), $$LCB_{1000C} \leq 1 - 0.07 \times Ln(Mw) \quad \text{Formula (3)}.$$

Formula (3) specifies the upper limit of the long-chain branch content per carbon of the ethylene/α-olefin/non-conjugated polyene copolymer.

Such an ethylene/α-olefin/non-conjugated polyene copolymer is preferable because it is excellent in curing properties due to a small fraction of the number of long-chain branches in the case of crosslinking by peroxide and an shaped article obtained from the copolymer is excellent in heat aging resistance.

The ethylene/α-olefin/non-conjugated polyene copolymer of the invention preferably satisfies Formula (3'), $$LCB_{1000C} \leq 1 - 0.071 \times Ln(Mw) \quad \text{Formula (3')},$$

where Mw and the number of long-chain branches per 1000 carbon atoms ($LCB_{1000C}$) can be obtained by a structural analysis using 3D-GPC. In the present specification, they were obtained specifically as follows.

Absolute molecular weight distribution was obtained by using 3D-high temperature GPC apparatus, Model PL-GPC220 (manufactured by Polymer Laboratories), and simultaneously, intrinsic viscosity was obtained by a viscometer. Main measurement conditions are as follows.

Detector: refractive index detector/incorporated GPC apparatus

Two-angle light scattering detector, Model PD2040 (manufactured by Precision Detectors)

Bridge viscometer, Model PL-BV400 (manufactured by Polymer Laboratories)

Columns: $TSK_{gel}$ $GMH_{HR}$-H(S)HT×2+$TSK_{gel}$ $GMH_{HR}$-M(S)×1

(each having internal diameter 7.8 mmφ×length 300 mm)

Temperature: 140° C.

Mobile phase: 1,2,4-trichlorobenzene (containing 0.025% BHT)

Loaded quantity: 0.5 mL

Sample concentration: ca 1.5 mg/mL

Sample filtration: filtration by a sintered filter with pore diameter 1.0 μm

Values of dn/dc necessary for determining absolute molecular weight were determined for respective samples by using a dn/dc value of a polystyrene standard (molecular weight 190000) of 0.053 and a response intensity of the refractive index detector per unit loaded mass.

Based on a relation between limiting viscosities obtained by the viscometer and absolute molecular weights obtained by the light scattering light detector, parameters $g'_1$ of the long-chain branches were calculated for respective eluted components by using Formula (v-1),

[number 1]

$$g'^i = \frac{[\eta]^{i,br}}{[\eta]^{i,lin}} \quad (v-1)$$

$[\eta]^{i,br}$: intrinsic viscosity of the $i$-th sliced component $[\eta]^{i,lin}$: intrinsic viscosity in the case that $i$-th sliced component does not have a long-chain branching structure and has only a short-chain branching structure where the relation $[\eta] = KM^v$ with v=0.725 was used.

Average values each represented by the following g's were calculated by using Formulae (v-2), (v-3), and (v-4). Trend lines based on the assumption of the existence of only short-chain branches were determined for respective samples.

[number 2]

$$\text{number average long-chain branching parameter} \quad g'^n = \frac{\Sigma(C^i/M^i \times g'^i)}{\Sigma(C^i/M^i)} \quad (v-2)$$

$$\text{weight average long-chain branching parameter} \quad g'^w = \frac{\Sigma(C^i \times g'^i)}{\Sigma C^i} \quad (v-3)$$

$$\text{z-averaged long-chain branching parameter} \quad g'^z = \frac{\Sigma(C^i \times M^{i2} \times g'^i)}{\Sigma(C^i \times M^{i2})} \quad (v-4)$$

$C^i$: concentration for respective eluted components $M^i$: absolute molecular weight for respective eluted components In addition, the g'w, was used to calculate the number of branch points per molecular chain BrNo, the number of long-chain branches per 1000 carbons $LCB_{1000C}$, and the degree of branching per unit molecular weight λ. Zimm-Stockmayer Formula (v-5) was used to calculate BrNo, and Formulae (v-6) and (v-7) were used to calculate $LCB_{1000C}$ and λ. The g is a long-chain branching parameter obtained from radius of the gyration Rg, and is supposed to have the following simple correlation with g' obtained from intrinsic viscosity. According to structures of a molecule, various values are proposed for ε in the formula. Herein, ε=1 (i.e. g'=g) was supposed for calculation.

[number 3]

$$g'^w = \frac{1}{\sqrt{\sqrt{1+BrNo/7}+4\times BrNo/9\pi}} \quad \text{(V-5)}$$

$$\lambda = BrNO/M \quad \text{(V-6)}$$

$$LCB_{1000C} = \lambda \times 14000 \quad \text{(V-7)}$$

In the Formula (V-7), the value of 14000 indicates the molecular weight of 1000 methylene ($CH_2$) units.

The ethylene/α-olefin/non-conjugated polyene copolymer of the invention has an intrinsic viscosity [η] within the range preferably from 0.1 to 5 dL/g, more preferably from 0.5 to 5.0 dL/g, and still preferably from 0.9 to 4.0 dL/g.

Further, the ethylene/α-olefin/non-conjugated polyene copolymer of the invention has a weight-average molecular weight (Mw) within the range of preferably from 10,000 to 600,000, more preferably from 30,000 to 500,000, and still preferably from 50,000 to 400,000.

The ethylene/α-olefin/non-conjugated polyene copolymer of the invention preferably satisfies the above intrinsic viscosity [η] and the above weight-average molecular weight (Mw) simultaneously.

The ethylene/α-olefin/non-conjugated polyene copolymer of the invention has a non-conjugated polyene (C) preferably containing VNB, and more preferably being VNB. In other words, in Formulae (1), (2), and Formula (4), "weight fraction of (C)" is preferably "weight fraction of VNB" (% by weight).

The ethylene/α-olefin/non-conjugated polyene copolymer of the invention also preferably contains, in addition to the structural units derived from (A), (B), and (C), as described above, a structural unit derived from a non-conjugated polyene (D) containing intramolecularly only one partial structure selected from the group consisting of the structures of Formulae (I) and (II), in a weight fraction within the range from 0% by weight to 20% by weight (with the proviso that the sum of the weight fractions of (A), (B), (C), and (D) is 100% by weight). In this case, the following requirement (vi) is preferably satisfied.

(Requirement (vi))

The weight-average molecular weight (Mw) of the ethylene/α-olefin/non-conjugated polyene copolymer, the weight fraction of the structural unit derived from the non-conjugated polyene (C) (the weight fraction of (C) (% by weight)), the weight fraction of the structural unit derived from the non-conjugated polyene (D) (weight fraction of (D) (% by weight)), the molecular weight of the non-conjugated polyene (C) (molecular weight of (C)), and the molecular weight of the non-conjugated polyene (D) (molecular weight of (D)) satisfy Formula (4), 4.5≤Mw×[(weight fraction of (C)/100/molecular weight of (C))+(weight fraction of (D)/100/molecular weight of (D))]≤45    Formula (4).

The Formula (4) specifies the content of the non-conjugated diene in one molecule of the copolymer (sum of (C) and (D)).

When the ethylene/α-olefin/non-conjugated polyene copolymer containing the structure unit derived from the above (D) satisfies Formula (4), shaped articles obtained from the ethylene/α-olefin/non-conjugated polyene copolymer are preferable because of they are excellent in mechanical physical properties and heat aging resistance.

When the requirement (vi) is not satisfied and "Mw×{(weight fraction of (C)/100/(molecular weight of (C))+ ((weight fraction of (D)/100/(molecular weight of (D))}" is too small in Formula (4), in other words, the content of the non-conjugated diene is too small, crosslinking may not be enough to obtain sufficient mechanical physical properties, and in contrast, when the content of the non-conjugated diene is too large, crosslinking may be excessive, causing worsening of the mechanical physical properties and even of heat aging resistance.

(Requirement (vii))

The ethylene/α-olefin/non-conjugated polyene copolymer of the invention preferably has a complex viscosity $\eta^*_{(\omega=0.01)}$ (Pa·sec) at a frequency of ω=0.01 rad/s and a complex viscosity $\eta^*_{(\omega=10)}$ (Pa·sec) at a frequency of ω=10 rad/s, obtained by linear viscoelastic measurement (190° C.) by using a rheometer, and an apparent iodine value derived from the non-conjugated polyene (C) which satisfy, but are not particularly limited to, Formula (5), Log {$\eta^*_{(\omega=0.01)}$}/Log {$\eta^*_{(\omega=10)}$}≤0.0753×{apparent iodine value originated from non-conjugated polyene (C)}+1.42    Formula (5), where the complex viscosity $\eta^*_{(\omega=0.01)}$ and the complex viscosity $\eta^*_{(\omega=10)}$ are obtained in the same manner as in the case of the complex viscosity $\eta^*_{(\omega=0.1)}$ and the complex viscosity $\eta^*_{(\omega=100)}$ in the requirement (vi) except the measurement frequencies.

The apparent iodine value derived from the non-conjugated polyene (C) is obtained from following formula, apparent iodine value derived from (C)=weight fraction of (C)×253.81/molecular weight of (C).

In Formula (5), the left side represents shear speed dependence, which is an index of long-chain branch amount, and the right side represents an index of the content of the non-conjugated polyene (C) which is not consumed as long-chain branches during polymerization. It is preferable to satisfy the requirement (vii) and Formula (5) because the degree of long-chain branching is not too high. In contrast, when Formula (5) is not satisfied, it is easily understood that a large fraction of the copolymerized non-conjugated polyene (C) is consumed for the formation of long-chain branches.

Further, the ethylene/α-olefin/non-conjugated polyene copolymer of the invention preferably contains a sufficient amount of the structural unit derived from the non-conjugated polyene (C), and the weight fraction of the structural unit derived from the non-conjugated polyene (C) in the copolymer (weight fraction of (C) (% by weight)) and the weight-average molecular weight (Mw) of the copolymer preferably satisfy the Formula (6), 6−0.45×Ln(Mw)≤weight fraction of (C)≤10    Formula (6)

In addition, the ethylene/α-olefin/non-conjugated polyene copolymer of the invention has the number of the structural units derived from the non-conjugated polyene (C) per weight-average molecular weight (Mw), represented by ($n_C$), which is preferably 6 or more, more preferably 6 or more and 40 or less, still preferably 7 or more and 39 or less, and even preferably 10 or more and 38 or less.

Such an ethylene/α-olefin/non-conjugated polyene copolymer of the invention contains a sufficient number of structural units derived from a non-conjugated polyene (C) such as VNB and a small long-chain branch content, and is excellent not only in curing properties when crosslinked by using peroxide but also in formability, and moreover, it is well balanced between physical properties such as mechanical properties and excellent particularly in heat aging resistance.

Further, the ethylene/α-olefin/non-conjugated polyene copolymer of the invention has the number of the structural units derived from the non-conjugated polyene (D) per weight-average molecular weight (Mw), represented by ($n_D$), being preferably 29 or less, more preferably 10 or less, still preferably less than one.

Such an ethylene/α-olefin/non-conjugated polyene copolymer of the invention is preferable not only because the number of the structural units derived from a non-conjugated polyene (D) such as ENB is controlled within the range not harmful to the purpose of the invention but also because the copolymer is unlikely to cause post-crosslinking and sufficient in heat aging resistance.

The number of structural units derived from the non-conjugated polyene (C), represented by ($n_C$), or the number of structural units derived from the non-conjugated polyene (D), represented by ($n_D$), per weight-average molecular weight (Mw) of the ethylene/α-olefin/non-conjugated polyene copolymer can be obtained by using the following formula, from the molecular weight of the non-conjugated polyene (C) or (D), the weight fraction of the structural unit derived from the non-conjugated polyene (C) or (D) in the copolymer (weight fraction of (C) or (D) (% by weight)), and the weight-average molecular weight (Mw) of the copolymer, ($n_C$)=(Mw)×{(weight fraction of (C))/100}/molecular weight of non-conjugated polyene (C), ($n_D$)=(Mw)×{weight fraction of (D)/100}/molecular weight of non-conjugated polyene (D).

When the ethylene/α-olefin/non-conjugated polyene copolymer of the invention satisfies the numbers of the structural units ($n_C$) and ($n_D$) respectively derived from the non-conjugated polyenes (C) and (D) per a weight-average molecular weight (Mw) fall within the above described ranges, the copolymer is preferable because it has a small long-chain branch content, with excellent curing properties when crosslinked by using peroxide and good formability, and moreover, because it is well balanced between physical properties such as mechanical properties, unlikely to cause post-crosslinking, and particularly excellent in heat aging resistance.

<Production of Ethylene/α-Olefin/Non-Conjugated Polyene Copolymer>

The ethylene/α-olefin/non-conjugated polyene copolymer of the invention is a copolymer obtained by copolymerizing monomers consisting of ethylene (A), an α-olefin (B) of 3 to 20 carbon atoms, a non-conjugated polyene (C) containing intramolecularly two or more partial structures in total selected from the group consisting of the structures of Formulae (I) and (II), and as necessary, a non-conjugated polyene (D) containing intramolecularly only one partial structure selected from the group consisting of the structures of Formula (I) and (II).

Although the ethylene/α-olefin/non-conjugated polyene copolymer of the invention may be prepared by any process so long as the above requirements (i) to (v) are satisfied, those obtained by copolymerizing monomers in the presence of a metallocene compound are preferable, and those obtained by copolymerizing monomers in the presence of a catalyst system containing a metallocene compound is more preferable.

Metallocene Compound

The ethylene/α-olefin/non-conjugated polyene copolymer of the invention is desirably obtained by copolymerizing monomers in the presence of at least one kind of metallocene compound selected from compounds represented by Formula [A1]. The ethylene/α-olefin/non-conjugated polyene copolymer of the invention satisfying the above requirements, with long-chain branching of the yielded copolymer suppressed, can be readily prepared by monomer copolymerization using a catalyst system containing such a metallocene compound.

[Chem. 6]

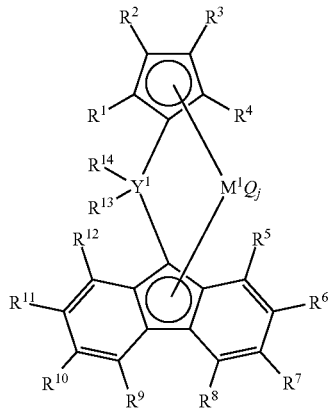

[A1]

In Formula [A1], $R^1$, $R^2$, $R^3$, $R^4$, $R^5$, $R^8$, $R^9$, and $R^{12}$ are each independently a hydrogen atom, a hydrocarbon group, a silicon-containing group, or a heteroatom-containing group other than any silicon-containing group, and among $R^1$ to $R^4$ adjacent two groups may together form a ring.

The hydrocarbon group is preferably a hydrocarbon group of 1 to 20 carbons, and specific examples thereof include an alkyl group of 1 to 20 carbons, an arylalkyl group of 7 to 20 carbons, an aryl group of 6 to 20 carbon atoms, and a substituted aryl group, and so on. For example, they include methyl, ethyl, n-propyl, isopropyl, allyl, n-butyl, iso-butyl, sec-butyl, t-butyl, amyl, n-pentyl, neopentyl, n-hexyl, n-heptyl, n-octyl, n-nonyl, n-decanyl, 3-methylpentyl, 1,1-diethylpropyl, 1,1-dimethylbutyl, 1-methyl-1-propyl butyl, 1,1-propyl butyl, 1,1-dimethyl-2-methyl propyl, 1-methyl-1-isopropyl-2-methyl propyl, cyclopentyl, cyclohexyl, cycloheptyl, cyclooctyl, norbornyl, adamantyl, phenyl, o-tolyl, m-tolyl, p-tolyl, xylyl, isopropylphenyl, t-butylphenyl, naphthyl, biphenyl, terphenyl, phenanthryl, anthracenyl, benzyl, and cumyl groups, and also include oxygen-containing groups, such as methoxy, ethoxy, and phenoxy groups, nitrogen-containing groups, such as nitro, cyano, N-methylamino, N,N-dimethylamino, and N-phenylamino groups, boron-containing groups, such as boranetriyl, and diboranyl groups, sulfur-containing groups, such as sulfonyl, and sulphenyl groups.

The above hydrocarbon groups may have a hydrogen atom substituted by a halogen atom, and examples thereof include, for example, trifluoromethyl, trifluoromethylphenyl, pentafluorophenyl, and chlorophenyl groups.

Examples of the silicon-containing group include silyl, siloxy, hydrocarbon-substituted silyl, and hydrocarbon-substituted siloxy groups. For example, they include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl, dimethyl(pentafluorophenyl)silyl groups, and so on.

$R^6$ and $R^{11}$ are the same atom or the same group selected from a hydrogen atom, a hydrocarbon group, a silicon-containing group, and a heteroatom-containing group other than any silicon-containing group, $R^7$ and $R^{10}$ are the same atom or the same group selected from a hydrogen atom, a hydrocarbon group, a silicon-containing group, and a heteroatom-containing group other than any silicon-containing group, $R^6$ and $R^7$ may together form a ring, and $R^{10}$ and $R^{11}$ may together form a ring. However, all of $R^6$, $R^7$, $R^{10}$, and $R^{11}$ are not a hydrogen atom simultaneously.

$R^{13}$ and $R^{14}$ each independently represent an aryl group.

$M^1$ represents a zirconium atom.

$Y^1$ represents a carbon atom or a silicon atom.

Q represents a halogen atom, a hydrocarbon group, a halogenated hydrocarbon group, a neutral conjugated or non-conjugated diene of 4 to 20 carbon atoms, and a neutral ligand coordinatable by an anionic ligand or a lone pair, and j represents integer from of 1 to 4, and when j is an integer of 2 or more a plurality of Qs may be the same or different from each other.

Examples of the halogen atom include a fluorine atom, a chlorine atom, a bromine atom, and an iodine atom, and the chlorine atom is preferable.

The hydrocarbon groups are preferably those of 1 to 10 carbons, and specific examples thereof include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, t-butyl, 1,1-dimethylbutyl, 1,1,3-trimethylbutyl, neopentyl, cyclohexylmethyl, cyclohexyl, 1-methyl-1-cyclohexyl, benzyl groups, and so on, and methyl, ethyl, and benzyl groups are preferable.

The neutral conjugated or non-conjugated diene of 4 to 20 carbon atoms is preferably a neutral conjugated or non-conjugated diene of 4 to 10 carbons. Specific examples of the neutral conjugated or non-conjugated diene include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditoryl-1,3-butadiene, s-cis- or s-trans-$\eta^4$-1,4-bis(trimethylsilyl)-1,3-butadiene, and so on.

Specific examples of the anionic ligand include alkoxy groups, such as methoxy, t-butoxy, and phenoxy groups, carboxylate groups, such as acetate and benzoate groups, sulfonate groups, such as mesylate and tosylate groups, and so on.

Specific examples of the neutral ligand coordinatable by a lone pair include organic phosphorus compounds, such as trimethylphosphine, triethylphosphine, triphenylphosphine, and diphenylmethylphosphine, or ethers, such as tetrahydrofuran, diethylether, dioxane, and 1,2-dimethoxyethane.

Examples of the cyclopentadienyl group having substituents from $R^1$ to $R^4$ in Formula [A1] include, but are not limited to, non-substituted cyclopentadienyl groups having substituents from $R^1$ to $R^4$ which are a hydrogen atom, cyclopentadienyl groups monosubstituted at position 3, such as 3-t-butylcyclopentadienyl, 3-methylcyclopentadienyl, 3-trimethylsilylcyclopentadienyl, 3-phenylcyclopentadienyl, 3-adamantylcyclopentadienyl, 3-amylcyclopentadienyl, and 3-cyclohexylcyclopentadienyl groups, and cyclopentadienyl groups disubstituted at positions 3 and 5, such as 3-t-butyl-5-methylcyclopentadienyl, 3-t-butyl-5-ethylcyclopentadienyl, 3-phenyl-5-methylcyclopentadienyl, 3,5-di-t-butylcyclopentadienyl, 3,5-dimethylcyclopentadienyl, 3-phenyl-5-methylcyclopentadienyl, and 3-trimethylsilyl-5-methylcyclopentadienyl groups. The non-substituted cyclopentadienyl groups ($R^1$ to $R^4$ are a hydrogen atom) are preferable from the viewpoint of easiness to synthesize metallocene compounds, and their production cost and copolymerization ability for non-conjugated polyenes.

Examples of a fluorenyl group having the substituents from $R^5$ to $R^{12}$ in Formula [A1] include, but are not limited to, non-substituted fluorenyl groups having substituents from $R^5$ to $R^{12}$ which are a hydrogen atom, fluorenyl groups monosubstituted at position 2, such as 2-methylfluorenyl, 2-t-butylfluorenyl, and 2-phenylfluorenyl groups, fluorenyl groups monosubstituted at position 4, such as 4-methylfluorenyl, 4-t-butylfluorenyl, and 4-phenylfluorenyl groups, or fluorenyl groups disubstituted at positions 2 and 7 or 3 and 6, such as 2,7-di-t-butylfluorenyl, and 3,6-di-t-butyl fluorenyl groups, fluorenyl groups tetrasubstituted at positions 2, 3, 6, and 7, such as 2,7-dimethyl-3,6-di-t-butylfluorenyl, and 2,7-diphenyl-3,6-di-t-butylfluorenyl groups, or fluorenyl groups tetrasubstituted at positions 2, 3, 6, and 7 in which $R^6$ together with $R^7$ and $R^{10}$ together with $R^{11}$ each form a ring, as represented by Formulae [V-I] and [V-II],

[Chem. 7]

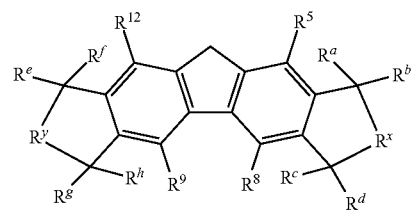

[V-I]

[Chem. 8]

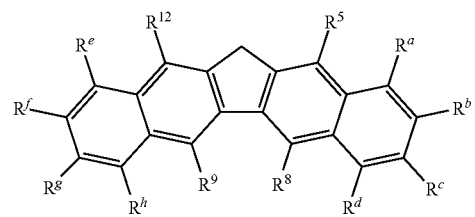

[V-II]

In Formulae [V-I] and [V-II], $R^5$, $R^8$, $R^9$, and $R^{12}$ are the same as the definitions in Formula [A1], $R^a$, $R^b$, $R^c$, $R^d$, $R^e$, $R^f$, $R^g$, and $R^h$ are each independently a hydrogen atom or an alkyl group of 1 to 5 carbons, and each may bond to an adjacent substituent to form a ring. The alkyl groups are specifically exemplified by methyl, ethyl, n-propyl, isopropyl, n-butyl, t-butyl, amyl, and n-pentyl groups. In the Formula [V-I], $R^x$ and $R^y$ are each independently a hydrocarbon group of 1 to 3 carbons which may have an unsaturated bond, $R^x$ may form a double-bond together with carbon to which $R^a$ or $R^c$ bonds, $R^y$ may form a double-bond together with carbon to which $R^e$ or $R^g$ bonds, and $R^x$ and $R^y$ are both preferably a saturated or unsaturated hydrocarbon group of one to two carbons.

Specific examples of the compounds represented by Formula [V-I] or [V-II] include octamethyloctahydrodibenzofluorenyl group represented by Formula [V-III], tetramethyldodecahydrodibenzofluorenyl group represented by Formula [V-IV], octamethyltetrahydrodicyclopentafluorenyl group represented by Formula [V-V], hexamethyldihydrodicyclopentafluorenyl group represented by Formula [V-VI], and b,h-dibenzofluorenyl group represented by Formula [V-VII].

[Chem. 9]

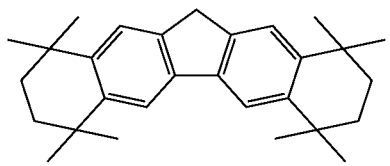

[V-III]

[Chem. 10]

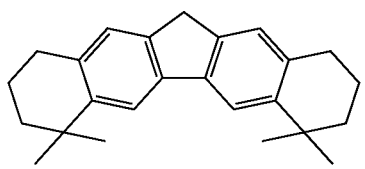

[V-IV]

[Chem. 11]

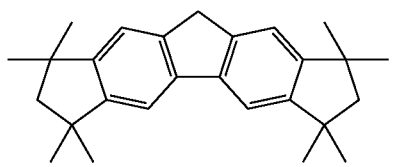

[V-V]

[Chem. 12]

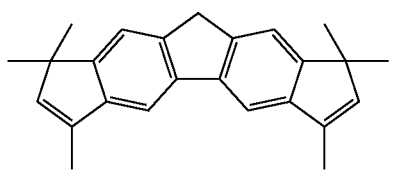

[V-VI]

[Chem. 13]

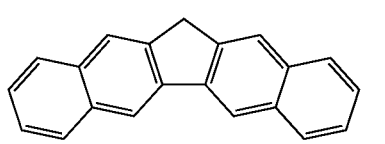

[V-VII]

A metallocene compound containing any of these fluorenyl groups and represented by Formula [A1] is excellent in copolymerization ability for non-conjugated polyene, and when $Y^1$ is a silicon atom, transition metal compounds are particularly excellent which have any of a fluorenyl group disubstituted at positions 2 and 7, a fluorenyl group disubstituted at positions 3 and 6, a fluorenyl group tetrasubstituted at positions 2, 3, 6, and 7, and a fluorenyl group tetrasubstituted at positions 2, 3, 6, and 7 represented by Formula [V-I]. When Y is a carbon atom, metallocene compounds are particularly excellent which have any of a non-substituted fluorenyl group in which $R^5$ to $R^{12}$ are a hydrogen atom, a fluorenyl group tetrasubstituted at positions 3 and 6, a fluorenyl group tetrasubstituted at positions 2, 3, 6, and 7, and a fluorenyl group tetrasubstituted at position 2, 3, 6, and 7 represented by Formula [V-I].

In the present invention, in the metallocene compound represented by Formula [A1], when $Y^1$ is a silicon atom, with all substituents from $R^5$ to $R^{12}$ being hydrogen atoms, $R^{13}$ and $R^{14}$ are preferably selected from groups other than methyl, butyl, phenyl, silicon-substituted phenyl, cyclohexyl, and benzyl groups;

when $Y^1$ is a silicon atom, with both $R^6$ and $R^{11}$ being t-butyl group, and $R^5$, $R^7$, $R^8$, $R^9$, $R^{10}$, and $R^{12}$ not being t-butyl group, $R^{13}$ and $R^{14}$ are preferably selected from groups other than benzyl group, and silicon-substituted phenyl group;

when $Y^1$ is a carbon atom, with all substituents from $R^5$ to $R^{12}$ being a hydrogen atom, $R^{13}$ and $R^{14}$ are preferably selected from groups other than methyl, isopropyl, t-butyl, isobutyl, phenyl, p-t-butylphenyl, p-n-butylphenyl, silicon-substituted phenyl, 4-biphenyl, p-tolyl, naphthyl, benzyl, cyclopentyl, cyclohexyl, and xylyl groups;

when $Y^1$ is a carbon atom, with $R^6$ and $R^{11}$ being the same group selected from t-butyl, methyl, and phenyl groups, and being a different group or atom from $R^5$, $R^7$, $R^8$, $R^9$, $R^{10}$, and $R^{12}$, $R^{13}$ and $R^{14}$ are preferably selected from groups other than methyl, phenyl, p-t-butylphenyl, p-n-butylphenyl, silicon-substituted phenyl, and benzyl groups;

when $Y^1$ is a carbon atom, with $R^6$ being dimethylamino, methoxy, or methyl group, and $R^5$, $R^7$, $R^8$, $R^9$, $R^{10}$, $R^{11}$, and $R^{12}$ being a different group or atom from $R^6$, $R^{13}$ and $R^{14}$ are preferably selected from groups other than methyl and phenyl groups;

when $Y^1$ is a carbon atom, and sites constituted by a fluorenyl group and substituents from $R^5$ to $R^{12}$ are b,h-dibenzofluorenyl or a,i-dibenzofluorenyl groups, $R^{13}$ and $R^{14}$ are preferably selected from groups other than methyl and phenyl groups.

Although specific examples of the metallocene compound represented by Formula [A1] in the present invention are exemplified below, the scope of the invention is not particularly limited thereby.

Specific examples of the metallocene compound represented by the Formula [A1] in the invention include, when Y is a silicon atom, diphenylsilylene(cyclopentadienyl) (2,7-di-t-butylfluorenyl) zirconium dichloride, diphenylsilylene(cyclopentadienyl) (3,6-di-t-butylfluorenyl) zirconium dichloride, diphenylsilylene(cyclopentadienyl)(2,7-dimethyl-3,6-di-t-butylfluorenyl)zirconium dichloride, diphenylsilylene(cyclopentadienyl)(2,7-diphenyl-3,6-di-t-butylfluorenyl)zirconium dichloride, diphenylsilylene(cyclopentadienyl)(octamethyloctahydrodibenzofluorenyl)zirconium dichloride, diphenylsilylene(cyclopentadienyl)(tetramethyldodecahydrobenzofluorenyl)zirconium dichloride, diphenylsilylene(cyclopentadienyl)(octamethyltetrahydrodicyclopentafluorenyl)zirconium dichloride, diphenylsilylene(cyclopentadienyl)(hexamethyldihydrodicyclopentafluorenyl)zirconium dichloride, diphenylsilylene(cyclopentadienyl)(b,h-dibenzofluorenyl) zirconium dichloride, di(p-tolyl)silylene(cyclopentadienyl)(fluorenyl)zirconium dichloride, di(p-tolyl)silylene(cyclopentadienyl)(2,7-di-t-butylfluorenyl)zirconium dichloride, di(p-tolyl)silylene(cyclopentadienyl)(3,6-di-t-butylfluorenyl)zirconium dichloride, di(p-tolyl)silylene(cyclopentadienyl)(2,7-dimethyl-3,6-di-t-butylfluorenyl)zirconium dichloride, di(p-tolyl)silylene(cyclopentadienyl)(2,7-diphenyl-3,6-di-t-butylfluorenyl)zirconium dichloride,
di(p-tolyl)silylene(cyclopentadienyl)(octamethyloctahydrodibenzofluorenyl)zirconium dichloride,
di(p-tolyl)silylene(cyclopentadienyl)(tetramethyldodecahydrobenzofluorenyl)zirconium dichloride,
di(p-tolyl)silylene(cyclopentadienyl)(octamethyltetrahydrodicyclopentafluorenyl)zirconium dichloride,
di(p-tolyl)silylene(cyclopentadienyl)(hexamethyldihydrodicyclopentafluorenyl)zirconium dichloride,
di(p-tolyl)silylene(cyclopentadienyl)(b,h-dibenzofluorenyl)zirconium dichloride,
di(m-tolyl)silylene(cyclopentadienyl)(fluorenyl)zirconium dichloride,
di(m-tolyl)silylene(cyclopentadienyl)(2,7-di-t-butylfluorenyl)zirconium dichloride,
di(m-tolyl)silylene(cyclopentadienyl)(3,6-di-t-butylfluorenyl)zirconium dichloride,
di(m-tolyl)silylene(cyclopentadienyl)(2,7-dimethyl-3,6-di-t-butylfluorenyl)zirconium dichloride,
di(m-tolyl)silylene(cyclopentadienyl)(2,7-diphenyl-3,6-di-t-butylfluorenyl)zirconium dichloride,
di(m-tolyl)silylene(cyclopentadienyl)(octamethyloctahydrodibenzofluorenyl)zirconium dichloride,
di(m-tolyl)silylene(cyclopentadienyl)(tetramethyldodecahydrobenzofluorenyl)zirconium dichloride,
di(m-tolyl)silylene(cyclopentadienyl)(octamethyltetrahydrodicyclopentafluorenyl)zirconium dichloride,
di(m-tolyl)silylene(cyclopentadienyl)(hexamethyldihydrodicyclopentafluorenyl)zirconium dichloride,
di(m-tolyl)silylene(cyclopentadienyl)(b,h-dibenzofluorenyl)zirconium dichloride, and so on.

When Y is a carbon atom, they include
diphenylmethylene(cyclopentadienyl)(3,6-di-t-butylfluorenyl)zirconium dichloride,
diphenylmethylene(cyclopentadienyl)(2,7-dimethyl-3,6-di-t-butylfluorenyl)zirconium dichloride,
diphenylmethylene(cyclopentadienyl)(2,7-diphenyl-3,6-di-t-butylfluorenyl)zirconium dichloride,
diphenylmethylene(cyclopentadienyl)(octamethyloctahydrodibenzofluorenyl)zirconium dichloride,
diphenylmethylene(cyclopentadienyl)(tetramethyldodecadihydrobenzofluorenyl)zirconium dichloride,
diphenylmethylene(cyclopentadienyl)(octamethyltetrahydrodicyclopentafluorenyl)zirconium dichloride,
diphenylmethylene(cyclopentadienyl)(hexamethyldihydrodicyclopentafluorenyl)zirconium dichloride,
diphenylmethylene(cyclopentadienyl)(b,h-dibenzofluorenyl)zirconium dichloride,
di(p-tolyl)methylene(cyclopentadienyl)(2,7-di-t-butylfluorenyl)zirconium dichloride,
di(p-tolyl)methylene(cyclopentadienyl)(3,6-di-t-butylfluorenyl)zirconium dichloride,
di(p-tolyl)methylene(cyclopentadienyl)(2,7-dimethyl-3,6-di-t-butylfluorenyl)zirconium dichloride,
di(p-tolyl)methylene(cyclopentadienyl)(2,7-diphenyl-3,6-di-t-butylfluorenyl)zirconium dichloride,
di(p-tolyl)methylene(cyclopentadienyl)(octamethyloctahydrodibenzofluorenyl)zirconium dichloride,
di(p-tolyl)methylene(cyclopentadienyl)(tetramethyldodecahydrobenzofluorenyl)zirconium dichloride,
di(p-tolyl)methylene(cyclopentadienyl)(octamethyltetrahydrodicyclopentafluorenyl)zirconium dichloride,
di(p-tolyl)methylene(cyclopentadienyl)(hexamethyldihydrodicyclopentafluorenyl)zirconium dichloride,
di(p-tolyl)methylene(cyclopentadienyl)(b,h-dibenzofluorenyl)zirconium dichloride,
di(m-tolyl)methylene(cyclopentadienyl)(fluorenyl)zirconium dichloride,
di(m-tolyl)methylene(cyclopentadienyl)(2,7-di-t-butylfluorenyl)zirconium dichloride,
di(m-tolyl)methylene(cyclopentadienyl)(3,6-di-t-butylfluorenyl)zirconium dichloride,
di(m-tolyl)methylene(cyclopentadienyl)(2,7-dimethyl-3,6-di-t-butylfluorenyl)zirconium dichloride,
di(m-tolyl)methylene(cyclopentadienyl)(2,7-diphenyl-3,6-di-t-butylfluorenyl)zirconium dichloride,
di(m-tolyl)methylene(cyclopentadienyl)(octamethyloctahydrodibenzofluorenyl)zirconium dichloride,
di(m-tolyl)methylene(cyclopentadienyl)(tetramethyldodecahydrobenzofluorenyl)zirconium dichloride,
di(m-tolyl)methylene(cyclopentadienyl)(octamethyltetrahydrodicyclopentafluorenyl)zirconium dichloride,
di(m-tolyl)methylene(cyclopentadienyl)(hexamethyldihydrodicyclopentafluorenyl)zirconium dichloride,
di(m-tolyl)methylene(cyclopentadienyl)(b,h-dibenzofluorenyl)zirconium dichloride,
di(p-t-butylphenyl)methylene(cyclopentadienyl)(3,6-di-t-butylfluorenyl)zirconium dichloride,
di(p-t-butylphenyl)methylene(cyclopentadienyl)(2,7-dimethyl-3,6-di-t-butylfluorenyl)zirconium dichloride,
di(p-t-butylphenyl)methylene(cyclopentadienyl)(2,7-diphenyl-3,6-di-t-butylfluorenyl)zirconium dichloride,
di(p-t-butylphenyl)methylene(cyclopentadienyl)(octamethyloctahydrodibenzofluorenyl)zirconium dichloride,
di(p-t-butylphenyl)methylene(cyclopentadienyl)(tetramethyldodecahydrodibenzofluorenyl)zirconium dichloride,
di(p-t-butylphenyl)methylene(cyclopentadienyl)(octamethyltetrahydrodicyclopentafluorenyl)zirconium dichloride,
di(p-t-butylphenyl)methylene(cyclopentadienyl)(hexamethyldihydrodicyclopentafluorenyl)zirconium dichloride,
di(p-t-butylphenyl)methylene(cyclopentadienyl)(b,h-dibenzofluorenyl)zirconium dichloride,
di(4-biphenyl)methylene(cyclopentadienyl)(2,7-di-t-butylfluorenyl)zirconium dichloride,
di(4-biphenyl)methylene(cyclopentadienyl)(3,6-di-t-butylfluorenyl)zirconium dichloride,
di(4-biphenyl)methylene(cyclopentadienyl)(2,7-dimethyl-3,6-di-t-butylfluorenyl)zirconium dichloride,
di(4-biphenyl)methylene(cyclopentadienyl)(2,7-diphenyl-3,6-di-t-butylfluorenyl)zirconium dichloride,
di(4-biphenyl)methylene(cyclopentadienyl)(octamethyloctahydrodibenzofluorenyl)zirconium dichloride,
di(4-biphenyl)methylene(cyclopentadienyl)(tetramethyldodecahydrodibenzofluorenyl)zirconium dichloride,
di(4-biphenyl)methylene(cyclopentadienyl)(octamethyltetrahydrodicyclopentafluorenyl)zirconium dichloride,
di(4-biphenyl)methylene(cyclopentadienyl)(hexamethyldihydrodicyclopentafluorenyl)zirconium dichloride,
di(4-biphenyl)methylene(cyclopentadienyl)(b,h-dibenzofluorenyl)zirconium dichloride,
di(p-chlorophenyl)methylene(cyclopentadienyl)(fluorenyl)zirconium dichloride,
di(p-chlorophenyl)methylene(cyclopentadienyl)(2,7-di-t-butylfluorenyl)zirconium dichloride,
di(p-chlorophenyl)methylene(cyclopentadienyl)(3,6-di-t-butylfluorenyl)zirconium dichloride,
di(p-chlorophenyl)methylene(cyclopentadienyl)(2,7-dimethyl-3,6-di-t-butylfluorenyl)zirconium dichloride,
di(p-chlorophenyl)methylene(cyclopentadienyl)(2,7-diphenyl-3,6-di-t-butylfluorenyl)zirconium dichloride,
di(p-chlorophenyl)methylene(cyclopentadienyl)(octamethyloctahydrodibenzofluorenyl)zirconium dichloride, di(p-chlorophenyl)methylene(cyclopentadienyl)(tetramethyldodecahydrodibenzofluorenyl)zirconium dichloride,
di(p-chlorophenyl)methylene(cyclopentadienyl)(octamethyltetrahydrodicyclopentafluorenyl)zirconium dichloride,
di(p-chlorophenyl)methylene(cyclopentadienyl)(hexamethyldihydrodicyclopentafluorenyl)zirconium dichloride,
di(p-chlorophenyl)methylene(cyclopentadienyl)(b,h-dibenzofluorenyl)zirconium dichloride,
di(m-chlorophenyl)methylene(cyclopentadienyl)(fluorenyl)zirconium dichloride,
di(m-chlorophenyl)methylene(cyclopentadienyl)(2,7-di-t-butylfluorenyl)zirconium dichloride,
di(m-chlorophenyl)methylene(cyclopentadienyl)(3,6-di-t-butylfluorenyl)zirconium dichloride,
di(m-chlorophenyl)methylene(cyclopentadienyl)(2,7-dimethyl-3,6-di-t-butylfluorenyl)zirconium dichloride,
di(m-chlorophenyl)methylene(cyclopentadienyl)(2,7-diphenyl-3,6-di-t-butylfluorenyl)zirconium dichloride,
di(m-chlorophenyl)methylene(cyclopentadienyl)(octamethyloctahydrodibenzofluorenyl)zirconium dichloride,
di(m-chlorophenyl)methylene(cyclopentadienyl)(tetramethyldodecahydrodibenzofluorenyl)zirconium dichloride,
di(m-chlorophenyl)methylene(cyclopentadienyl)(octamethyltetrahydrodicyclopentafluorenyl)zirconium dichloride,
di(m-chlorophenyl)methylene(cyclopentadienyl)(hexamethyldihydrodicyclopentafluorenyl)zirconium dichloride,
di(m-chlorophenyl)methylene(cyclopentadienyl)(b,h-dibenzofluorenyl)zirconium dichloride,
di(m-trifluoromethylphenyl)methylene(cyclopentadienyl)(fluorenyl)zirconium dichloride,
di(m-trifluoromethylphenyl)methylene(cyclopentadienyl)(2,7-di-t-butylfluorenyl)zirconium dichloride,
di(m-trifluoromethylphenyl)methylene(cyclopentadienyl)(3,6-di-t-butylfluorenyl)zirconium dichloride,
di(m-trifluoromethylphenyl)methylene(cyclopentadienyl)(2,7-dimethyl-3,6-di-t-butylfluorenyl)zirconium dichloride,
di(m-trifluoromethylphenyl)methylene(cyclopentadienyl)(2,7-diphenyl-3,6-di-t-butylfluorenyl)zirconium dichloride,
di(m-trifluoromethylphenyl)methylene(cyclopentadienyl)(octamethyloctahydrodibenzofluorenyl)zirconium dichloride,
di(m-trifluoromethylphenyl)methylene(cyclopentadienyl)(tetramethyldodecahydrodibenzofluorenyl)zirconium dichloride,
di(m-trifluoromethylphenyl)methylene(cyclopentadienyl)(octamethyltetrahydrodicyclopentafluorenyl)zirconium dichloride,
di(m-trifluoromethylphenyl)methylene(cyclopentadienyl)(hexamethyldihydrodicyclopentafluorenyl)zirconium dichloride,
di(m-trifluoromethylphenyl)methylene(cyclopentadienyl)(b,h-dibenzofluorenyl)zirconium dichloride,
di(2-naphthyl)methylene(cyclopentadienyl)(2,7-di-t-butylfluorenyl)zirconium dichloride,
di(2-naphthyl)methylene(cyclopentadienyl)(3,6-di-t-butylfluorenyl)zirconium dichloride,
di(2-naphthyl)methylene(cyclopentadienyl)(2,7-dimethyl-3,6-di-t-butylfluorenyl)zirconium dichloride,
di(2-naphthyl)methylene(cyclopentadienyl)(2,7-diphenyl-3,6-di-t-butylfluorenyl)zirconium dichloride,
di(2-naphthyl)methylene(cyclopentadienyl)(octamethyloctahydrodibenzofluorenyl)zirconium dichloride,
di(2-naphthyl)methylene(cyclopentadienyl)(tetramethyldodecahydrodibenzofluorenyl)zirconium dichloride,
di(2-naphthyl)methylene(cyclopentadienyl)(octamethyltetrahydrodicyclopentafluorenyl)zirconium dichloride,
di(2-naphthyl)methylene(cyclopentadienyl)(hexamethyldihydrodicyclopentafluorenyl)zirconium dichloride,
di(2-naphthyl)methylene(cyclopentadienyl)(b,h-dibenzofluorenyl)zirconium dichloride, and so on.

Among these metallocene compounds, exemplary structural formulae of
di(p-tolyl)methylene(cyclopentadienyl)(octamethyloctahydrodibenzofluorenyl)zirconium dichloride ((A) as below) and
di(p-chlorophenyl)methylene(cyclopentadienyl)(octamethyloctahydrodibenzofluorenyl)zirconium dichloride ((B) as below) are depicted as below,

[Chem. 14]

(A)

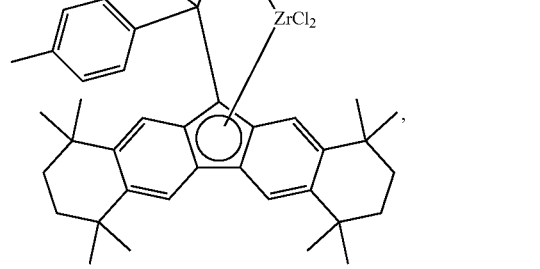

(B)

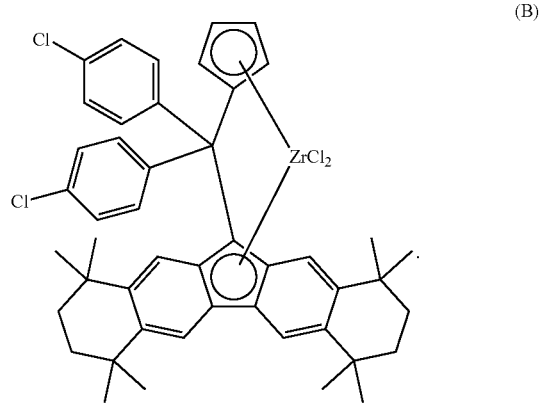

The above compounds may be used singly or in combination of the two or more kinds.

Metallocene compounds represented by Formula [A1] which can be suitably used for preparing the ethylene/α-olefin/non-conjugated polyene copolymer of the invention can be produced by any process without any special limitation. Specifically, they can be produced, for example, in accordance with processes described in J. Organomet. Chem., 63, 509(1996), and WO 2005/100410, WO 2006123759, WO 01/27124, JP-A-2004-168744, JP-A-2004-175759, and JP-A-2000-212194, which are published documents according to the applications by the applicants.

Catalyst Containing Metallocene Compound

Examples of polymerization catalysts which can be suitably used for producing the ethylene/α-olefin/non-conjugated polyene copolymer of the invention include those containing the metallocene compound of [A1] and capable of copolymerizing monomers.

Preferably, examples of the catalysts include those consisting of:
(a) a metallocene compound represented by Formula [A1];
(b) at least one compound selected from (b-1) organometallic compounds, (b-2) organoaluminum oxycompounds, and (b-3) compounds reacting with the metallocene compound (a) to form an ion pair; and as necessary,
(c) a particulate carrier.

Each component will be specifically explained below.
(b-1) Organometallic Compounds Organometallic compounds (b-1) to be used in this invention are an organometallic compound of Groups 1, 2 and 12, 13 specifically represented by Formulae from [VII] to [IX].
(b-1a) Organoaluminum Compounds Represented by $$R^a_m(OR^b)_nH_pX_q \quad \text{Formula [VII]}.$$

(In Formula [VII], $R^a$ and $R^b$ may be the same or different from each other, and represent a hydrocarbon group of 1 to 15 carbon atoms, and preferably of 1 to 4 carbon atoms, X represents a halogen atom, m is a number of $0 < m \leq 3$, n is a number of $0 \leq n < 3$, p is a number of $0 \leq p < 3$, q is a number of $0\ q < 3$, and $m+n+p+q=3$.)

Such compounds can be exemplified by trialkylaluminums, such as trimethylaluminum, triethylaluminum, triisobutylaluminum, and tri-n-octylaluminum, tricycloalkylaluminums, isobutylaluminum dichloride, diethylaluminum chloride, ethylaluminum dichloride, ethylaluminum sesquichloride, methylaluminum dichloride, dimethylaluminum chloride, and diisobutylaluminum hydride.
(b-1b) Complex Alkylated Compounds of a Group 1 Metal and Aluminum Represented by Formula $$M^2AlR^a_4 \quad \text{[VIII]}.$$

(In Formula [VIII], $M^2$ represents Li, Na, or K, $R^a$ is a hydrocarbon group of 1 to 15 carbon atoms, and preferably of 1 to 4 carbon atoms.)

Such compounds can be exemplified by $LiAl(C_2H_5)_4$, $LiAl(C_7H_{15})_4$, and so on.
(b-1c) Dialkyl Compounds Having a Group 2 or Group 12 Metal Represented by General Formula $$R^aR^bM^3 \quad \text{[Ix]}.$$

(In Formula [IX], $R^a$ and $R^b$ may be the same or different from each other, and represent a hydrocarbon group of 1 to 15 carbon atoms, and preferably of 1 to 4 carbon atoms, and $M^3$ is Mg, Zn, or Cd.)

Among the above organometallic compounds (b-1), the organoaluminum compounds, such as triethylaluminum, triisobutylaluminum, and tri-n-octylaluminum are preferable. Such organometallic compounds (b-1) can be used singly or in combination with the two or more kinds.
(b-2) Organoaluminum Oxycompounds The organoaluminum oxycompounds (b-2) to be used in the invention may be previously well-known aluminoxanes, or organoaluminum oxycompounds insoluble into benzene described in JP-A-H2-78687.

Previously well-known aluminoxanes can be produced, for example, by the following processes, and usually obtained as a solution with hydrocarbon medium.
(1) A process which adds an organoaluminum compound such as a trialkylaluminum to a hydrocarbon solution suspending a compound containing adsorbed water or a salt containing crystallization water, such as magnesium chloride hydrate, copper sulfate hydrate, aluminum sulfate hydrate, nickel sulfate hydrate, and cerous chloride hydrate, and allows the adsorbed water or the crystallization water to react with the organoaluminum compound.
(2) A process which directly applies water, ice, or water vapor to an organoaluminum compound such as a trialkylaluminum in a medium such as benzene, toluene, ethyl ether, or tetrahydrofuran.
(3) A process which allows an organotin oxygenate such as dimethyltin oxide and dibutyltin oxide to react with an organoaluminum compound such as a trialkylaluminum in a medium, such as decane, benzene, and toluene.

The aluminoxanes may contain a small amount of an organic metal component. In addition, after a solvent or a non-reacted organoaluminum compound is removed by distillation from a recovered aluminoxane solution, the aluminoxane may be dissolved again or suspended in a poor solvent of aluminoxane.

Specific examples of organoaluminum compounds used for preparing the aluminoxanes include those which are the same as organoaluminum compounds exemplifying (b-1a).

Among them, trialkylaluminums and tricycloalkylaluminums are preferable, and trimethylaluminum and triisobutylaluminum are particularly preferable.

The organoaluminum compounds as above can be used singly or in combination of the two or more kinds.

Benzene-insoluble organoaluminum oxycompounds which are one aspect of the organoaluminum oxycompounds (b-2) used in the invention are preferably those in which the Al component soluble into benzene at 60° C. is usually 10% or less by weight in terms of Al atom with respect to 100% by weight of benzene, preferably 5% or less by weight, and especially preferably 2% or less by weight, and in other words, the organoaluminum oxycompounds are preferably insoluble or poorly soluble into benzene.

Examples of the organoaluminum oxycompounds (b-2) to be used in the invention can include those which contain boron and are represented by Formula [X],

[Chem. 15]

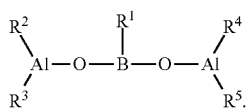

[In the Formula [X], $R^1$ represents a hydrocarbon group of 1 to 10 carbon atoms, substituents from $R^2$ to $R^5$ may be the same or different from each other and represent a hydrogen atom, a halogen atom, or a hydrocarbon group of 1 to 10 carbon atoms.]

Organoaluminum oxycompounds containing boron represented by Formula [X] can be produced by reacting an alkylboronic acid represented by Formula [XI], $$R^1-B(OH)_2 \quad \text{[XI]}$$

(wherein $R^1$ represents the same group as $R^1$ in Formula [X]) with a organoaluminum compound in a nonactive solvent under inert gas atmosphere at a temperature from −80° C. to room temperature for 1 minute to 24 hours.

Specific examples of the alkylboronic acid represented by the Formula [XI] include methylboronic acid, ethylboronic acid, isopropylboronic acid, n-propylboronic acid, n-butylboronic acid, isobutylboronic acid, n-hexyl boronic acid, cyclohexylboronic acid, phenylboronic acid, 3,5-difluorophenylboronic acid, pentafluorophenylboronic acid, and 3,5-bis(trifluoromethyl)phenylboronic acid, and so on.

Among them, methylboronic acid, n-butylboronic acid, isobutylboronic acid, 3,5-difluorophenylboronic acid, and pentafluorophenylboronic acid are preferable. These are used singly or in combination of the two or more kinds.

Specific examples of organoaluminum compounds subjected to reaction with these alkylboronic acids include those which are the same as organoaluminum compounds exemplifying the above (b-1a).

Among them, trialkylaluminums and tricycloalkylaluminums are preferable, and in particular, trimethylaluminum, triethylaluminum, and triisobutylaluminum are preferable. These are used singly or in combination with the two or more kinds. The above organoaluminum oxycompounds (b-2) are used singly or in combination with the two or more kinds.

(b-3) Compounds Reacting with Transition Metal Compound (A) to Form an Ion Pair

Examples of (b-3) compounds reacting with a crosslinked metallocene compound (A) to form an ion pair to be used in the invention (hereinafter referred to as "ionized ionic compounds") can include Lewis acids, ionic compounds, borane compounds, and carborane compounds described in, for example, JP-A-H1-501950, JP-A-H1-502036, JP-A-H3-179005, JP-A-H3-179006, JP-A-H3-207703, JP-A-H3-207704, U.S. Pat. No. 5,321,106, and so on. In addition, they can include heteropolycompounds and isopolycompounds. These ionized ionic compounds (b-3) are used singly or in combination with the two or more kinds.

Specific examples of the Lewis acids can include compounds represented by $BR_3$ (R is fluorine or a phenyl group which may have a substituent, such as fluorine, methyl, and trifluoromethyl groups), such as trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, and tris(3,5-dimethylphenyl)boron.

Examples of the ionic compounds include, for example, compounds represented by Formula [XII],

[Chem. 16]

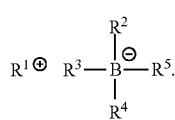

[XII]

(In the Formula [XII], examples of $R^{1+}$ include $H^+$, carbonium cations, oxonium cations, ammonium cations, phosphonium cations, cycloheptyltrienyl cations, and ferrocenium cations having a transition metal. Substituents from $R^2$ to $R^5$ may be the same or different from each other, and are an organic group, preferably an aryl or substituted aryl group.)

Specific examples of the carbonium cations include tri-substituted carbonium cations such as triphenyl carbonium cation, tri(methylphenyl)carbonium cation, tri(dimethylphenyl)carbonium cation, and so on.

Specific examples of the ammonium cations include trialkylammonium cations, such as trimethylammonium cation, triethylammonium cation, tripropylammonium cation, tributylammonium cation, and tri(n-butyl)ammonium cation; N,N-dialkylanilinium cations, such as N,N-dimethylanilinium cation, N,N-diethylanilinium cation, and N,N,2,4,6-pentamethylanilinium cation; and dialkylammonium cations, such as di(isopropyl)ammonium cation and dicyclohexyl ammonium cation.

Specific examples of the phosphonium cations include triarylphosphonium cations, such as triphenylsulfonium cation, tri(methylphenyl)phosphonium cation, and tri(dimethylphenyl)phosphonium cation.

Examples of $R^{1+}$ are preferably carbonium cations or ammonium cations, and particularly, triphenylcarbonium cation, N,N-dimethylanilinium cation, and N,N-diethylanilinium cation are preferable.

Examples of the ionic compounds can include, for example, trialkyl-substituted ammonium salts, N,N-dialkylanilinium salts, dialkylammonium salts, and triarylphosphonium salts.

Specific examples of the trialkyl-substituted ammonium salts include triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tri(n-butyl)ammonium tetra(pentafluorophenyl)boron, tripropylammonium tetra(o,p-dimethylphenyl)boron, tri(n-butyl)ammonium tetra(N,N-dimethylphenyl)boron, tri(n-butyl)ammonium tetra(p-trifluoromethylphenyl)boron, tri(n-butyl)ammonium tetra(3,5-ditrifluoromethylphenyl)boron, tri(n-butyl)ammonium tetra(o-tolyl)boron, and so on.

Specific examples of the N,N-dialkylanilinium salts include N,N-dimethylanilinium tetra(phenyl)boron, N,N-diethylanilinium tetra(phenyl)boron, N,N,2,4,6-pentamethylanilinium tetra(phenyl)boron, and so on.

Specific examples of the dialkylammonium salts include di(1-propyl)ammonium tetra(pentafluorophenyl)boron, dicyclohexylammonium tetra(phenyl)boron, and so on.

Further, examples of the ionic compounds can include triphenylcarbenium tetrakis(pentafluorophenyl)borate, N,N-dimethylanilinium tetrakis(pentafluorophenyl)borate, ferrocenium tetra(pentafluorophenyl)borate, triphenylcarbenium pentaphenylcyclopentadienyl complex, N,N-diethylanilinium pentaphenylcyclopentadienyl complex, boron compounds represented by Formula [XIII] or [XIV], and so on. In the formulae, Et represents an ethyl group.

[Chem. 17]

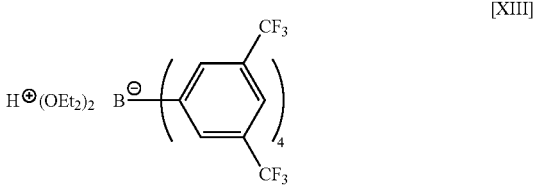

[XIII]

[Chem. 18]

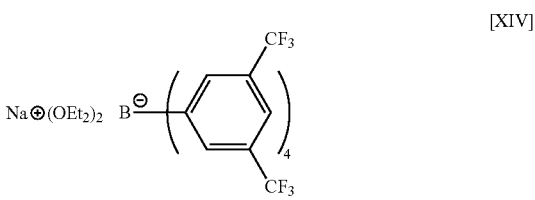

[XIV]

Specific examples of the borane compounds include decaborane; anionic salts, such as bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate, and bis[tri(n-butyl)ammonium]dodecachlorododecaborate; salts of metal borane anion, such as tri(n-butyl)ammonium bis(dodecahydridedodecaborate)cobaltate (III), bis[tri(n-butyl)ammonium]bis(dodecahydridedodecaborate)nickelate (III), and so on.

Specific examples of the carborane compounds include anionic salts, such as 4-carbanonaborane, 1,3-dicarbanonaborane, 6,9-dicarbadecaborane, dodecahydride-1-phenyl-1,3-dicarbanonaborane, dodecahydride-1-methyl-1,3-dicarbanonaborane, undecahydride-1,3-dimethyl-1,3-dicarbanonaborane, 7,8-dicarbaundecaborane, 2,7-dicarbaundecaborane, undecahydride-7,8-dimethyl-7,8-dicarbaundecaborane, dodecahydride-11-methyl-2,7-dicarbaundecaborane, tri(n-butyl)ammonium 1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammonium bromo-1-carbadodecaborate, tri(n-butyl)ammonium-6-carbadecaborate, tri(n-butyl)ammonium-7-carbaundecaborate, tri(n-butyl)ammonium-7,8-dicarbaundecaborate, tri(n-butyl)ammonium-2,9-dicarbaundecaborate, tri(n-butyl)ammonium dodecahydride-8-methyl-7,9-dicarbaundecaborate, tri(n-butyl)ammonium undecahydride-8-ethyl-7,9-dicarbaundecaborate, tri(n-butyl)ammonium undecahydride-8-butyl-7,9-dicarbaundecaborate, tri(n-butyl)ammonium undecahydride-8-allyl-7,9-dicarbaundecaborate, tri(n-butyl)ammonium undecahydride-9-trimethylsilyl-7,8-dicarbaundecaborate, and tri(n-butyl)ammonium undecahydride-4,6-dibromo-7-carbaundecaborate; and salts of metal carborane anion, such as tri(n-butyl)ammonium bis(nonahydride-1,3-dicarbanonaborate)cobaltate (III), tri(n-butyl)ammonium bis(undecahydride-7,8-dicarbaundecaborate)ferrate (III), tri(n-butyl)ammonium bis(undecahydride-7,8-dicarbaundecaborate)cobaltate (III), tri(n-butyl)ammonium bis(undecahydride-7,8-dicarbaundecaborate)nickelate (III), tri(n-butyl)ammonium bis(undecahydride-7,8-dicarbaundecaborate) cuprate (III), tri(n-butyl)ammonium bis(undecahydride-7,8-dicarbaundecaborate)aurate (III), tri(n-butyl)ammonium bis (nonahydride-7,8-dimethyl-7,8-dicarbaundecaborate)ferrate (III), tri(n-butyl)ammonium bis(nonahydride-7,8-dimethyl-7,8-dicarbaundecaborate)chromate (III), tri(n-butyl)ammonium bis(tribromooctahydride-7,8-dicarbaundecaborate)cobaltate (III), tris[tri(n-butyl)ammonium]bis(undecahydride-7-carbaundecaborate)chromate (III), bis[tri(n-butyl) ammonium]bis(undecahydride-7-carbaundecaborate) manganate (IV), bis[tri(n-butyl)ammonium]bis (undecahydride-7-carbaundecaborate)cobaltate (III), bis[tri(n-butyl)ammonium]bis(undecahydride-7-carbaundecaborate)nickelate (IV), and so on.

The heteropolycompounds consist of an atom selected from silicon, phosphorus, titanium, germanium, arsenic, and tin and of one or more kinds of atom selected from vanadium, niobium, molybdenum, and tungsten. Specifically, those which can be used include, but are not limited to, phosphovanadic acid, germanovanadic acid, arsenovanadic acid, phosphoniobic acid, germanoniobic acid, siliconomolybdic acid, phosphomolybdic acid, titanomolibdic acid, germanomolybdic acid arsenomolybic acid, tin molybdic acid, phosphotungstic acid, germanotungstic acid, tin tungstic acid, phosphomolybdovanadic acid, phosphotungstovanadic acid, germanotungstovanadic acid, phosphomolybdotungsto vanadic acid, germanomolybdotungstovanadic acid, phosphomolybdotungstic acid, phosphomolybdotungstoniobic acid, and salts of these acids, for example, salts with Group 1 or Group 2 metals, specifically, with lithium, sodium, potassium, rubidium, cesium, beryllium, magnesium, calcium, strontium, and barium, and organic salts such as triphenylethyl salt.

Among the ionized ionic compounds (b-3), the above ionic compounds are preferable, and especially triphenylcarbenium tetrakis(pentafluorophenyl)borate and N,N-dimethylanilinium tetrakis(pentafluorophenyl)borate are more preferable.

The ionized ionic compounds (b-3) are used singly or in combination of the two or more kinds.

In the invention, when a metallocene catalyst containing the metallocene compound (a) represented by Formula [A1], the organometallic compound (b-1) such as triisobutylaluminum, the organoaluminum oxycompound (b-2) such as methylaluminoxane, and the ionized ionic compound (b-3) such as triphenylcarbenium tetrakis(pentafluorophenyl)borate is used as a catalyst, it can exhibit very high polymerization activity in production of the ethylene/α-olefin/non-conjugated polyene copolymer.

The metallocene catalyst used for the invention can utilize, as necessary, a carrier (c) along with the above metallocene compound (a) and at least one kind of compound (b) selected from the organometallic compound (b-1), the organoaluminum oxycompound (b-2), and the ionized ionic compound (b-3).

(c) Carrier

The carrier (c) used as necessary in the invention (microparticulate carrier) is an inorganic or organic compound, which is a granular or microparticulate solid.

Examples of the inorganic compound are preferably porous oxides, inorganic halides, clays, clay minerals, or ion-exchangeable layered compounds.

Specific examples of the porous oxides which can be used include $SiO_2$, $Al_2O_3$, MgO, ZrO, $TiO_2$, $B_2O_3$, CaO, ZnO, BaO, $ThO_2$, and so on or composites or mixtures containing any of them, for example, natural or synthesized zeolite, $SiO_2$—MgO, $SiO_2$—$Al_2O_3$, $SiO_2$—$TiO_2$, $SiO_2$—$V_2O_5$, $SiO_2$—$Cr_2O_3$, $SiO_2$—$TiO_2$—MgO, and so on. Among them, those mainly composed of $SiO_2$ and/or $Al_2O_3$ are preferable. Although these porous oxides are different in nature depending on the kinds and production processes, the carriers preferably used in the invention desirably have a particle diameter within the range from 10 to 300 μm, preferably from 20 to 200 μm, a specific surface area within the range from 50 to 1000 $m^2/g$, preferably 100 to 700 $m^2/g$, and a pore volume within the range from 0.3 to 3.0 $cm^3/g$. Such carriers are used, as necessary, after calcination at a temperature from 100 to 1000° C., preferably from 150 to 700° C.

Examples of the inorganic halides to be used are $MgCl_2$, $MgBr_2$, $MnCl_2$, $MnBr_2$, and so on. The inorganic halides may be used as is, or after trituration by ball milling or vibration milling. Alternatively, they can also be used in the form of microparticulate which is precipitated by an precipitating agent after dissolved into a solvent such as alcohol.

Clays to be used in the invention is usually composed mainly of clay minerals. The ion-exchangeable layered compounds to be used in the invention are compounds which have a structure in which planes formed by, for example, ionic bonds are piled in parallel on each other by a weak bonding force, with contained ions being exchangeable. Most clay minerals are ion-exchangeable layered compounds. These clays, clay minerals, and ion-exchangeable layered compounds are not limited to natural materials, and synthesized ones can also be used.

The clays, clay minerals, and ion-exchangeable layered compounds can be exemplified by clays, clay minerals, or ionic crystal compounds having a layered crystalline structure, such as hexagonal close-packed type, antimony type, $CdCl_2$ type, and $CdI_2$ type. Examples of the clays and clay minerals include kaolin, bentonite, kibushi clay, gairome clay, allophane, hisingerite, pyrophyllite, mica group, montmorilonite group, vermiculite, chlorite group, palygorskite, kaolinite, nakhlite, dickite, halloysite, and so on, and examples of the ion-exchangeable layered compound include crystalline acidic salts of multivalent metal, such as $\alpha\text{-}Zr(HAsO_4)_2 \cdot H_2O$, $\alpha\text{-}Zr(HPO_4)_2$, $\alpha\text{-}Zr(KPO_4)_2 \cdot 3H_2O$, $\alpha\text{-}Ti(HPO_4)_2$, $\alpha\text{-}Ti(HAsO_4)_2 \cdot H_2O$, $\alpha\text{-}Sn(HPO_4)_2 \cdot H_2O$, $\gamma\text{-}Zr(HPO_4)_2$, $\gamma\text{-}Ti(HPO_4)_2$, $\gamma\text{-}Ti(NH_4PO_4)_2 \cdot H_2O$, and so on.

Such clays and clay minerals, or ion-exchangeable layered compounds are those which have pore volumes, as measured on pores having a radius of 20 Å or more by a mercury intrusion method, of 0.1 cc/g or more, and in particular, preferably from 0.3 to 5 cc/g. The pore volume is measured on the pores having a radius of 20 to 30000 Å by a mercury intrusion method using a mercury porosimeter.

When the carrier is used which has a pore volume of less than 0.1 cc/g as measured on pores of 20 Å or more in radius, it tends to be difficult to obtain high polymerization activity.

Clays and clay minerals used in the invention are also preferably chemically treated. Any chemical treatment can be used such as a treatment for removing impurity attached to the surface of the materials and a treatment affecting the crystalline structure of the clays. Specific examples of the chemical treatments include acid treatments, basic treatments, treatments for salts, and treatments for organics. The acid treatments not only remove impurities on the surface of objects, but also increase the surface area by eluting cations, such as Al, Fe, and Mg. The basic treatments destroy the crystalline structure of the clays, resulting in a change in the structure. The treatments for salts or organics can create ionic complexes, molecular composites, organic derivatives, and so on, accompanied by a change in the surface area and the interlayer distance.

Ion-exchangeable layered compounds to be used in the invention may be those having an increased interlayer distance by replacing exchangeable ions between the layers with other bulkier ions by utilizing their ion-exchangeability. Such bulky ions play a role of poles supporting the layered structure and usually called "pillars." Inserting another substance between the layers of a layered compound is called "intercalation." Examples of the intercalated guest compound include cationic inorganic compounds, such as $TiCl_4$, and $ZrCl_4$, metal alkoxides, such as $Ti(OR)_4$, $Zr(OR)_4$, $PO(OR)_3$, $B(OR)_3$ (R is, for example, a hydrocarbon group), metal hydroxide ions, such as $[Al_{13}O_4(OH)_{24}]^{7+}$, $[Zr_4(OH)_{14}]^{2+}$, $[Fe_3O(OOCH_3)_6]^{+}$, and so on. These compounds are used singly or in combination of the two or more kinds. These compounds can be intercalated in the presence of polymers obtained through hydrolysis of metal alkoxides, such as $Si(OR)_4$, $Al(OR)_3$, $Ge(OR)_4$ (R is, for example, a hydrocarbon group), colloidal inorganic compounds such as $SiO_2$, and so on. Examples of the pillars include oxides produced by thermal dehydration of the above intercalated metal hydroxide ions.

Clays, clay minerals, and ion-exchangeable layered compounds to be used in the invention can be used as is or after treated by, for example, ball milling or sieving. They can also be used after subjected to adsorption of water or a thermal dehydration. In addition, they can be used singly or in combination of the two or more kinds.

Among them, preferable are clays or clay minerals, and particularly preferable are montmorilonite, vermiculite, hectorite, taeniolite, and synthesized mica.

Examples of the organic compounds include granular or microparticulate solids ranging from 10 to 300 μm in particle diameter. Specific examples thereof include polymers or copolymers mainly composed of an α-olefin of 2 to 14 carbon atoms, such as ethylene, propylene, 1-butene, or 4-methyl-1-pentene, polymers or copolymers mainly composed of vinylcyclohexane or styrene, and modified products thereof.

Metallocene catalysts to be used in the invention contain not only the metallocene compound (a), at least one kind of compound (b) selected from the organometallic compounds (b-1) and the organoaluminum oxycompound (b-2) and the ionized ionic compound (b-3), and as necessary, the carrier (c), and as necessary, the following specific organic compound component (d).

(d) Organic Compound Components

In the invention, organic compound components (d) are used, as necessary, in order to improve polymerization performance and physical properties of the produced polymers. Examples of such organic compounds include, but are not limited to, alcohols, phenol compounds, carboxylic acids, phosphorus compounds, and sulfonate salts.

Process for Producing Ethylene/α-Olefin/Non-Conjugated Polyene Copolymer

The ethylene/α-olefin/non-conjugated polyene copolymer according to the invention (ethylene/α-olefin/non-conjugated polyene copolymer (S)) can be produced by copolymerizing monomers consisting of ethylene (A), an α-olefin (B) of 3 to 20 carbon atoms, a non-conjugated polyene (C) containing intramolecularly two or more partial structures in total selected from the group consisting of the structures of Formulae (I) and (II), and as necessary, a non-conjugated polyene (D) containing intramolecularly only one partial structure selected from the group consisting of the structure of Formula (I) and (II),

[Chem. 19]

When such monomers are copolymerized, processes of how to use respective components constituting the above polymerization catalyst and an order of adding the components are arbitrarily selected, and some exemplary processes are given below:

(1) The metallocene compound (a) alone is added to a polymerizer.

(2) The metallocene compound (a) and the compound (b) are added to a polymerizer in an arbitrary order.

(3) The compound (b) and the catalyst component in which the metallocene compound (a) is supported on the carrier (c) are added to a polymerizer in an arbitrary order.

(4) The metallocene compound (a) and the catalyst component in which the compound (b) is supported on the carrier (c) are added to a polymerizer in an arbitrary order.

(5) The catalyst component in which the metallocene compound (a) and the compound (b) are supported on the carrier (c) is added to a polymerizer.

In each of the above processes from (2) to (5), two or more of the catalyst components may be brought into contact with each other beforehand.

In each of the above processes (4) and (5) in which the compound (b) is supported on the carrier, the unsupported compound (b) may be added in an arbitrary order as necessary. In this case, the compound (b) may be the same as or different from the compound (b) supported on the carrier (c).

The solid catalyst component wherein the metallocene compound (a) alone is supported on the above carrier (c) or the metallocene compound (a) and the compound (b) are supported on the carrier (c) may be prepolymerized with olefin, and an additional catalyst component may be supported on the prepolymerized solid catalyst component.

In the invention, the ethylene/α-olefin/non-conjugated polyene copolymer can be suitably obtained by copolymerizing monomers in the presence of such a metallocene catalyst as described above.

When polymerizing the olefin by using such a metallocene catalyst as described above, the metallocene compound (a) is used usually in an amount of from $10^{-12}$ to $10^{-2}$ mol/l, preferably from $10^{-10}$ to $10^{-8}$ mol/l per liter of the reaction volume.

The compound (b-1) is used in an amount such that the molar ratio of the compound (b-1) to all atoms of the transition metal (M) in the metallocene compound (a), represented by [(b-1)/M], is usually from 0.01 to 50000, preferably from 0.05 to 10000. The compound (b-2) is used in an amount such that the molar ratio of the aluminum atom of the compound (b-2) to all of the transition metal (M) in the metallocene compound (a), represented by [(b-2)/M], is usually from 10 to 50000, preferably from 20 to 10000. The compound (b-3) is used in an amount such that the molar ratio of the compound (b-3) to all atoms of the transition metal (M) in the metallocene compound (a), represented by [(b-3)/M], is usually from 1 to 20, preferably 1 from 15.

In the invention, the ethylene/α-olefin/non-conjugated polyene copolymer can be produced in either liquid phase polymerization processes such as solution (dissolution) polymerization, suspension polymerization, or vapor phase polymerization processes, and the processes preferably include, but are not especially limited to, the following steps of obtaining a polymerization-reaction solution.

The step of obtaining a polymerization-reaction solution is a step to obtain a polymerization-reaction solution of the ethylene/α-olefin/non-conjugated polyene copolymer by polymerizing monomers consisting of ethylene (A), an α-olefin (B) of 3 to 20 carbon atoms, a non-conjugated polyene (C), and as necessary, a non-conjugated polyene (D), by using an aliphatic hydrocarbon as a polymerization solvent, in the presence of a metallocene catalyst according to the invention, the metallocene catalyst containing a transition metal compound wherein $R^{13}$ and $R^{14}$ bonding to $Y^1$ in Formula [A1] are preferably a phenyl group, or a phenyl group substituted by an alkyl or halogen group, and $R^7$ and $R^{10}$ preferably have an alkyl substituent.

When the concentration of the ethylene/α-olefin/non-conjugated polyene copolymer in the polymerization solvent exceeds the above range, the viscosity of the polymerization solution too high to be stirred uniformly may cause the difficulty of the polymerization reaction.

Examples of the polymerization solvent include aliphatic hydrocarbons and aromatic hydrocarbons. Specific examples thereof include aliphatic hydrocarbons, such as propane, butane, pentane, hexane, heptane, octane, decane, dodecane, and kerosene, alicyclic hydrocarbons, such as cyclopentane, cyclohexane, and methyl cyclopentane, aromatic hydrocarbons, such as benzene, toluene, and xylene, halogenated hydrocarbons, such as ethylene chloride, chlorobenzene, and dicloromethane, and they can be used singly or in combination of the two or more kinds. Olefins themselves can also be used as a solvent. Among them, hexane is preferable from the view point of separation and purification of the obtained ethylene/α-olefin/non-conjugated polyene copolymer.

Polymerization temperature is usually within the range from −50 to +200° C., preferably from 0 to +200° C., more preferably from +80 to +200° C., and a higher temperature (+80° C. or more) is preferable from the viewpoint of catalyst activity, copolymerization ability, and productivity, although depending on a molecular weight to be achieved and the polymerization activity of a metallocene catalyst system to be used.

Polymerization pressure is generally within the range from atmospheric pressure to 10 MPa gauge pressure, preferably from atmospheric pressure to 5 MPa gauge pressure, and polymerization reaction can be carried out batchwise, semi-continuously or continuously. The polymerization can also be carried out in two or more steps under different reaction conditions. In this invention, a step of carrying out copolymerization by feeding monomers continuously into a reactor is preferably adopted among them.

Reaction time (average residence time in the case that copolymerization is carried out continuously) varies depending on conditions such as catalyst concentration and polymerization temperature, but it is usually within the range from 0.5 minute to 5 hours, preferably 5 minutes to 3 hours.

The molecular weight of the obtained ethylene/α-olefin/non-conjugated polyene copolymer can also be controlled by adding hydrogen in the polymerization system or by changing the polymerization temperature. It can also be controlled by the amount of the compound (b). Specific examples of the compound include triisobutylaluminum, methylaluminoxane, and diethyl zinc. When hydrogen is added, its amount is suitably about from 0.001 to 100 NL per kg of olefin.

The molar ratio of ethylene (A) to the above α-olefin (B) to be charged, (ethylene (A)/α-olefin (B)), is preferably from 40/60 to 99.9/0.1, more preferably from 50/50 to 90/10, still preferably from 55/45 to 85/15, and most preferably from 55/45 to 78/22.

The charged amount of the non-conjugated polyene (C) is usually from 0.07 to 10% by weight, preferably from 0.1% by weight to 8.0% by weight, more preferably from 0.5% by weight to 5.0% by weight, with respect to 100% by weight of the sum of ethylene (A), α-olefin (B), and non-conjugated polyene (C)(amount of the total charged monomers).

<Thermoplastic Resin Composition>

The thermoplastic resin composition of the inventions is a resin composition containing the above ethylene/α-olefin/non-conjugated polyene copolymer of the invention.

The thermoplastic resin composition of the invention can appropriately contain various additives and fillers capable of being combined to the resin composition, as well as the ethylene/α-olefin/non-conjugated polyene copolymer of the invention.

The thermoplastic resin composition of the invention can be crosslinked to be suitably used for various applications, and preferably contains a crosslinking agent. Well-known crosslinking agents can be used without any particular limitation, and in particular, organic peroxides are preferable.

When the thermoplastic resin compositions of the invention contain an organic peroxide, the amount of the organic peroxide (mol) preferably satisfies Formula (7), $$\text{amount of organic peroxide (mol)} \times \text{number of oxygen-oxygen bonds per molecule of organic peroxide} \leq \text{weight fraction of } (C)/\text{molecular weight of } (C) \times 100 \qquad \text{Formula (7).}$$

(In the Formula (7), the weight fraction of (C) represents that of a structural unit derived from the non-conjugated polyene (C) in the ethylene/α-olefin/non-conjugated polyene copolymer (% by weight), and the molecular weight of (C) represents that of the non-conjugated polyene (C).)

The thermoplastic resin composition of the invention is preferably the rubber composition described later.

<Rubber Composition>

Since the ethylene/α-olefin/non-conjugated polyene copolymer according to the invention exhibits good rubber characteristics, it is suitably used as a raw material of a rubber composition.

The rubber composition according to the invention can appropriately contain a softening agent, a filler, other resin components, and a crosslinking agent, in addition to the ethylene/α-olefin/non-conjugated polyene copolymer according to the invention.

Softening Agent

Examples of the softening agent usually used include, but are not limited to, mineral oils and synthesis oils.

Examples of the mineral oils include paraffin-based oils, naphthene-based oils, aromatic oils, and so on. Examples of the synthesis oils include butane-based oligomers, ethylene/α-olefin cooligomers, and so on.

The ethylene/α-olefin cooligomers are a polymerized product obtained by copolymerizing ethylene and an α-olefin, with a number average molecular weight, as measured by GPC, of less than 10,000 in terms of polystyrene standard. Examples of the ethylene/α-olefin cooligomers are preferably ethylene/α-olefin cooligomers of 3 to 8 carbon atoms, and liquid ethylene propylene rubber (EPR) is more preferable, and in particular, liquid ethylene propylene rubber (EPR) is preferable which has a number average molecular weight, as measured by GPC, of 2,500 to 5,000 in terms of polystyrene standard.

The softening agent can be used singly or in combination of the two or more kinds.

The amount of the softening agent in the rubber composition of the invention is preferably from 0.1 to 300 parts by weight, preferably from 1 to 250 parts by weight, more preferably from 5 to 200 parts by weight, with respect to 100 parts by weight of the ethylene/α-olefin/non-conjugated polyene copolymer. The above range is preferable because the rubber composition is excellent in not only extrusion moldability, press-forming nature, injection moldability, and so on, but also processabilities such as roll processability.

Filler

The rubber composition of the invention preferably contains a filler.

Examples of the filler are not limited, but inorganic fillers are preferable because they improve mechanical strengths such as tensile strength, tear strength, and wear resistance, of the rubber composition.

Examples of the inorganic fillers usually used are carbon black, clays, heavy calcium carbonate, light calcium carbonate, talc, and so on. Carbon black and heavy calcium carbonate are preferable as inorganic fillers.

The fillers can be used singly or in combination of the two or more kinds.

The content of the filler in the rubber composition of the invention is preferably from 1 to 300 parts by weight, preferably from 5 to 250 parts by weight, more preferably 10 to 200 parts by weight, with respect to 100 parts by weight of the ethylene/α-olefin/non-conjugated polyene copolymer according to the invention. The above range is preferable because the rubber composition is excellent in kneadability and processability, resulting in a rubber shaped article excellent in mechanical properties and compression set resistance.

Other Resin Components

The rubber composition of the invention may contain resin components other than the above ethylene/α-olefin/non-conjugated polyene copolymer, as necessary. Examples of such resin components are not particularly limited, but polyolefin resins are preferable.

The rubber composition of the invention containing a polyolefin resin can control the hardness of products from the composition and decrease compound viscosity at processing temperature, resulting in further improvement of processability. The rubber composition is preferable also because it can be treated as a thermoplastic elastomer, resulting in its easier handling property and more choice of kneading methodology.

The polyolefin resin having a number average molecular weight, as measured by GPC, of 10,000 or more in terms of polystyrene standard is suitably used.

Examples of the polyolefin resin include α-olefin homopolymers and α-olefin copolymers. Examples of the α-olefin homopolymers include polyethylene, polypropylene, and so on, and examples of the α-olefin copolymers include ethylene/α-olefin of 3 to 20 carbon atoms copolymers and ethylene/α-olefin of 3 to 20 carbon atoms/non-conjugated polyene copolymers (which are different from the ethylene/α-olefin/non-conjugated polyene copolymer according to the invention). Examples of the copolymers of ethylene/α-olefin of 3 to 20 carbon atoms include ethylene-propylene rubber (EPR), propylene-ethylene rubber (PER), ethylene-butene rubber (EBR), ethylene-octene rubber (EOR), and so on.

Examples of the ethylene/α-olefin of 3 to 20 carbon atoms/non-conjugated polyene copolymers (which are different from the ethylene/α-olefin/non-conjugated polyene copolymer according to the invention) include ethylene-propylene terpolymer (EPT) and ethylene-butene terpolymer (EBT), and so on.

Among these polyolefin resins, polyethylene, ethylene/α-olefin copolymer, and polypropylene are preferable.

The polyolefin resins can be used singly or in combination of the two or more kinds.

When the rubber composition of the invention contains the polyolefin resin, the content of the polyolefin resin is from 1 to 100 parts by weight, preferably 5 to 80 parts by weight, more preferably 10 to 50 parts by weight, with respect to 100 parts by weight of the above ethylene/α-olefin/non-conjugated polyene copolymer. Within the range, not only hardness of a shaped article made from the rubber composition can be controlled, but also compound viscosity at processing temperature can be decreased, resulting in further improvement in processability. The rubber composition is preferable also because it can be treated as a thermoplastic elastomer, resulting in its easier handling and more choice of kneading methodology.

Crosslinking Agent

Rubber compositions of the invention may contain a crosslinking agent. The rubber composition containing a crosslinking agent enables crosslinking the composition to obtain crosslinked articles.

Examples of the crosslinking agent include crosslinking agents generally used in crosslinking rubber, such as sulphur-based compounds, organic peroxides, phenol resins, hydrosilicone-based compounds, amino resins, quinones or derivatives thereof, amine-based compounds, azo compounds, epoxy compounds, and isocyanates. Among these crosslinking agents, the sulphur-based compounds, the organic peroxides, and the phenol resins are preferable. Since the ethylene/α-olefin/non-conjugated polyene copolymer according to the invention can achieve particularly excellent crosslinking characteristics when crosslinked by using an organic peroxide, the rubber composition of the invention particularly preferably contains an organic peroxide as a crosslinking agent.

When the crosslinking agent is an organic peroxide, specific examples of the agent include, for example, dicumyl peroxide, di-tert-butyl peroxide, 2,5-di-(tert-butylperoxy)hexane, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, peroxybenzoate, p-chloroperoxybenzoate, 2,4-dichloroperoxybenzoate, tert-butylperoxybenzoate, tert-butylperoxyisopropylcarbonate, diacetyl peroxide, lauroyl peroxide, tert-butylcumyl peroxide.

From the view point of reactivity, odor, and scorch stability, bi-functional organic peroxides having two intramolecular peroxide bonds (—O—O—) are preferable among them, such as 2,5-di-(tert-butylperoxy)hexane, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, and in particular, 2,5-di-(tert-butylperoxy)hexane and 2,5-dimethyl-2,5-di-(tert-butylperoxy)hexane are most preferable.

When the crosslinking agent is an organic peroxide, the blended amount of the organic peroxide is from 0.1 to 20 parts by weight, preferably from 0.2 to 15 parts by weight, and more preferably from 0.5 to 10 parts by weight with respect to 100 parts by weight of the ethylene/α-olefin/non-conjugated polyene copolymer. The blended amount of the organic peroxide within the above range is suitable because rubber shaped articles to be obtained have no bloom on the surface thereof, exhibiting excellent crosslinking characteristics.

When the organic peroxide is used as a crosslinking agent, the rubber composition of the invention preferably contains a crosslinking aid described below.

When the organic peroxide is used as a crosslinking agent, examples of the preferred crosslinking aid to be contained in the rubber composition include, for example, quinonedioxime-based crosslinking aids, such as sulfur and p-quinonedioxime; acrylic crosslinking aids, such as ethylene glycol dimethacrylate and trimethylolpropane trimethacrylate; allyl crosslinking aids, such as diallyl phthalate, triallyl isocyanurate; other maleimide-based crosslinking aids; and divinylbenzene. The blended amount of the crosslinking aid is usually from 0.5 to 10 moles, preferably from 0.5 to 7 moles, and more preferably from 1 to 5 moles per mole of the organic peroxide. The blended amount of the crosslinking aid is also desirably from 0.5 to 2 moles, preferably from 0.5 to 1.5 moles per mole of the organic peroxide, and still preferably in an approximately equal molar amount to that of the organic peroxide.

In rubber compositions of the invention, the blended amount of the organic peroxide is preferably an amount contained in the above thermoplastic resin composition, in other words, a content of the organic peroxide (mol) which satisfies the following Formula (7), content of organic peroxide (mol)×number of oxygen-oxygen bonds in one organic peroxide molecule≤weight fraction of (C)/molecular weight of (C)×100    Formula (7), (wherein the weight fraction of (C) represents that of a structural unit derived from the non-conjugated polyene (C) in the ethylene/α-olefin/non-conjugated polyene copolymer (% by weight), and the molecular weight of (C) represents that of the non-conjugated polyene (C)).

The crosslinking agent can be used singly or in combination of the two or more kinds.

When the crosslinking agent is a sulphur-based compound, specific examples thereof include, for example, sulphur, sulfur chloride, sulfur dichloride, morpholine disulfide, alkylphenol disulfide, tetramethylthiuram disulfide, and selenium diethyldithiocarbamate.

When the crosslinking agent is a sulphur-based compound, the blended amount of the sulphur-based compound is usually from 0.3 to 10 parts by weight, preferably from 0.5 to 7.0 parts by weight, more preferably 0.7 to 5.0 parts by weight with respect to 100 parts by weight of the ethylene/α-olefin/non-conjugated polyene copolymer. The blended amount of the sulphur-based compound within the above range is suitable because rubber shaped articles to be obtained have no bloom on the surface thereof, exhibiting excellent crosslinking characteristics.

When the sulphur-based compound is used as a crosslinking agent, the rubber composition of the invention preferably contains a crosslinking aid below.

When the sulphur-based compound is used as a crosslinking agent, examples of the crosslinking aid preferably contained in the rubber composition include, for example, zinc oxide, and hydrozincite. The blended amount of the crosslinking aid is usually from 1 to 20 parts by weight with respect to 100 parts by weight of the ethylene/α-olefin/non-conjugated polyene copolymer.

When the sulphur-based compound is used as a crosslinking agent, it is desirably used in combination with sulphur and a vulcanization enhancer.

Specific examples of the vulcanization enhancer include thiazole-based agents, such as N-cyclohexyl-2-benzothiazole sulfenamide (CBS) (for example, "NOCCELER NS" (trade name, manufactured by OUCHI SHINKO CHEMICAL INDUSTRIAL CO., LTD.)), N-oxydiethylene-2-benzothiazole sulfenamide, N,N'-diisopropyl-2-benzothiazole sulfenamide, 2-mercaptobenzothiazole (for example, "SANCELERM" (trade name, manufactured by SANSHIN CHEMICAL INDUSTRY CO., LTD.)), 2-(4-morpholinodithio)benzothiazole (for example, "NOCCELER MDB-P" (trade name, manufactured by SANSHIN CHEMICAL INDUSTRY CO., LTD.)), 2-(2,4-dinitrophenyl)mercaptobenzothiazole, 2-(2,6-diethyl-4-morpholinothio)benzothiazole, and dibenzothiazyl disulfide; guanidine-based agents, such as diphenylguanidine, triphenylguanidine, and diorthotolylguanidine; aldehyde-amine-based agents such as acetaldehyde-aniline condensate and butylaldehyde-aniline condensate; imidazoline-based agents such as 2-mercaptoimidazoline; thiourea-based agents such as diethylthiourea and dibutyl thiourea; thiuram-based agents such as tetramethylthiurammonosulfide and tetramethylthiuramdisulfide (TMTD) (for example, "NOCCELER TT" (trade name, manufactured by OUCHI SHINKO CHEMICAL INDUSTRIAL CO., LTD.)); dithiocarbamate-based agents, such as zinc dimethyldithiocarbamate, zinc diethyldithiocarbamate, zinc dibutyldithiocarbamate (ZnBDC) (for example, "SANCELER Bz" (trade name, manufactured by SANSHIN CHEMICAL INDUSTRY CO., LTD.)), and tellurium diethyldithiocrabamate; thiourea-based agents, such as ethylene thiourea, N,N'-diethylthiourea, and N,N'-dibutyl thiourea; xanthate-based agents such as zinc dibutyl xanathate; and in addition, hydrozincite (zinc oxide such as "META-Z102" (trade name, manufactured by Inoue Calcium Corporation)).

The blended amount of the vulcanization enhancer is usually from 0.1 to 20 parts by weight, preferably from 0.2 to 15 parts by weight, more preferably from 0.5 to 10 parts by weight with respect to 100 parts by weight of the ethylene/α-olefin/non-conjugated polyene copolymer. The blended amount of the vulcanization enhancer within the above range is suitable because rubber shaped articles to be obtained have no bloom on the surface thereof, exhibiting excellent crosslinking characteristics.

The vulcanization aid can be appropriately chosen according to its use application, and can be used singly or in the form of a mixture of the two or more kinds. Specific examples of the vulcanization aid include, for example, magnesium oxide and hydrozincite (zinc oxide such as "META-Z102" (trade name, manufactured by Inoue Calcium Corporation)).

The blended amount is usually from 1 to 20 parts by weight with respect to 100 parts by weight of the ethylene/α-olefin/non-conjugated polyene copolymer.

Foaming Agent

The rubber composition of the invention may contain a foaming agent. When it contains a foaming agent, it usually also contains the crosslinking agent. The crosslinking agent and a foaming agent contained in the rubber composition can crosslink and foam the composition to provide a foamed article.

Examples of the foaming agent include inorganic foaming agents such as sodium bicarbonate and sodium carbonate; and organic foaming agents including nitroso compounds such as N,N'-dinitrosopentamethylenetetramine and N,N'-dinitrosoterephthalamide; azo compounds such as azodicarbonamide (ADCA) and azobisisobutyronitrile; hydrazide compounds such as benzene sulfonyl hydrazide and p,p'-oxybis (benzene sulfonyl hydrazide) (OBSH); and azide compounds such as calcium azide and 4,4'-diphenyldisulfonyl azide. ADCA and OBSH are preferable as a foaming agent. The foaming agents can be used singly or in combination to the two or more kinds.

When the rubber composition of the invention contains the foaming agent, the blended amount of the foaming agent is usually from 0.2 to 30 parts by weight, preferably 0.5 to 25 parts by weight, and more preferably from 0.5 to 20 parts by weight with respect to 100 parts by weight of the ethylene/α-olefin/non-conjugated polyene copolymer.

Foaming Aid

When the rubber composition of the invention contains the foaming agent, it may also contain, as necessary, a foaming aid. The foaming aid exhibits effects, such as decrease in the degradation temperature of the foaming agent, enhancement of its degradation, and homogenization of bubbles.

Examples of such a foaming aid include, for example, organic acids, such as salicylic acid, phthalic acid, stearic acid, oxalic acid, citric acid, and salts thereof, and urea or its derivatives.

When the rubber composition of the invention contains the foaming aid, the blended amount of the foaming aid is usually from 0.2 to 30 parts by weight, preferably from 0.5 to 25 parts by weight, and more preferably from 0.5 to 20 parts by weight with respect to 100 parts by weight of the ethylene/α-olefin/non-conjugated polyene copolymer.

Processing Auxiliary Agent

The rubber composition of the invention may contain a processing auxiliary agent. Processing auxiliary agents which are generally combined in rubber as a processing auxiliary agent can be used extensively. Specific examples thereof include, for example, ricinoleic acid, stearic acid, palmitic acid, lauric acid, barium stearate, zinc stearate, calcium stearate, or esters. Among them, stearic acid is preferable.

When the rubber composition of the invention contains the processing auxiliary agent, the blended amount of the processing auxiliary agent is usually from 0.1 to 10 parts by weight, preferably from 0.5 to 8 parts by weight, and more preferably from 1 to 6 parts by weight with respect to 100 parts by weight of the ethylene/α-olefin/non-conjugated polyene copolymer. The above range is preferable because rubber compositions to be obtained have no bloom on the surface thereof, and moreover, they do not suffer crosslinking inhibition during crosslinking. Further, the rubber compositions containing the processing auxiliary agent are preferable because of their excellent formabilities such as extrusion moldability, press-forming nature, and injection moldability and roll processability.

Surfactant

The rubber composition of the invention may contain a surfactant. Examples of the surfactant include amines, such as di-n-butylamine, dicyclohexylamine, monoethanolamine, triethanolamine, "Acting B" (manufactured by YOSHITOMI PHARMACEUTICAL INDUSTRIES, LTD.), "Acting SL" (manufactured by YOSHITOMI PHARMACEUTICAL INDUSTRIES, LTD.), polyethylene glycol, diethylene glycol, lecithin, triallyltrimellitate, and compounds of zinc aliphatic or aromatic carboxylate (example; "Struktol activator 73", "Struktol IB 531", and "Struktol FA541", manufactured by Schill+Seilacher GmbH), "ZEONET ZP" (manufactured by ZEON CORPORATION), octadecyltrimethylammonium bromide, synthesized hydrotalcite, and special quaternary ammonium compounds (example; "Arquad 2HF" (LION AKZO Co., Ltd.), and so on.

When the rubber composition of the invention contains the surfactant, the blended amount of the surfactant is usually from 0.2 to 10 parts by weight, preferably from 0.3 to 5 parts by weight, more preferably from 0.5 to 4 parts by weight with respect to 100 parts by weight of the ethylene/α-olefin/non-conjugated polyene copolymer. The surfactant can be appropriately chosen according to its use application, and can be used singly or in the form of a mixture of the two or more kinds.

Antioxidant

The rubber composition of the invention may contain an antioxidant. When it contains an antioxidant, it can provide longer lifetime of products obtained therefrom. Antioxidants which may be used are conventionally well-known antioxidants, for example, amine-based antioxidants, phenol-based antioxidants, and sulfur-based antioxidants.

Specific examples of the antioxidant include aromatic-secondary-amine-based antioxidants such as phenylbutylamine and N,N-di-2-naphthyl-p-phenylenediamine, phenol-based antioxidants such as dibutylhydroxytoluene and tetrakis[methylene(3,5-di-t-butyl-4-hydroxy)hydrocinnamate]methane; thioether antioxidants such as bis[2-methyl 4-(3-n-alkylthiopropionyloxy)-5-t-butylphenyl]sulfide; dithio carbamate-based antioxidants such as nickel dibutyldithiocarbamate; zinc salts of 2-mercaptobenzoylimidazole and 2-mercaptobenzoimidazole; sulfur-based antioxidants such as dilaurylthiodipropionate and distearylthiodipropionate, and so on.

When the rubber composition of the invention contains the antioxidant, the blended amount of the antioxidant is usually from 0.01 to 10 parts by weight, preferably from 0.02 to 7 parts by weight, and more preferably from 0.03 to 5 parts by weight with respect to 100 parts by weight of the ethylene/α-olefin/non-conjugated polyene copolymer. The above range is preferable because of shaped products obtained from the rubber composition of the invention have excellent heat aging resistance.

Pseud Anti-Gelation Agent

The rubber composition of the invention may contain a pseud anti-gelation agent. Examples of the pseud anti-gelation agent include, for example, "NHM-007" (manufactured by Mitsui Chemicals, Inc.).

When the rubber composition of the invention contains the pseud anti-gelation agent, the blended amount of the pseud anti-gelation agent is usually from 0.1 to 15 parts by weight, preferably from 0.5 to 12 parts by weight, and more preferably from 1.0 to 10 parts by weight with respect to 100 parts by weight of the ethylene/α-olefin/non-conjugated polyene copolymer.

Other Additive

The rubber composition of the invention may also contain other additives. Examples of the additives include, for example, anti-heat stabilizers, anti-weathering agents, anti-static agents, coloring agents, lubricants, and thickeners.

<Process of Preparing Rubber Composition>

The rubber composition of the invention is a rubber composition containing the above-mentioned ethylene/α-olefin/non-conjugated polyene copolymer, and preferably contains an additional component, such as a softening agent, a filler, and a crosslinking agent. For example, such a rubber composition is exemplified by one which contains a softening agent of from 0.1 to 300 parts by weight and a filler of from 1 to 300 parts by weight with respect to 100 parts by weight of the ethylene/α-olefin/non-conjugated polyene copolymer, but its preparation process does not have any particular limitation.

Processes of preparing the rubber composition include, for example: a process of mixing components contained in the rubber composition by using, for example, a conventionally known kneading machine such as a mixer, a kneader, and a roll mill, or a continuous kneading machine such as a bi-axial extruder; and a process of preparing a solution containing dissolved or dispersed components of the rubber composition, followed by removing the solvent.

Shaping and vulcanization can be carried out with or without a metal mold. When no metal mold is used, the rubber composition is usually shaped and vulcanized continuously.

<Crosslinked Rubber Shaped Article>

The crosslinked rubber shaped article of the invention can be obtained by crosslinking a rubber composition containing the above-mentioned ethylene/α-olefin/non-conjugated polyene copolymer and a crosslinking agent, and as necessary, an additive such as a softening agent and a filler. Crosslinking may be carried out with or without a metal mold. When no metal mold is used, the rubber composition is usually shaped and crosslinked continuously.

The process of crosslinking the rubber composition can be exemplified by: (a) a process of preforming the rubber composition containing a crosslinking agent into a desirable shape usually by a shaping method, such as extrusion cast, press-forming, and injection molding, or roll processing, followed by heating the shaped article simultaneously with preforming it or after introducing it into a crosslinking tub; and (b) a process of preforming, in the same manner as (a), the rubber composition containing a crosslinking agent, followed by irradiating it with electron beam.

The process (a) provides a crosslinked article via crosslinking reaction proceeding by heating with the aid of the crosslinking agent in the rubber composition. The process (b) provides a crosslinked article via crosslinking reaction proceeding by electron beam. In the process (b), the preformed rubber composition is irradiated usually with electron beam having an energy of from 0.1 to 10 MeV so that the dose absorbed into the rubber composition is usually from 0.5 to 36 Mrads, preferably from 0.5 to 20 Mrads, and more preferably from 1 to 10 Mrads.

<Foamed Article>

The foamed article of the invention can be obtained by crosslinking and foaming a rubber composition containing the above-mentioned ethylene/α-olefin of 3 to 20 carbon atoms/non-conjugated polyene copolymer and, as necessary, an additive such as a softening agent, a filler, and a crosslinking agent, and a foaming agent.

Since the above-mentioned rubber composition contains the foaming agent, heating the rubber composition causes degradation of the foaming agent as well as promoting crosslinking reaction by the crosslinking agent, which results in generation of carbon dioxide gas and nitrogen gas. Accordingly, the obtained foamed article has a bubble structure.

<Use Application>

Since the rubber composition of the invention is very excellent in not only formabilities, such as low temperature properties, mechanical properties, extrusion moldability, press-forming nature, and injection moldability, but also roll processability, it can suitably provide articles excellent in low temperature properties (for example, flexibility and rubber elasticity at low temperature) and mechanical properties.

In addition, since the rubber composition of the invention enables production of crosslinked articles excellent in moldability and crosslinking characteristics, and in heat resistance stability, they can be suitably used for applications envisaged to be used at high temperature for a long period of time.

The rubber composition of the invention, articles obtained from the composition, for example, a crosslinked article and a foamed article can be used for various use applications. Specifically, they are suitably used for rubber for tires, o-ring, roll for industrial use, packings (for example, capacitor packing), gasket, belts (for example, heat-insulating belt, belt for copying machines, and conveyance belt), hoses such as hoses for cars (for examples, turbocharger hose, water hose, brake reservoir hose, radiator hose, and air hose), anti-vibration rubber, a anti-vibration or vibration-controlling materials (for example, engine mount and motor mount), muffler hanger, sponges (for example, weather strip sponge, heat-insulating sponge, protection sponge, and microfoam sponge), cables (ignition cable, cabtire cable, and high tension cable), materials for wire cover (materials for covering high voltage wire, low voltage wire, and wire used in vessels), glass run channel, colored skin material, paper-feeding roll, roofing sheet, and so on. In particular, they are suitably used for interior or exterior parts of cars and for use applications requiring thermal resistance, and are suitable for hose applications such as brake reservoir hose and radiator hose which are used as an interior part of cars.

In the invention, any ethylene/α-olefin/non-conjugated polyene copolymer can be selected and used on the basis of its appropriate property depending on use applications so long as it satisfies the above described requirements. For example, for the muffler hanger use, an ethylene/α-olefin/non-conjugated polyene copolymer having a relatively high molecular weight can be suitably used, and specifically, the ethylene/α-olefin/non-conjugated polyene copolymer can be preferably used which has a weight-average molecular weight ($M_w$) of from 200,000 to 600,000.

Crosslinked Shaped Article

The crosslinked shaped article according to the invention can be obtained by crosslinking a rubber composition (X) containing the above described ethylene/α-olefin/non-conjugated polyene copolymer (S) and the rubber component (T) in a mass ratio of (S)/(T)=5/95 to 50/50. A production process of the crosslinked shaped article according to the invention has a step of crosslinking the rubber composition (X).

Rubber Compositions (X)

The rubber composition (X) according to the invention may consist only of the ethylene/α-olefin/non-conjugated polyene copolymer (S) and a rubber component (T), or contain any optional component according to use applications in addition to the ethylene/α-olefin/non-conjugated polyene copolymer (S) and the rubber component (T) so long as the purposes of the present invention are not harmed.

<Ethylene/α-Olefin/Non-Conjugated Polyene Copolymer (S)>

The properties and the preferred processes of producing the ethylene/α-olefin/non-conjugated polyene copolymer (S) are as described above.

<Rubber Component (T)>

Examples of the rubber component (T) according to the invention to be used include, but are not limited to, well-known diene rubber, butyl rubber, and halogenated butyl rubber, having double-bonds in its backbone, and these may be used singly or in combination of the two or more kinds. Preferably used diene rubbers are polymer or copolymer rubbers which are mainly composed of a conjugated diene compound. In the invention, the diene rubbers include natural rubber (NR) and hydrogenated rubber. An uncrosslinked rubber component (T) can be usually adopted, which has an iodine value of 100 or more, preferably 200 or more, and more preferably 250 or more.

Examples of such a rubber component (T) include diene rubbers, such as natural rubber (NR), isoprene rubber (IR), styrene-butadiene rubber (SBR), butadiene rubber (BR), chloroprene rubber (CR), acrylonitrile-butadiene rubber (NBR), nitrile rubber, and hydrogenated nitrile rubber, butyl rubber, and halogenated butyl rubber.

Although the butyl rubber and the halogenated butyl rubber are generally categorized to non-diene rubbers, they have unsaturated carbon bonds in their backbone as in the case of diene rubbers, and accordingly, they also have the same problem as that encountered by diene rubbers, which is inferior weatherability in comparison to other non-diene rubbers such as ethylene-propylene rubber. In the invention, weatherability can be improved as is the case for diene rubber, even if butyl rubber and halogenated butyl rubber are used as a rubber component (T).

In the invention, diene rubbers are preferable as a rubber component (T), and in particular natural rubber (NR), isoprene rubber (IR), styrene-butadiene rubber (SBR), and butadiene rubber (BR) are more preferable, and styrene-butadiene rubber (SBR) is particularly preferable. These rubber components (T) are used singly or in combination of the two or more kinds.

A natural rubber (NR) specified according to the Green Book (International Standards of Quality and Packing for Natural Rubber Grades) can be used. An isoprene rubber (IR) having specific gravity of from 0.91 to 0.94 and Mooney viscosity [$ML_{1+4}$(100° C.), JIS K6300] of from 30 to 120 is preferably used.

A styrene-butadiene rubber (SBR) having specific gravity of from 0.91 to 0.98 and Mooney viscosity [$ML_{1+4}$ (100° C.), JIS K6300] of from 20 to 120 is preferably used. A butadiene rubber (BR) having specific gravity of from 0.90 to 0.95 and Mooney viscosity [$ML_{1+4}$(100° C.), JIS K6300] of from 20 to 120 is preferably used.

The rubber composition (X) according to the invention contains the above-mentioned ethylene/α-olefin/non-conjugated polyene copolymer (S) and the rubber component (T) as essential components, in an amount satisfying a mass ratio of the ethylene/α-olefin/non-conjugated polyene copolymer (S) to the rubber component (T) represented by [(S)/(T)], of 5/95 to 50/50, preferably from 15/85 to 45/55, more preferably of from 20/80 to 40/60.

<Optional Components>

The rubber composition (X) may consist only of the ethylene/α-olefin/non-conjugated polyene copolymer (S) and the rubber component (T), or may contain other components which are optional components, according to use applications in addition to the ethylene/α-olefin/non-conjugated polyene copolymer (S) and the rubber component (T), so far as the purposes of the present invention are not harmed.

Examples of the optional components include resin components other than the ethylene/α-olefin/non-conjugated polyene copolymer (S) and the rubber component (T), softening agents, fillers, crosslinking agents, foaming agents, antioxidants (stabilizing agents), anti-weathering agents, plasticizers, coloring agents, and various additives blended into conventionally well-known rubber compositions. These components can be blended as a component of the rubber composition (X), based on their kind and content appropriately chosen according to use applications and characteristics required for a crosslinked shaped article according to the invention.

Softening Agent

Softening agents widely used are those which are conventionally blended with rubber.

Specific examples of the agents include petroleum-based softening agents such as paraffin-based processed oils, naphthene-based processed oils, and aromatic processed oils;
softening materials based on synthesized oils;
cooligomer of ethylene and α-olefin;
paraffin wax;
liquid paraffin;
white oil;
petrolatum;
softening agents based on coal tar such as coal tar and coal tar pitch;
softening agents based on vegetable oils, such as castor oil, cotton oil, linseed oil, canola oil, coconut oil, palm oil, soya oil, groundnut oil, Japan wax, rosin, pine oil, dipentene, pine tar, and tall oil;

substitutes (factices), such as black substitute, white substitute, and candy substitute;

waxes, such as beeswax, carnauba wax, and lanolin;

fatty acids and fatty acid salts, such as ricinoleic acid, palmitic acid, myristic acid, barium stearate, calcium stearate, magnesium stearate, zinc stearate, and lauric acid zinc;

ester-based plasticizers, such as dioctyl phthalate, dioctyl adipate, and dioctyl sebacate;

coumarone-indene resin;

phenol-formaldehyde resin;

terpene-phenol resin;

polyterpene resin;

petroleum-based hydrocarbon resins, such as synthesized polyterpene resins, aromatic hydrocarbon resins, aliphatic hydrocarbon resins, aliphatic ring hydrocarbon resins, aliphatic/alicyclic petroleum resins, aliphatic/aromatic petroleum resins, hydrogenated modified alicyclic hydrocarbon resins, hydrogenated hydrocarbon resins, liquid polybutene, liquid polybutadiene, atactic polypropylene, and so on.

Among them, petroleum-based softening agents, phenol-formaldehyde resin, petroleum-based hydrocarbon resins are preferable, and petroleum-based softening agents, petroleum-based hydrocarbon resins are more preferable, and further petroleum-based softening agents are particularly preferable.

Among the petroleum-based softening agents, preferable are petroleum-based processed oils, among which paraffin-based processed oils, naphthene-based processed oils, aromatic processed oils are more preferable, and paraffin-based processed oils are particularly preferable. Among the petroleum-based hydrocarbon resins, aliphatic ring hydrocarbon resins are preferable.

Among these softening agents, paraffin-based processed oils are particularly preferable.

These softening agents can be used singly or in combination of the two or more kinds.

Crosslinking Agent

The rubber composition (X) according to the invention is a crosslinkable composition, which can be crosslinked to manufacture crosslinking shaped articles according to the invention. Crosslinking may be carried out by heating using a crosslinking agent, or through radiation crosslinking by irradiating with radiations such as electron beam, X-ray, γ-ray, α-ray, and β-ray. Among these radiation crosslinkings, electron beam crosslinking is preferable.

Crosslinked shaped articles according to the invention are preferably manufactured by radiation crosslinking, particularly by electron beam crosslinking, and in this case, the rubber composition (X) may contain no crosslinking agent.

When the rubber composition (X) is crosslinked by heating, it preferably contains a crosslinking agent.

Crosslinking agents, such as sulfur, sulfur compounds, and organic peroxides can be used.

The form of sulfur is not particularly limited and is, for example, powder sulfur, sedimented sulfur, colloidal sulfur, surface-treated sulfur, or insoluble sulfur. Examples of the sulfur compounds include sulfur chloride, sulfur dichloride, polymeric multisulfide, morpholine disulfide, alkylphenol disulfide, tetramethylthiuram disulfide, dimethyl selenium diethyldithiocarbamate, and so on.

Examples of the organic peroxides include alkyl peroxides, such as dicumyl peroxide, di-t-butyl peroxide, di-t-butylperoxy-3,3,5-trimethylcyclohexane, t-butylcumyl peroxide, di-t-amyl peroxide, 2,5-dimethyl-2,5-di(t-butylperoxy)hexyne-3, 2,5-dimethyl-2,5-di(benzoylperoxy) hexane, 2,5-dimethyl-2,5-di(t-butylperoxy)hexane, α,α'-bis (t-butylperoxy-m-isopropyl)benzene, and t-butyl hydroperoxide;

peroxyesters, such as t-butyl peroxy acetate, t-butyl peroxy isobutylate, t-butyl peroxy pyvalate, t-butyl peroxy maleate, t-butyl peroxy neodecanoate, t-butyl peroxy benzoate, di-t-butyl peroxy phthalate;

ketone peroxides such as dicyclohexanone peroxide, and so on. They can be used singly or in combination of the two or more kinds.

Among them, organic peroxides are preferable which have a one-minute-half-life temperature of from 130 to 200° C., and for example, dicumyl peroxide, di-t-butyl peroxide, di-t-butylperoxy-3,3,5-trimethylcyclohexane, t-butylcumyl peroxide, di-t-amyl peroxide, and t-butyl hydroperoxide are preferable.

Among the above described various crosslinking agents, sulfur and the sulfur compounds are preferable, and sulfur is particularly preferable from the view point of capability to provide a rubber composition having excellent properties.

When the crosslinking agent is sulfur or a sulfur compound, it can be used in an amount of from 0.1 to 10 parts by mass, preferably from 0.5 to 5 parts by mass with respect to 100 parts by mass in total of the ethylene/α-olefin/non-conjugated polyene copolymer (S) and the rubber component (T). When the crosslinking agent is an organic peroxide, it can be used in an amount of from 0.05 to 15 parts by mass, preferably from 0.15 to 5 parts by mass with respect to 100 parts by mass in total of the ethylene/α-olefin/non-conjugated polyene copolymer (S) and the rubber component (T).

When sulfur or the sulfur compounds are used as a crosslinking agent, a crosslink (vulcanization) promoter is preferably used in combination therewith. Examples of the crosslink promoter include sulfenamide compounds, such as N-cyclohexyl-2-benzothiazole sulfenamide (CBS), N-oxydiethylene-2-benzothiazole sulfenamide, and N,N-diisopropyl-2-benzothiazole sulfenamide; thiazole compounds, such as 2-mercaptobenzothiazole (MBT), 2-(2,4-dinitrophenyl) mercaptobenzothiazole, 2-(2,6-diethyl-4-morpholinothio) benzothiazole, 2-(4'-morpholinodithio)benzothiazole, and dibenzothiazyldisulfide;

guanidine compounds, such as diphenylguanidine, triphenylguanidine, diorthonitrylguanidine, orthonitrile biguanide, and diphenylguanidine phthalate;

aldehyde amines or aldehyde-ammonia-based compounds, such as acetaldehyde-aniline reaction product, butyraldehyde-aniline condensate, hexamethylenetetramine, and acetaldehyde ammonia; imidazoline-based compounds such as 2-mercaptoimidazoline; thiourea compounds, such as thiocarbanilide, diethylthiourea, dibutylthiourea, trimethylthiourea, and diorthotolylthiourea; thiuram compounds, such as tetramethylthiurammonosulfide, tetramethylthiuramdisulfide (TMTD), tetraethylthiuramdisulfide, tetrabutylthiuramdisulfide, pentamethylenethiuramtetrasulfide, dipentamethylenethiuramtetrasulfide (DPTT); dithiocarbamate compounds, such as zinc dimethyldithiocarbamate, zinc diethyldithiocarbamate, zinc di-n-butyldithiocrabamate, zinc ethylphenyldithiocarbamate, zinc butylphenyldithiocarbamate, sodium dimethyldithiocarbamate, selenium dimethyldithiocarbamate, and tellurium diethyldithiocarbamate; xanthate-based compounds such as zinc dibutylxanthate; hydrozincite, and so on.

The cross link promoter can be used in an amount of from 0.1 to 20 parts by mass, preferably from 0.2 to 10 parts by mass with respect to 100 parts by mass in total of the ethylene/α-olefin/non-conjugated polyene copolymer (S) and the rubber component (T).

When the organic peroxide is used as a crosslinking agent, a crosslinking aid is preferably used in combination therewith in an amount of from 0.5 to 2 moles per mole of the organic peroxide, and preferably in an approximately equal molar amount to that of the peroxide. Examples of the crosslinking aid include sulfur; multifunctional monomers, for example, acrylate or methacrylate compounds such as trimethylolpropane triacrylate and polyethylene glycol dimethacrylate, in addition to quinone dioxime compounds such as p-quinone dioxime; allyl compounds such as diallyl phthalate and triallyl cyanurate; maleimide compounds such as m-phenylene bismaleimide; divinylbenzene, and so on.

Filler

The rubber composition (X) of the invention can contain a filler (support agent) according to use applications and required characteristics.

Examples of the filler include carbon blacks, such as SRF, GPF, FEF, MAF, HAF, ISAF, SAF, FT, and MT; surface-treated carbon blacks obtained therefrom by treating the surface thereof by using, for example, a silane coupling agent; inorganic fillers, such as silica, activated calcium carbonate, light calcium carbonate, heavy calcium carbonate, powdered talc, talc, powdered silica fine-particle, clay and so on.

The blended amount of the filler may be about 300 parts by mass or less, preferably from 10 to 300 parts by mass, more preferably from 10 to 200 parts by mass with respect to 100 parts by mass in total of the ethylene/α-olefin/non-conjugated polyene copolymer (S) and the rubber component (T).

When the rubber composition (X) contains a filler in such an amount, it can provide a crosslinked shaped article having not only improved mechanical properties, such as tensile strength, tear strength, and wear resistance, but also enhanced hardness without damaging other physical properties thereof, even with decreased production cost of the article.

Foaming Agent

When a target crosslinked shaped article is a foamed shaped article, the rubber composition (X) according to the invention may contain a foaming agent, a foaming aid, and other agents. Foaming agents which are generally used for foaming rubber can be widely used.

Example of such a foaming agent include inorganic foaming agents, such sodium bicarbonate, sodium carbonate, ammonium bicarbonate, carbonic acid ammonium, and ammonium nitrite;

nitroso compounds, such as N,N'-dimethyl-N,N'-dinitrosoterephthalamide, and N,N'-dinitrosopentamethylenetetramine;

azo compounds, such as azodicarbonamide, azobisisobutyronitrile, azocyclohexylnitryl, azodiaminobenzene, and barium azodicarboxylate;

sulfonyl hydrazide compounds, such as benzenesulfonyl hydrazide, toluenesulfonyl hydrazide, p,p'-oxybis(benzenesulfonyl hydrazide), and diphenylsulfone-3,3'-disulfonyl hydrazide;

azide compounds, such as calcium azide, 4,4-diphenyldisulfonyl azide, and p-toluenesulfonyl azide. Among them, nitroso compounds, azo compounds, azide compounds are preferable.

The foaming agent can be used in an amount of from 0.5 to 30 parts by mass, preferably from 1 to 20 parts by mass with respect to 100 parts by mass in total of the ethylene/α-olefin/non-conjugated polyene copolymer (S) and the rubber component (T). A crosslinked shaped article which is a foamed article having an apparent specific gravity of from 0.03 to 0.8 g/cm$^3$ can be manufactured from a rubber composition (X) containing the foaming agent in such an amount.

In addition to the foaming agent, a foaming aid can be used, which exhibits advantageous effects, such as decrease in degradation temperature and enhancement of degradation of the foaming agent, and homogenization of bubbles, when used in combination with the foaming agent. Examples of the foaming aid include organic acids, such as salicylic acid, phthalic acid, stearic acid, and oxalic acid, and urea or derivatives thereof.

The foaming aid can be used in an amount of from 0.01 to 10 parts by mass, preferably from 0.1 to 5 parts by mass with respect to 100 parts by mass in total of the ethylene/α-olefin/non-conjugated polyene copolymer (S) and the rubber component (T).

Antioxidant

The rubber composition (X) according to the invention preferably contains an antioxidant from the view point of capability to elongate a material life. Examples of the antioxidant include stabilizing agents based on aromatic secondary amines, such as phenylnaphthylamine, 4,4'-(α,α-dimethylbenzyl)diphenylamine, N,N'-di-2-naphthyl-p-phenylenediamine;

stabilizing agents based on phenol, such as 2,6-di-t-butyl-4-methyl phenol, tetrakis-[methylene-3-(3',5'-di-t-butyl-4'-hydroxyphenyl) propionate]methane;

stabilizing agent based on thioether such as bis[2-methyl-4-(3-n-alkylthiopropionyloxy)-5-t-butylphenyl]sulfide; stabilizing agent based on benzoimidazole such as 2-mercaptobenzoimidazole;

stabilizing agent based on dithiocrabamates such as nickel dibutyldithiocarbamate;

stabilizing agent based on quinoline such as a polymerized product of 2,2,4-trimethyl-1,2-dihydro quinolone, and so on. These can be used singly or in combination of the two or more kinds.

The antioxidant can be used in an amount of 5 parts by mass or less, preferably 3 parts by mass or less with respect to 100 parts by mass in total of the ethylene/α-olefin/non-conjugated polyene copolymer (S) and the rubber component (T).

Processing Auxiliary Agent

Processing auxiliary agents which can be widely used are those generally blended with rubber as a processing auxiliary agent. Examples of the processing auxiliary agent include linoleic acid, stearic acid, palmitic acid, lauric acid, salts of these higher fatty acids, such as barium stearate, zinc stearate, and calcium stearate, and esters.

The processing auxiliary agent can be used in an amount of 10 parts by mass or less, and preferably 5 parts by mass or less with respect to 100 parts by mass in total of the ethylene/α-olefin/non-conjugated polyene copolymer (S) and the rubber component (T).

As mentioned above, the rubber composition (X) according to the invention can appropriately contain various additives which can be blended with well-known rubber compositions.

Although the rubber composition (X) according to the invention can contain various optional components, as mentioned above, without any particular limitation, it can easily yield a crosslinked shaped article excellent in weatherability even if the content of a weathering stabilizer and an antioxidant in the rubber composition (X) are reduced, because the ethylene/α-olefin/non-conjugated polyene copolymer (S) and the rubber component (T) composing the rubber composition (X), due to their good compatibility, enable production of the crosslinked shaped article without phase separation by using the rubber composition (X) containing them, and moreover, the ethylene/α-olefin/non-conjugated polyene copolymer (S) gives excellent weatherability to the crosslinked shaped article. For this reason, the content of additives such as a weathering stabilizer and an antioxidant can be suitably reduced, and this is economical and prevents the crosslinked shaped article from quality degradation due to bleeding out.

<Rubber Composition (X)>

The rubber composition (X) according to the invention contains the ethylene/α-olefin/non-conjugated polyene copolymer (S) and the rubber component (T) in amass ratio of (S)/(T)=5/95 to 50/50, preferably 15/85 to 45/55, and more preferably 20/80 to 40/60. The rubber composition (X) according to the invention can contain any of the above optional components, as necessary, in addition to the ethylene/α-olefin/non-conjugated polyene copolymer (S) and the rubber component (T).

The content in total of the ethylene/α-olefin/non-conjugated polyene copolymer (S) and the rubber component (T) in the rubber compositions (X) according to the invention is 3% by mass or more, preferably 5% by mass or more, and preferably 90% by mass or less although the content does not have any particular limitation. The rubber composition according to the invention also has excellent rubber elasticity, weatherability, ozone resistance, and in particular, excellent mechanical properties, weatherability, and fatigue resistance. The rubber composition also has excellent abrasion resistance. Accordingly, when the rubber composition according to the invention is applied to tires, they can not only be well balanced between excellent brake performance and excellent fuel consumption but also have excellent rubber elasticity, weatherability, ozone resistance, and in particular, excellent mechanical properties and fatigue resistance. In addition, tires also having excellent abrasion resistance can be obtained.

The rubber composition (X) according to the invention can be prepared by blending the ethylene/α-olefin/non-conjugated polyene copolymer (S), the rubber component (T), and as necessary, an optional component simultaneously or sequentially.

Processes of preparing the rubber composition (X) have no particular limitation, and general processes of preparing rubber blends can be adopted without any particular limitation. For example, when the inventive rubber composition (X) contains an optional component, at least a portion of the optional component may be previously mixed with the ethylene/α-olefin/non-conjugated polyene copolymer (S) or the rubber component (T), followed by blending the remaining portion, or the ethylene/α-olefin/non-conjugated polyene copolymer (S) and the rubber component (T) may be first blended, followed by adding and blending the optional component.

For example, the composition can be prepared by kneading the ethylene/α-olefin/non-conjugated polyene copolymer (S), the rubber component (T), and other components to be blended as necessary, at a temperature of from 80 to 170° C. for 3 to 10 minutes, by using an internal mixer such as a Bambury mixer, a kneader, and a intermix, then adding, as necessary, a crosslinking agent and, again as necessary, a crosslink promoter, a crosslinking auxiliary agent, a foaming agent and so on, and again kneading with roll mills such as an open roll or a kneader at a roll temperature of 40 to 80° C. for 5 to 30 minutes, followed by sheeting. In this manner, the rubber composition (X) usually in the form of ribbon or sheet is obtained. When the kneading temperature in the above internal mixer is low, the crosslinking agent, the crosslink promoter, and the foaming agent and so on can also be simultaneously kneaded.

<Crosslinking Process/Crosslinked Shaped Article>

The crosslinked shaped article of the invention is a shaped article obtained by crosslinking the above rubber composition (X). The process of producing the crosslinked shaped article has a step of crosslinking the above rubber composition (X).

Crosslinking of the rubber compositions (X) (step of crosslinking rubber composition (X)) can be carried out by heating the above uncrosslinked rubber composition (X) preformed into a desired shape by various forming processes usually using a forming machine such as a extrusion-molding machine, a calender roll, a press, an injection-molding machine, or a transfer-molding machine, simultaneously with the shaping or after introducing the shaped product into a crosslinking tub, or by carrying out irradiation crosslinking by irradiating the composition with radiation such as electron beam, X-ray, γ-ray, α-ray, and β-ray. The appropriately adopted shaping or preforming processes include well-known forming processes which form a composition into a desirable shape, for example, by extrusion molding, injection-molding, inflation molding, blow molding, extrusion blow molding, press-forming, vacuum forming, calendar forming, and foam-molding. When the crosslinked shaped article is a foamed article, it can be manufactured by foam-molding the uncrosslinked rubber composition blended with a foaming agent, which is then crosslinked by electron beam irradiation or heating, or by foam-molding and crosslinking the composition simultaneously. In addition, the step of crosslinking the rubber composition (X) may be carried out by the combination of crosslinking by heating and electron beam crosslinking.

In the invention, crosslinking of the rubber composition (X) is preferably carried out by radiation crosslinking, and in particular, by electron beam crosslinking.

When the above-mentioned rubber composition (X) is crosslinked by heating, it is preferable to heat a rubber composition (X) containing a crosslinking agent such as sulphur, a sulfur compound, and a peroxide, by using hot air, a glass bead fluidized bed, UHF (ultra-high frequency), steam, or a heating-type crosslinking tub such as LCM (hot molten salt bath), at a temperature from 150 to 270° C. for one to 30 minutes. Since crosslinking with sulphur or peroxides has an advantage that the crosslinking step needs no special apparatus, it has been widely used as a crosslink step of rubber compositions.

When crosslinking is carried out by electron beam irradiation, it is preferable to manufacture a crosslinked shaped article from a rubber composition (X) containing usually no crosslinking agent by irradiating the preformed rubber composition (X) with electron beam. Since crosslinking by electron beam irradiation can be carried out with no crosslinking agent, it has an advantage that a small amount of volatile is generated in the crosslinking step.

The production of a crosslinked shaped article involving the crosslinking step by electron beam irradiation can be carried out specifically, for example, as follows. First, the ethylene/α-olefin/non-conjugated polyene copolymer (S), the rubber component (T), and as necessary, various additives and a crosslinking auxiliary agent are kneaded by using a mixer such as Bambury mixer at a temperature from 80 to 170° C. for 3 to 10 minutes, and then kneaded by roll mills such as an open roll at a roll temperature from 40 to 80° C. for 5 to 30 minutes, followed by sheeting to prepare a rubber composition (X) in the form of a ribbon or sheet, or the respective components are blended, for example, in a container to prepare a rubber composition (X). The rubber composition (X) prepared in this manner is irradiated with electron beam, for example, as-is in the form of sheet, or in the form of a desirable shape formed by a extrusion-molding machine, a calender roll, an injection-molding machine, or press, or in the form of a pellet formed by trituration, for example, by using a cutter after extruded by a extruder into a form of strand. Alternatively, powder of the ethylene/α-olefin/non-conjugated polyene copolymer (S) and the rubber component (T) impregnated with a compound such as a crosslinking aid may be directly irradiated with electron beam to prepare a crosslinked article of the rubber composition (X). Irradiation with electron beam is carried out so that absorbed dose of electron beam having an energy of usually from 0.1 to 10 MeV (mega-electron volt), preferably from 0.3 to 5 MeV is usually from 0.5 to 100 kGy (kilogray), preferably from 0.5 to 70 kGy.

Gamma-ray irradiation is more transparent to rubber compositions (X) than electron beam irradiation, and in particular, when carried out on the rubber composition (X) which is in the form of a pellet, it can achieve sufficient crosslinking into the inside of the pellet by a minor amount of direct γ-ray irradiation. The γ-ray irradiation can be carried out on the rubber compositions (X) so that dose of the γ-ray is from 0.1 to 50 kGy, preferably from 0.3 to 50 kGy.

Forming and crosslinking may be carried out with or without a metal mold. Without a metal mold, the rubber composition (X) is usually formed and crosslinked sequentially.

In the invention, crosslinking the rubber compositions (X) is carried out by a step containing electron beam crosslinking, and more preferably carried out by electron beam crosslinking. Although crosslinking by electron beam irradiation has been used for crosslinking the surface of uncrosslinked shaped articles, it can achieve, in the invention, homogeneous crosslinking without phase separation to suitably manufacture a crosslinked shaped article even when crosslinking of rubber composition (X) is carried out into the inside of the composition by electron beam crosslinking, because the rubber composition (X) has excellent crosslinking characteristics due to the highly crosslinkable characteristic of the ethylene/α-olefin/non-conjugated polyene copolymer (S) which constitutes the rubber composition (X).

Degree of crosslinkage of a crosslinked shaped article can be represented by gel fraction. The gel fraction of the crosslinked article is usually from 1 to 80%. However, for crosslinked shaped articles in the invention, the degree of crosslinkage is not limited within the range, and crosslinked articles having a low degree of crosslinkage represented by a gel fraction of 10% or less, particularly 0.5% or less can also provide excellent surface appearance as in the case of those having a high degree of crosslinkage.

The crosslinked shaped article according to the invention can be used, without any limitation, for various products having rubber properties. The crosslinked shaped article according to the invention only have to form at least part of the product, and preferably it forms the entirety of the product, and moreover, it is also preferably a laminate or composite which forms at least part of the product. Examples of the laminate include a multilayered laminate having two or more layers at least one of which is a crosslinked shaped article according to the invention, and they include various forms, such as a multilayered film and sheet, a multilayered container, a multilayered tube, and a laminate multi-coated by a coating containing the product as a component of a water-based paint.

Since the crosslinked shaped article according to the invention particularly has excellent weatherability, it can be suitably used for applications used outdoors for long period of time, such as tires and a material for wire cover, and in particular, used for tire members constituting at least part of various tires.

Examples of the tire member include tire inner liner, tire inner tube, tire flap, tire shoulder, tire bead, tire tread, and tire sidewall, and so on. Among them, the crosslinked shaped article can be suitable used particularly for tire tread, and tire sidewall.

The crosslinked shaped article of the invention not only keeps excellent mechanical strength intrinsically possessed by diene rubber, but also is homogeneous due to the excellent crosslinkability of the rubber composition (X), and exhibits excellent weatherability and dynamical mechanical strength. Tire members such as tire tread and tire sidewall using the crosslinked shaped article of the invention exhibit excellent dynamic fatigue resistance as well as excellent weatherability.

Resin Composition
Components Constituting Resin Composition

The resin composition of the invention contains the above-described (S) ethylene/α-olefin/non-conjugated polyene copolymer, (E) a powdered silica and/or powdered silicate salt, the crosslinking agent as an essential component, and as necessary, a (F) metal α,β-unsaturated carboxylate.

(S) Ethylene/α-Olefin/Non-Conjugated Polyene Copolymer

Properties of ethylene/α-olefin/non-conjugated polyene copolymer (S) and preferred production processes have been described above.

(E) Powdered Silica/Powdered Silicate Salt

The powdered silica and/or powdered silicate salt (E) according to the invention has a specific surface area of from 5 to 500 m²/g (BET adsorbed amount: ISO 5794/1, Annex D), and preferably from 10 to 400 m²/g. Examples of the powdered silica and powdered silicate salt include dry silica, wet silica, silica based on synthesized silicate, and so on. Examples of the silicate include, for example, magnesium silicate. In the invention, the powdered silica and/or powdered silicate salt can be used singly or in combination of them. In the invention, "powdered" means, but is not particularly limited to, a particle having an average particle diameter of approximately from 10 to 50 μmm.

Such a powdered silica and/or powdered silicate salt (E) is used usually in an amount of from 5 to 90 parts by weight, preferably from 20 to 80 parts by weight, in total, of the powdered silica and powdered silicate salt in the resin composition of the invention with respect to 100 parts by weight of the above-mentioned ethylene/α-olefin/non-conjugated polyene copolymer (S). When the resin composition of the invention is used for an anti-vibration rubber product, the resin composition is required to exhibit dynamical properties represented by a vibrational damping effect suitable to the use application of the product, and thus it can be used by adjusting the blending ratio of the powdered silica and/or powdered silicate salt, according to the use application.

(F) Metal α,β-Unsaturated Carboxylate

Examples of the metal α,β-unsaturated carboxylate according to the invention (F) include at least one compound preferably selected from metal acrylates, metal methacrylates, and metal maleates.

Examples of the metal acrylates, metal methacrylates, and metal maleates include, for example, alkali metal salts of acrylic acid, methacrylic acid, and maleic acid (for example, lithium salts, sodium salts, and potassium salts), alkali earth metal salts (for example, magnesium salts, and calcium salts), heavy metal salts (for example, zinc salts), aluminum salts, and specifically, lithium acrylate, sodium acrylate, potassium acrylate, magnesium diacrylate, calcium diacrylate, zinc diacrylate, aluminum triacrylate, lithium methacrylate, sodium methacrylate, potassium methacrylate, zinc methacrylate, magnesium dimethacrylate, calcium dimethacrylate, zinc dimethacrylate, aluminum trimethacrylate, lithium maleate, sodium maleate, potassium maleate, magnesium maleate, zinc maleate, and aluminum maleate. Metal α,β-unsaturated carboxylates, such as zinc methacrylate and zinc dimethacrylate are particularly preferable, and zinc methacrylate is most preferable. The metal α,β-unsaturated carboxylates can be used singly or in combination of the two or more kinds.

The metal α,β-unsaturated carboxylate (F) is contained, as necessary, in the resin composition of the invention and used usually in an amount of 20 parts by weight or less, preferably from 0.1 to 20 parts by weight, and more preferably from 0.2 to 10 parts by weight, in total, with respect to 100 parts by weight of the above-mentioned ethylene/α-olefin/non-conjugated polyene copolymer (S). The metal α,β-unsaturated carboxylate can improve interaction between the ethylene/α-olefin/non-conjugated polyene copolymer (S) and the powdered silica and/or powdered silicate salt (E), resulting in a crosslink rubber product having excellent dynamical properties and mechanical physical properties. In particular, when the resin composition of the invention contains an organic peroxide (G) described later as a crosslinking agent, it is preferable that the resin composition contains the metal α,β-unsaturated carboxylate (F) because interaction between the powdered silica and/or powdered silicate salt (E) and the metal α,β-unsaturated carboxylate (F) is particularly excellent.

Crosslinking Agent

The resin composition of the invention contains an organic peroxide (G) and/or a SiH group-containing compound containing intramolecularly at least two SiH groups (H) as crosslinking agents.

(G) Organic Peroxide

When the resin composition of the invention contains an organic peroxide (G) as a crosslinking agent, the organic peroxide (G) can be conventionally well-known organic peroxides usually used for crosslinking rubber.

Specific examples of the organic peroxide include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, peroxybenzoate, p-chloroperoxybenzoate, 2,4-dichloroperoxybenzoate, tert-butylperoxybenzoate, tert-butylperoxyisopropyl carbonate, diacetyl peroxide, lauroyl peroxide, tert-butylcumyl peroxide. These peroxides may be used singly or in combination of the two or more kinds.

The organic peroxide is used in a total amount of the organic peroxides in the resin composition of the invention, of from 0.1 to 15 parts by weight, preferably from 0.5 to 12 parts by weight with respect to 100 parts by weight of the above-mentioned (S) ethylene/α-olefin/non-conjugated polyene copolymer, from the viewpoint of obtaining target physical properties by sufficient crosslinking, of preventing a harmful effect due to excessive decomposed products, and of costs.

Crosslinking Aid

When the resin composition of the invention contains the organic peroxide (G) as a crosslinking agent, it may contain a crosslinking aid as an optional component. Specific examples of the crosslinking aid include sulfur; quinone dioxime compounds such as p-quinone dioxime; methacrylate compounds such as polyethylene glycol dimethacrylate; allyl compounds such as diallyl phthalate and triallyl cyanurate; maleimide compounds; and divinylbenzene. These crosslinking aids are used in an amount of from 0.5 to 2 moles with respect to 1 mole of, and preferably in an equal molar amount to that of an organic peroxide to be used.

(H) SiH Group-Containing Compound Containing Intramolecularly at Least Two SiH Groups When the resin composition of the invention contains a SiH group-containing compound containing intramolecularly at least two SiH groups (H) (hereinafter, also referred to as SiH group-containing compound (H)) as a crosslinking agent, the SiH group-containing compound (H) reacts with the ethylene/α-olefin/non-conjugated polyene copolymer (S) and acts as a crosslinking agent. Although this SiH group-containing compound (H) does not have any particular limitation for its molecule structure and may be resin-like products in the form of, for example, a conventionally produced linear, ring-shaped, or branching structure, or a three-dimensional network structure, it must contain intramolecularly hydrogen atoms directly bonding to at least two, preferably tree or more silicon atoms, in other words, SiH groups.

Compounds usually represented by the general composition formula,

$$R^4{}_b H_c SiO_{(4-b-c)/2},$$

can be used as a SiH group-containing compound (H).

In the above-mentioned general composition formula, $R^4$ is a substituted or non-substituted monovalent hydrocarbon group of 1 to 10 carbon atoms, particularly 1 to 8 carbon atoms, with no aliphatic unsaturated bond, and the monovalent hydrocarbon group can be exemplified by phenyl group and halogen substituted alkyl groups such as trifluoropropyl group, as well as alkyl groups exemplifying the above-described $R^1$. Among them, methyl, ethyl, propyl, phenyl, and trifluoropropyl groups are preferable, and in particular, methyl and phenyl groups are preferable.

In addition, b satisfies $0 \leq b < 3$, preferably $0.6 < b < 2.2$, particularly preferably $1.5 \leq b \leq 2$, and c satisfies $0 < c \leq 3$, preferably $0.002 \leq c < 2$, particularly preferably $0.01 \leq c \leq 1$, and b+c satisfies $0 < b+c \leq 3$, preferably $1.5 < b+c \leq 2.7$.

This SiH group-containing compound (H) is an organohydrogen polysiloxane having preferably 2 to 1000, particularly preferably 2 to 300, and most preferably 4 to 200 silicon atoms per molecule, and specific examples thereof include siloxane oligomers, such as 1,1,3,3-tetramethyldisiloxane, 1,3,5,7-tetramethyltetracyclosiloxane, and 1,3,5,7,8-pentamethypentacyclosiloxane; methyl hydrogen polysiloxane having both molecular terminals capped with trimethylsiloxy group, dimethyl siloxane/methyl hydrogen siloxane copolymer having both molecular terminals capped with trimethylsiloxy group, methyl hydrogen polysiloxane having both molecular terminals capped with silanol group, dimethyl siloxane/methyl hydrogen siloxane copolymer having both molecular terminals capped with silanol group, dimethyl polysiloxane having both molecular terminals capped with dimethylhydrogensiloxy group, methyl hydrogen polysiloxane having both molecular terminals capped with dimethyhydrogen siloxy group, dimethyl siloxane/methyl hydrogen siloxane copolymer having both molecular terminals capped with dimethyhydrogen siloxy group, and a silicone resin which is composed of $R^4{}_2(H)SiO_{1/2}$ and $SiO_{4/2}$ units, and which may optionally contain $H^4{}_3SiO_{1/2}$, $R^4{}_2SiO_{2/2}$, $H^4(H)SiO_{2/2}$, $(H)SiO_{3/2}$, or $R^4SiO_{3/2}$ unit.

Examples of the methyl hydrogen polysiloxane having both terminals capped with trimethylsiloxy group include, for example, compounds represented by the following formula, and in addition, compounds having some or all of the methyl groups in the following formula substituted by, for example, ethyl, propyl, phenyl, or trifluoropropyl group,

[wherein d is an integer of 2 or more].

Examples of the dimethyl siloxane/methyl hydrogen siloxane copolymer having both terminals capped with trimethylsiloxy group include compounds represented by the following formula, and in addition, compounds having some or all of the methyl groups in the following formula substituted by, for example, ethyl, propyl, phenyl, or trifluoropropyl group,

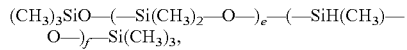

[wherein e is an integer of 1 or more, and f is an integer of 2 or more].

Examples of the methyl hydrogen polysiloxane having both terminals capped with silanol group include, for example, compounds represented by the following formula, and in addition, compounds having some or all of the methyl groups in the following formula substituted by, for example, ethyl, propyl, phenyl, or trifluoropropyl group,

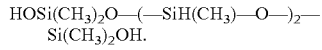

Examples of the dimethyl siloxane/methyl hydrogen siloxane copolymer having both terminals capped with silanol group include, for example, compounds represented by the following formula, and in addition, compounds having some or all of the methyl groups in the following formula substituted by, for example, ethyl, propyl, phenyl, or trifluoropropyl group,

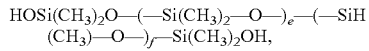

[wherein e is an integer of 1 or more, and f is an integer of 2 or more].

Examples of the dimethyl polysiloxane having both terminals capped with dimethylhydrogensiloxy group include, for example, compounds represented by the following formula, and in addition, compounds having some or all of the methyl groups in the following formula substituted by, for example, ethyl, propyl, phenyl, or trifluoropropyl group,

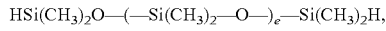

[wherein e is an integer of 1 or more].

Examples of the methyl hydrogen polysiloxane having both terminals capped with dimethylhydrogensiloxy group include, for example, compounds represented by the following formula, and in addition, compounds having some or all of the methyl groups in the following formula substituted by, for example, ethyl, propyl, phenyl, or trifluoropropyl group,

[wherein e is an integer of 1 or more].

Examples of the dimethyl siloxane/methyl hydrogen siloxane copolymer having both terminals capped with dimethyhydrogensiloxy group include, for example, compounds represented by the following formula, and in addition, compounds some or all of the methyl groups in the following formula substituted by, for example, ethyl, propyl, phenyl, or trifluoropropyl group,

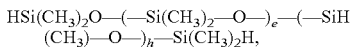

[wherein e and h are each integers of 1 or more].

These compounds can be manufactured by well-known processes, and they can be easily obtained, for example, by equilibrating octamethylcyclotetrasiloxane and/or tetramethylcyclotetrasiloxane with a compound containing triorganosilyl group or diorganohydrogensiloxy group which can be a terminal group, such as hexamethyl disiloxane or 1,3-dihydro-1,1,3,3-tetramethyldisiloxane, under the presence of a catalyst, such as sulphuric acid, trifluoromethanesulfonic acid, and methanesulphonic acid, at a temperature of about −10° C. to +40° C.

The SiH group-containing compound (H) can be used singly or in combination of the two or more kinds.

Such a SiH group-containing compound (H) is used usually in a total amount of the SiH group-containing compound (H) in the resin composition of the invention of from 0.1 to 15 parts by weight, preferably from 0.5 to 10 parts by weight with respect to 100 parts by weight of the above-mentioned ethylene/α-olefin/non-conjugated polyene copolymer (S). When the SiH group-containing compound (H) is used in a fraction within the above-mentioned range, the resultant resin composition yields a crosslinked rubber shaped article having not only excellent compression set resistance, but also excellent strength properties and extension properties because of appropriate crosslinking density. Using the SiH group-containing compound (H) in a fraction higher than 15 parts by weight may be disadvantageous in terms of costs.

Catalyst for Addition Reaction

When the resin composition of the invention contains the SiH group-containing compound (H), the resin composition may also contain a catalyst for addition reaction as an optional component, which has a role of promoting addition reaction of the alkenyl group of the above-mentioned ethylene/α-olefin/non-conjugated polyene copolymer component (S) and the SiH group of SiH group-containing compound (H) (hydrosilylation reaction of the alkene).

The catalyst for addition reaction has no particular limitation so long as it promotes such an addition reaction, and examples thereof include catalysts for addition reaction composed of platinum group elements, for example, platinum-based catalysts, palladium-based catalysts, rhodium-based catalysts (catalysts based on metals of Group 8, such as metals of Group 8, metal complexes of Group 8, and metal compounds of Group 8), and in particular, platinum-based catalysts are preferable.

The platinum catalysts may be those which are well-known and usually used in curing of addition-curable type, and examples of the catalysts include, for example, a powdered metal platinum catalyst described in U.S. Pat. No. 2,970,150, a chloroplatinic acid catalyst described in U.S. Pat. No. 2,823,218, complex compounds of platinum and hydrocarbon described in U.S. Pat. No. 3,159,601 and 159,662, a complex compound of chloroplatinic acid and olefin described in U.S. Pat. No. 3,516,946, and complex compounds of platinum and vinylsiloxane described in U.S.

Pat. Nos. 3,775,452 and 3,814,780. More specific examples thereof include simple substance of platinum (platinum black), chloroplatinic acid, a platinum-olefin complex, a platinum-alcohol complex, or a catalyst having a carrier of platinum supported on a carrier such as alumina and silica.

The above-mentioned palladium catalysts are composed of palladium, palladium compounds, palladium chloride acid, and others, and the above-mentioned rhodium catalysts are composed of rhodium, rhodium compounds, and rhodium chloride acid, and others.

Examples of a catalyst for addition reaction other than those mentioned-above include, for example, Lewis acid, cobalt carbonyl, and so on. Catalysts for addition reaction are used usually in an amount of from 0.1 to 100,000 weight ppm, preferably from 0.1 to 10,000 weight ppm, more preferably from 1 to 5,000 weight ppm, and particularly preferably from 5 to 1,000 weight ppm with respect to the ethylene/α-olefin/non-conjugated polyene copolymer (S).

Catalysts for addition reaction used in a fraction within the above-mentioned range yields a rubber composition which can form a crosslinked rubber shaped article having excellent strength property and extension property because of appropriate crosslinking density. It is unfavorable to use the catalyst for addition reaction in a fraction above 100,000 weight ppm because it may be disadvantageous in terms of costs.

In the invention, a crosslinked rubber shaped article can also be obtained by irradiating a rubber composition which does not contain the above-mentioned catalyst for addition reaction, with light, γ-ray, and electron beam.

Reaction Inhibitor

The resin composition of the invention may contain, together with the above-mentioned catalyst for addition reaction, a reaction inhibitor as an optional component. Examples of the reaction inhibitor include benzotriazole, ethynyl group-containing alcohol (for example, ethynyl cyclohexanol), acrylonitrile, amide compounds (for example, N,N-diallylacetamide, N,N-diallylbenzamide, N,N,N',N'-tetra allyl-o-phthalic-acid diamide, N,N,N',N'-tetra allyl-m-phthalic-acid diamide, N,N,N',N'-tetra allyl-p-phthalic-acid diamide), sulfur, phosphorus, nitrogen, amine compounds, sulfur compounds, phosphorus compounds, tin, tin compounds, tetramethyltetravinylcyclotetrasiloxane, organic peroxides such as hydroperoxide, and so on.

The reaction inhibitor is used in an amount of from 0 to 50 parts by weight, usually from 0.0001 to 50 parts by weight, preferably from 0.0001 to 30 parts by weight, more preferably from 0.0001 to 20 parts by weight, still more preferably from 0.0001 to 10 parts by weight, and particularly preferably from 0.0001 to 5 parts by weight with respect to 100 parts by weight of the ethylene/α-olefin/non-conjugated polyene copolymer (S). When used in an amount of less than 50 parts by weight, the reaction inhibitor yields a rubber composition having high crosslinking rate and excellent productivity for crosslinked rubber shaped articles. It is unfavorable to use the reaction inhibitor in an amount of more than 50 parts by weight because it may be disadvantageous in terms of costs.

The resin composition of the invention only has to contain either of the above-mentioned organic peroxide (G) or the SiH group-containing compound (H) and may contain both of them as a crosslinking agent.

(J) Compound Containing at Least One Unsaturated Hydrocarbon Group and at Least One Hydrolysable Silyl Group The resin composition of the invention may contain a compound containing at least one unsaturated hydrocarbon group and at least one hydrolysable silyl group (J) as an optional component. Examples of the compound (J) include silane-coupling agents having an unsaturated hydrocarbon group, and specific examples thereof include γ-methacryloyloxypropyltrimethoxysilane, vinyltrimethoxysilane, vinyltris(p-methoxyethoxy)silane, vinyltriethoxysilane, γ-methacryloxypropylmethyldimethoxysilane, and so on.

Because these compounds containing at least one unsaturated hydrocarbon group and at least one hydrolysable silyl group (J) also act as a crosslinking agent, the content thereof in the resin composition is preferably less than $8 \times 10^{-6}$ moles, and more preferably less than $8 \times 10^{-7}$ moles per 1 $m^2$ of the total surface area of the powdered silica and/or silicate salt (E), from the view point of securing appropriate crosslinking density and sufficient extension.

Other Silane-Coupling Agents

The resin composition of the invention may contain a silane-coupling agent other than the above-mentioned component (J), in other words, a silane-coupling agent containing no unsaturated hydrocarbon group such as bis[3-(triethoxysilyl)propyl]tetrasulfide, as an optional component. Because such a silane-coupling agent does not act as a crosslinking agent, it can be blended usually in a fraction of less than $1 \times 10^{-3}$ moles per 1 $m^2$ of the surface area of the powdered silica and/or silicate salt (E).

Antioxidant

The resin composition of the invention may contain an antioxidant.

In the invention, when the antioxidant is used, at least one of kinds selected from sulfur-based antioxidants, phenol-based antioxidants and amine-based antioxidants can be used. The sulfur-based antioxidants used are those usually used for rubber.

Specific examples of the sulfur-based antioxidant include imidazole antioxidants, such as 2-mercaptobenzoimidazole, zinc salt of 2-mercaptobenzoimidazole, 2-mercapto methylbenzoimidazole, zinc salt of 2-mercaptomethylbenzoimidazole, and zinc salt of 2-mercaptomethylimidazole; antioxidants based on aliphatic thioether, such as dimyristylthiodipropionate, dilaurylthiodipropionate, distearylthiodipropionate, ditridecylthiodipropionate, and pentaerythritol-tetrakis(β-lauryl-thiopropionate). Among them, 2-mercaptobenzoimidazole, zinc salt of 2-mercapto benzoimidazole, 2-mercaptomethylbenzo imidazole, zinc salt of 2-mercaptomethylbenzoimidazole, pentaerythritol-tetrakis (β-lauryl-thiopropionate) are particularly preferable.

The phenol-based antioxidants used are those usually used for rubber. Specific examples of the phenol-based antioxidants include styrenated phenol, 2,6-di-t-butylphenol, 2,6-di-t-butyl-4-methyl phenol, 2,6-di-t-butyl-4-ethylphenol, 2,4,6-tri-t-butylphenol, butylhydroxyanisole, 1-hydroxy-3-methyl-4-isopropylbenzene, mono-t-butyl-p-cresol, mono-t-butyl-m-cresol, 2,4-dimethyl-6-t-butylphenol, butylated bisphenol A, 2,2'-methylene-bis(4-methyl-6-t-butylphenol), 2,2'-methylene-bis(4-ethyl-6-t-butylphenol), 2,2'-methylene-bis(4-methyl-6-t-nonylphenol), 2,2'-isobutylidene-bis(4,6-dimethylphenol), 4,4'-butylidene-bis(3-methyl-6-t-butylphenol), 4,4'-methylene-bis(2,6-di-t-butylphenol), 2,2'-thio-bis(4-methyl-6-t-butylphenol), 4,4'-thio-bis(3-methyl-6-t-butylphenol), 4,4'-thio-bis(2-methyl-6-butylphenol), 4,4'-thio-bis(6-t-butyl-3-methylphenol), bis(3-methyl-4-hydroxy-5-t-butylbenzene) sulfide, 2,2'-thio[diethyl-bis-3-(3,5-di-t-butyl-4-hydroxyphenyl)propionate], bis[3,3-bis(4-hydroxy-3-t-butylphenyl)butyric acid]glycol ester, bis[2-(2-hydroxy-5-methyl-3-t-butylbenzene)-4-methyl-6-t-butylphenyl] terephthalate, 1,3,5-tris(3,5-di-t-butyl-4-hydroxybenzyl) isocyanurate, N,N'-hexamethylene-bis(3,5-di-t-butyl-4- hydrocinnamamide), n-octadecyl-3-(4-hydroxy-3,5-di-t-butylphenyl)propionate, tetrakis[methylene-3-(3,5-di-t-butyl-4-hydroxyphenyl)propionate]methane, pentaerythritol-tetrakis[3-(3,5-di-t-butyl-4-hydroxyphenyl) propionate], 1,1'-bis(4-hydroxyphenyl)cyclohexane, mono-(α-methylbenzene)phenol, di(α-methylbenzyl)phenol, tri (α-methylbenzyl)phenol, 2,6-bis(2-hydroxy-3-t-butyl-5-methylbenzyl)-4-methylphenol, 3,9-bis[2-{3-(3-t-butyl-4-hydroxy-5-methylphenyl)propionyloxy}-1,1-dimethylethyl]-2,4,8,10-tetraoxaspiro[5.5]undecane, 2,5-di-t-amylhydroquinone, 2,6-di-t-butyl-α-dimethylamino-p-cresol, 2,5-di-t-butylhydroquinone, diethylester of 3,5-di-t-butyl-4-hydroxybenzylphospate, catechol, hydroquinone, and so on. Examples of particularly preferable phenol-based antioxidants include 4,4'-butylidene-bis(3-methyl-6-t-butyl-phenol), 4,4'-methylene-bis(2,6-di-t-butylphenol), 2,2'-thio-bis(4-methyl-6-t-butylphenol), 4,4'-thio-bis(3-methyl-6-t-butylphenol), 4,4'-thio-bis(2-methyl-6-butylphenol), 4,4'-thio-bis(6-t-butyl-3-methylphenol), tetrakis[methylene-3-(3,5-di-t-butyl-4-hydroxyphenyl) propionate]methane, pentaerythritol-tetrakis[3-(3,5-di-t-butyl-4-hydroxyphenyl) propionate], 3,9-bis[2-{3-(3-t-butyl-4-hydroxy-5-methyl-phenyl)propionyloxy}-1,1-dimethylethyl]-2,4,8,10-tetraoxaspiro[5.5]undecane, and so on.

The amine-based antioxidants used are those usually used for rubber. Specific examples of the amine-based antioxidants include naphthylamine-based antioxidants such as phenyl-α-naphthylamine and phenyl-O-naphthylamine; diphenylamine-based antioxidants, such as p-(p-toluenesulfonylamide)diphenylamine, 4,4'-bis(α,α-dimethylbenzyl) diphenylamine, alkylated diphenylamine, octylated diphenylamine, dioctylated diphenylamine (for example, 4,4'-dioctyldiphenylamine), a high-temperature reaction product of diphenylamine with acetone, a low-temperature reaction product of diphenylamine with acetone, a low-temperature reaction product of diphenylamine with aniline and acetone, and a reaction product of diphenylamine with diisobutylene; p-phenylenediamine-based antioxidants, such as N,N'-diphenyl-p-phenylenediamine, n-isopropyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-p-phenylenediamine, N,N'-bis(1-methylheptyl)-p-phenylenediamine, N,N'-bis(1,4-dimethylpentyl)-p-phenylenediamine, N,N'-bis (1-ethyl-3-methylpentyl)-p-phenylenediamine, N-(1,3-dimethylbutyl)-N'-phenyl-p-phenylenediamine, phenylhexyl-p-phenylenediamine, phenyloctyl-p-phenylenediamine, and so on. Among them, 4,4'-bis(α,α-dimethylbenzyl)diphenylamine, N,N'-diphenyl-p-phenylenediamine, N,N'-di-2-naphthyl-p-phenylenediamine are particularly preferable.

In the invention, although the sulfur-based antioxidants, the phenol-based antioxidants, and amine-based antioxidants may be used singly, two or more of these kinds are preferably used in combination from the view point of maintaining heat aging resistance for a long period of time at high temperature. In the invention, the sulfur-based antioxidant is used usually in an amount of from 0.2 to 10 parts by weight, preferably from 0.2 to 8 parts by weight, and more preferably from 0.2 to 6 parts by weight with respect to 100 parts by weight of the ethylene/α-olefin/non-conjugated polyene copolymer (S). It is preferable to use the sulfur-based antioxidant in such a fraction because improvement in heat aging resistance is significant, and moreover, crosslinking the resin composition of the invention is not inhibited.

The phenol-based antioxidant is used usually in an amount of from 0.2 to 5 parts by weight, preferably from 0.5 to 4 parts by weight, more preferably from 0.5 to 3 parts by weight with respect to 100 parts by weight of the ethylene/α-olefin/non-conjugated polyene copolymer (S). It is preferable to use the phenol-based antioxidant in the above-mentioned fraction because improvement in heat aging resistance is significant, and moreover, crosslinking the resin composition of the invention is not inhibited.

The amine-based antioxidant is usually used in an amount of from 0.05 to 5 parts by weight, preferably from 0.1 to 4 parts by weight, and more preferably from 0.2 to 3 parts by weight with respect to 100 parts by weight of the ethylene/α-olefin/non-conjugated polyene copolymer (S). It is preferable to use the amine-based antioxidant in the above-mentioned fraction because improvement in heat aging resistance is significant, and moreover, crosslinking the copolymer rubber is not inhibited.

Processing Auxiliary Agent

The resin composition of the invention may contain a processing auxiliary agent as an optional component so long as the agent does not harm the purposes of the present invention.

As a processing auxiliary agent, compounds usually used in processing rubber can be used. Specific examples thereof include higher fatty acids such as ricinoleic acid, stearic acid, palmitic acid, and lauric acid; salt of fatty acids, such as barium stearate, zinc stearate, and calcium stearate; esters of higher fatty acid, such as those of ricinoleic acid, stearic acid, palmitic acid, and lauric acid.

Although such a processing auxiliary agent is used usually in an amount of 10 parts by weight or less, preferably 5 parts by weight or less with respect to 100 parts by weight of the ethylene/α-olefin/non-conjugated polyene copolymer (S), it is preferable to determine the optimum amount on the basis of required values of physical properties.

Softening Agent

The resin composition of the invention may contain a softening agent as an optional component so long as the agent does not harm the purposes of the present invention.

Well-known softening agents usually used for rubber can be used. Specific examples thereof include petroleum-based softening agents, such as processed oil, lubricant oil, fluid paraffin, petroleum asphalt, petrolatum; coal tar-based softening agents such as coal tar and coal tar pitch; fatty oil-based softening agents, such as castor oil, linseed oil, canola oil, soya oil, and coconut oil; tall oil; substitutes (factices); waxes, such as beeswax, carnauba wax, and lanolin; fatty acids and the salts thereof, such as ricinoleic acid, palmitic acid, stearic acid, barium stearate, calcium stearate, and zinc laurate; synthetic polymeric substances, such as petroleum resin, atactic polypropylene, and coumarone-indene resin, and so on. Among them, petroleum-based softening agents, and in particular, the processed oil are preferably used.

The softening agent is used singly or in combination of the two or more kinds. It can be used in a amount of from 0 to 100 parts by weight, preferably from 2 to 80 parts by weight with respect to 100 parts by weight the ethylene/α-olefin/non-conjugated polyene copolymer (S).

Foaming Agent

The resin composition of the invention can contain a foaming agent as an optional component according to use applications so long as the agent does not harm the purposes of the present invention.

Specific examples of the foaming agent include inorganic foaming agents, such as sodium bicarbonate, sodium carbonate, ammonium bicarbonate, ammonium carbonate, and ammonium nitrite; nitroso compounds such as N,N'-dimethyl-N,N'-dinitrosoterephthalamide and N,N'-dinitrosopentamethylenetetramine; azo compounds, such as azodicarbonamide, azobisisobutyronitrile, azocyclohexylnitrile, azodiaminobenzene, and barium azodicarboxylate; sulfonyl hydrazide compounds, such as benzenesulfonylhydrazide, toluenesulfonylhydrazide, p,p'-oxybis(benzenesulfonylhydrazide), and diphenylsulfone-3,3'-disulfonylhydrazide; azide compounds, such as calcium azide, 4,4-diphenyldisulfonylazide, and p-toluenesulfonyl azide, and so on.

These foaming agents can be used in an amount of from 0.5 to 30 parts by weight, preferably from 1 to 20 parts by weight with respect to 100 parts by weight of the ethylene/α-olefin/non-conjugated polyene copolymer (S). Although a foamed article having specific gravity of about from 0.03 to 0.8 g/cm$^3$ can be produced by using the foaming agent in the above-described amount, it is preferable to determine the optimum amount on the basis of required values of physical properties.

A foaming aid can also be used, as necessary, in combination with the foaming agent. The foaming aid plays a role of lowering degradation temperature of the foaming agent, enhancing the degradation, and homogenizing bubbles and so on. Examples of the foaming aid include organic acids, such as salicylic acid, phthalic acid, stearic acid, oxalic acid, urea or derivatives thereof, and so on.

Although these foaming aids are used in an amount of from 0.01 to 10 parts by weight, preferably from 0.1 to 5 parts by weight with respect to 100 parts by weight of the ethylene/α-olefin/non-conjugated polyene copolymer (S), it is preferable to determine the optimum amount on the basis of required values of physical properties.

In addition to the above described components, the resin composition of the invention can contain, as necessary, various additives capable of being added to the rubber composition, fillers, and various kinds of any components other than the resin components described above, so long as the components do not harm the purposes of the present invention.

<Production of Resin Composition and Crosslinked Shaped Article>

The resin composition of the invention can be prepared by blending sequentially or simultaneously the above-described components according to well-known processes.

Although the resin composition of the invention can be used even in an uncrosslinked form, it can exhibit its best performance when used as a crosslinked article, such as a crosslinked shaped article or a crosslinked foamed shaped article.

The resin composition, and a crosslinking shaped article, such as the anti-vibration rubber product, of the invention, can be produced, as in the case of crosslinking well-known rubber compositions, by preparing the uncrosslinked resin composition of the invention, and then forming the rubber composition into an intended shape, followed by crosslinking it. Preparing, forming, crosslinking the resin composition may be carried out independently or sequentially.

The uncrosslinked resin composition of the invention can be prepared by: kneading the above-mentioned ethylene/α-olefin/non-conjugated polyene copolymer (S), the powdered silica and/or powdered silicate salt (E), and in addition, the inorganic filler and the softening agent, by using an internal mixer (sealed-type mixer), such as a Bambury mixer, a kneader, and an intermix, at a temperature from 80 to 190° C., preferably from 80 to 170° C., for 2 to 20 minutes, preferably 3 to 10 minutes; then, adding and mixing the metal α,β-unsaturated carboxylate (F), the organic peroxide (G) which is a crosslinking agent, and/or the SiH group-containing compound containing intramolecularly at least two SiH groups (H) which is a crosslinking agent, and as necessary, various additives, such as the catalyst for addition reaction, the reaction inhibitor, the crosslink promoter, the crosslinking aid, the foaming agent, the antioxidant, a coloring agent, a dispersing agent, and a flame retardant, and kneading them using roll mills such as an open roll or a kneader, at a roll temperature from 40 to 60° C., for 3 to 30 minutes; and finally extruding/sheeting the kneaded product to shape it into a ribbon or sheet.

When kneading temperature is low in the internal mixer, the crosslinking agent and the various additives can also be simultaneously kneaded together with the ethylene/α-olefin/non-conjugated polyene copolymer (S), the powdered silica and/or powdered silicate salt (E), and as necessary, the inorganic filler, the softening agent and so on, to prepare the resin composition.

The resin composition of the invention prepared as described above can be formed into an intended shape by various forming processes using an extrusion-molding machine, a calender roll, a press, a injection molding machine, a transfer-molding machine, and so on, and can be simultaneously crosslinked, or the shaped article can be introduced into a crosslinking tub and then crosslinked. Crosslinking can be carried out by heating at a temperature from 100 to 270° C., for 1 to 30 minutes, or by irradiation with radiation such as light, γ-ray, and electron beam. Crosslinking can also be carried out at normal temperature.

Since the resin composition of the invention contains the organic peroxide (G) and/or the SiH group-containing compound containing intramolecularly at least two SiH groups (H) as a crosslinking agent, the crosslinking can be carried out by heating, by irradiation with radiation such as light, γ-ray, electron beam, and so on, or by a combinatorial process thereof.

Such crosslinking may be carried out with or without a metal mold. In the case without a metal mold, forming and crosslinking processes are carried out usually sequentially. Heating process in a crosslinking tub can be carried out in a heating tub using heat air, glass bead fluidized bed, UHF (ultra high frequency), steam, and so on.

The resin composition of the invention has rapid crosslinking rate, excellent productivity, and is capable of crosslinking in hot air using, for example, HAV (hot air vulcanization tub) or UHF (ultra high frequency), and the crosslinking shaped article of the invention obtained from the resin composition of the invention is excellent in product appearance owing to no bleeding of the crosslinking agent onto the surface, in compression set resistance, and in heat aging resistance, and is environmentally-friendly because it does not emit nitrosamine and other compounds which are suspected to be a so-called carcinogenic substance. Because the crosslinking shaped article of the invention also has excellent anti-vibration performance, it can be suitably used as an anti-vibration rubber product, and specifically, for use applications, such as anti-vibration rubber for cars, muffler hanger for cars, anti-vibration rubber for railroads, anti-vibration rubber for industrial machines, quake-absorbing rubber for construction, engine mount, packing, bush, pad, gasket, air suspension, ring mount, stopper for impact buffer, fender, flexible joint, and dynamic damper.

According to the invention, such resin compositions, crosslinking shaped articles, and anti-vibration rubber products can be manufactured at low cost.

EXAMPLES

Although the present invention will be described more specifically based on the following Examples, the invention is not limited thereto.

In the following Examples and Comparative examples, ethylene (A), propylene as an α-olefin (B), VNB as a non-conjugated polyene (C), ENE as a non-conjugated polyene (D) are appropriately used to produce a copolymer to demonstrate advantageous effects of the invention, but the α-olefin (B), the non-conjugated polyene (C), and the non-conjugated polyene (D) are not at all limited to these compounds.

Evaluation methods of each property in Examples and Comparative examples are as follows.

Composition of Ethylene/Olefin/Non-Conjugated Polyene Copolymer

The fraction (% by weight) of each structural unit of the ethylene/α-olefin/non-conjugated polyene copolymer was determined from measurement values by using $^{13}$C-NMR. The measurement values were obtained by measuring the $^{13}$C-NMR spectrum of the copolymer by using a nuclear magnetic resonance apparatus, Model ECX400P (manufactured by JEOL Ltd.) at a measurement temperature of 120° C., in a measurement solvent of orthodicholorbenzene/deuterated benzene=4/1, with a cumulative number of 8,000.

Intrinsic Viscosity

The intrinsic viscosity [η] was measured by using a fully-automated limit viscometer manufactured by RIGO CO., LTD. at a temperature of 135° C. in a measurement solvent of decalin.

Weight-Average Molecular Weight ($M_w$), Number Average Molecular Weight ($M_n$), and Molecular Weight Distribution ($M_w/M_n$)

The weight-average molecular weight ($M_w$), number average molecular weight ($M_n$), and molecular weight distribution ($M_w/M_n$) are numerical values expressed in terms of polystyrene measured by gel permeation chromatography (GPC). A measurement apparatus and a measurement condition are as follows. The molecular weight was calculated based on the conversion method using a calibration curve generated by using commercial monodispersed polystyrene.

Apparatus: gel penetration chromatograph, Model Alliance GP2000 (manufactured by Waters)

Analyzer: Empower2 (manufactured by Waters)

Column: TSKgel GMH6-HT×2+TSKgel GMH6-HTL×2 (7.5 mm I.D.×30 cm, manufactured by Tosoh Corporation)

Column temperature: 140° C.

Mobile phase: o-dichlorobenzene (containing 0.025% of BHT)

Detector: refractive index detector (RI)

Flow rate: 1.0 mL/min

Loaded quantity: 400 μL

Sampling interval: 1 s

Column calibration: monodispersed polystyrene (manufactured by Tosoh Corporation)

Molecular-weight: expressed in terms of EPR in the old method/calibrating method taking viscosity into account Mooney Viscosity [$ML_{1+4}$ (100° C.)]

Mooney viscosity [$ML_{1+4}$ (100° C.)] was measured in accordance with JIS K6300 at 100° C., by using a Mooney viscometer (Model SMV202 manufactured by Shimazu Corporation).

Complex Viscosity η*

A rheometer used was Ares, a viscoelastic measurement apparatus (manufactured by Rheometric Scientific), which was operated under a condition of 190° C. and distortion 1.0% to measure complex viscosities $\eta^*_{(\omega=0.01)}$ at a frequency of ω=0.01 rad/s, $\eta^*_{(\omega=0.1)}$ at a frequency of ω=0.1 rad/s, $\eta^*_{(\omega=10)}$ at a frequency of ω=10 rad/s, and $\eta^*_{(\omega=100)}$ at a frequency of ω=100 rad/s (all in a unit of Pa·sec).

Based on the obtained results, P value was calculated, which was a ratio (η* ratio) of complex viscosity of $\eta^*_{(\omega=0.1)}$ to $\eta^*_{(\omega=100)}$ represented by $(\eta^*_{(\omega=0.1)}/\eta^*_{(\omega=100)})$.

Hardness Test (Duro-A Hardness)

According to JIS K 6253, sheet hardness (Type A durometer, HA) was measured by using specimens of about 12 mm in thickness, which were made of stacked six sheet-like rubber shaped articles of 2 mm in thickness with a smooth surface placed on the top of a flat portion of each other. Specimens which were contaminated by foreign substances, or which had foams or scratches were not used. The dimension of the measurement surface of the specimens was taken to be large enough so that pressure needle tips were able to measure the hardness at a point 12 mm or more far from the edge of the specimens.

Tensile Test

According to JIS K 6251, a tensile test was carried out under a condition of a measurement temperature of 23° C. and a tension rate of 500 mm/minute to measure tensile strength at break ($T_3$) [MPa] and elongation at break ($E_B$) [%] of the sheets. Specifically, the sheet-like crosslinked shaped article was punched to prepare dumbbell specimens of Type 3 described in JIS K 6251 (2001). This specimen was used to carry out the tensile test in accordance with the method specified in the above JIS K 6251, under a condition of measurement temperature 25° C. and a tension rate of 500 mm/minute, to measure 100% modulus ($M_{100}$), 200% modulus ($M_{200}$), 300% modulus ($M_{300}$), tensile stress at fracture point ($T_3$), and tensile elongation at break ($E_3$).

Tensile product was defined by "Tensile strength at break ($T_B$)×elongation at break ($E_B$)."

Crosslinking Density

Crosslinking density ν was calculated using Flory-Rehner Formula (a) below based on the assumption of equilibrium swelling.

In Formula (a), $V_R$ was obtained from the crosslinked 2 mm sheets subjected to toluene extraction under a condition of 37° C.×72 h.

[number 4]

$$\nu[/cc] = \frac{V_R + \mathrm{Ln}(1-V_R) + \mu\, V_R^2}{-V_0\left(V_R^{1/3} - V_R/2\right)} \times A \quad (a)$$

$V_R$: volume fraction of net rubber in swelled crosslinked rubber $V_0$: molecular volume of solvent (toluene) (108.15 cc @37° C.)

μ: Constant of interaction between rubber and solvent (EPDM-toluene: 0.49)

A: Avogadro number

Compression Set (CS)

According to JIS K 6262, crosslinked articles of 29 mm in diameter and 12.5 mm in height (thickness) were prepared as a specimen. They were compressed up to 25% height with respect to the height thereof (12.5 mm) before applying load, then placed in a Geer oven at 150° C., and subjected to thermal treatment for 22 hours, with their metal mold attached thereto. Next, the specimens were taken out to be allowed to cool for 30 minutes, followed by measuring the height thereof to calculate compression set (%) by using the formula below.

Compression set (%)={($t0-t1$)/($t0-t2$)}×100, t0: height of specimen before test,
t1: height of specimen subjected to thermal treatment, and then allowed to cool for 30 minutes,
t2: height of specimen kept attached to metal mold for measurement.

Heat Aging Resistance (Examples 1 to 13, Comparative Examples 1 to 7)

Crosslinked shaped articles in the form of 2 mm sheet were aged in a Geer oven at 170° C. for 168 h.

For the sheets after aging, sheet hardness was measured according to JIS K 6253 by using specimens of 12 mm in thickness, which were made of stacked six sheet-like rubber shaped articles of 2 mm in thickness with a smooth surface placed on the top of a flat portion of each other. Specimens which were contaminated by foreign substances, or which had foams or scratches were not used. The dimension of the measurement surface of the specimens was taken to be large enough so that pressure needle tips were able to measure the hardness at a point 12 mm or more far from the edge of the specimens.

ΔH=Hardness after Aging−Hardness Before Aging

For the specimens heat aged, the tensile test was carried out according to JIS K 6251 under the condition of a measurement temperature of 23° C. and a tension rate of 500 mm/minute to measure tensile strength at break (TB) and elongation at break (EB) of the sheet. Tensile product was defined by "tensile strength at break (TB)×elongation at break (EB)."

$AR(\%)/TB = TB$ after aging/$TB$ before aging×100

$AR(\%)/EB = EB$ after aging/$EB$ before aging×100

$AR(\%)$/tensile product=tensile product after aging/ tensile product before aging×100

Dynamic Tensile Fatigue Test (Fatigue Tester Manufactured by Ueshima Seisakusho Co., Ltd.)

The sheet-like crosslinked shaped articles were punched to prepare dumbbell specimens of Type 1 described in JIS K 6251, and then a scratch of 2 mm in length was created at the longitudinal center of the specimens. Among nine specimens prepared in this manner, three were subjected to elongation fatigue under a condition of extension rate of 50%, a set temperature of 23° C., and a rotational velocity of 300 rpm, to obtain an average number of cycle and average stress value upon break of the dumbbells. A dynamic tensile fatigue test was also carried out under a condition of extension rates of 100% and 145% in the same manner.

Heat Aging Resistance Test (Examples 18 to 22, Comparative Examples 18 to 22)

A heat aging resistance test was carried out according to JIS K 6257. Specifically, crosslinked sheets were placed in an oven at 150° C. for 72 hours to be aged, and then a tensile test was carried out under a condition of a measurement temperature of 23° C., a tension rate of 500 mm/minute, followed by measuring the elongation strength at break of the crosslinked sheet to calculate the tensile strength retention $A_R$ ($T_B$) and the elongation retention $A_R$ ($E_B$).

Dynamical Property (Tan δ)

In accordance with JIS K 6394, tan δ at predetermined frequencies was obtained by using a viscoelastic tester (Model RDS-2) manufactured by Rheometrics, under a condition of a measurement temperature of 25° C. and torsion of 1%. The frequencies were 10 Hz and 1 Hz for the measurement of dynamic properties in Examples 1 to 5 and Comparative examples 1 to 5, and 10 Hz for evaluation in the dynamic viscoelastic test (anti-vibration properties) in Examples 6 to 9 and Comparative examples 6 to 11.

Scratch Resistance Test

The surface of the crosslinked sheets immediately after taken out from an HAV (hot air vulcanization tub) were scratched by a pencil of hardness HB, and the scratched state was then observed by naked eyes to evaluate scratch property based on the next four grades of characterization criteria.

A: no scratch on surface
B: slight scratch on surface
C: scratched
D: significantly scratched Durability Test The vulcanized rubber sheets were punched to prepare dumbbell specimens of Type 1 described in JIS K 6301, and scratch of 2 mm in length was created at the center of these specimens. Among sixty specimens prepared in this manner, twenty were subjected to elongation fatigue under a condition of an extension of 50%, a set temperature of 40° C., and a rotational rate 300 rpm to determine a durability index, which was an average value of number of cycles upon break of the dumbbells.

Example 1

Production of Ethylene-Propylene-VNB Copolymer (A)

Into a continuous polymerizer of 1 L in volume made of SUS via a supply port thereof were continuously added dehydrated and purified hexane at a rate of 1.5 L/h, a hexane solution (5 mmol/L) of triisobutylaluminum at a rate of 0.1 L/h (0.5 mmol/h), a hexane solution (0.01 mmol/L) of di(p-chlorophenyl)methylene (cyclopentadienyl) (octamethyloctahydrodibenzofluorenyl) zirconium dichloride (E1 in Table 1) at a rate of 0.03 L/h (0.0003 mmol/h), and a toluene solution (0.025 mmol/L) of triphenylcarbenium tetrakis (pentafluorophenyl)borate (E3 in Table 1) at a rate of 0.06 L/h (0.0015 mmol/h). Simultaneously via another supply port of the polymerizer were continuously added ethylene at a rate of 50 g/h, propylene at a rate of 40 g/h, 5-vinyl-2-norbornene (VNB) at a rate of 3.2 g/h, and hydrogen at a rate of 0.25 NL/h to fill the polymerizer with the liquid phase, and continuous polymerization was carried out under a condition of a polymerization temperature of 95° C., a total pressure of 3.6 MPaG, and a residence time of 30 min.

The polymerization solution containing ethylene/propylene/VNB copolymer produced in the polymerizer was continuously exhausted via an outlet provided at the bottom of the polymerizer, and conducted to a connection pipe heated at its jacket portion by steam of 10 kg/cm² in order to keep constant the temperature of the polymerization solution, the polymerization solution being combined with methanol which was a catalyst-deactivating agent injected at a rate of 0.15 L/h via a supply port provided just before the connection pipe.

The polymerization solution in the connection pipe heated by steam was continuously sent to a flash tub by controlling the opening of a pressure control valve provided at the end of the connection pipe so that the pressure in the polymerizer was kept to be constantly 3.6 MPaG. Resultant ethylene-propylene-VNB copolymer (A) had 54.3% by weight of the structural unit derived from ethylene, 0.8% by weight of the structural unit derived from VNB, an intrinsic viscosity [η] of 2.2 dl/g, and a P value of 45.0. The physical properties are shown in Table 1.

(Production of Crosslinked Shaped Article)

A hundred parts by weight of the resultant ethylene-propylene-VNB copolymer (A), 5 parts by weight of zinc oxide (ZnO#1-zinc oxide of Second grade, manufactured by Hakusuitech Co., Ltd.) as crosslinking aid, one part by weight of stearic acid (stearic acid, Tsubaki series, manufactured by NOF CORPOLATION) as a processing auxiliary agent, 80 parts by weight of carbon black (Asahi#60, manufactured by ASAHI CARBON CO., LTD.), and 50 parts by weight of paraffin-based oil (PS-430, manufactured by Idemitsu Kosan Co., Ltd.) as a softening agent were kneaded by using a Bambury mixer, Model BB-2 (manufactured by KOBE STEEL, LTD.) to yield a rubber blend. In the above kneading process, the copolymer (A) was masticated for 0.5 minutes, and after adding zinc oxide, stearic acid, carbon black, and paraffin-based oil, they were kneaded for two minutes. Then, a ram was raised to be cleaned, followed by kneading for one more minute to obtain a rubber blend (A-1).

To the rubber blend (A-1) was added 6.8 parts by weight of a 40% dilution of dicumyl peroxide (PERCUMYL D-40, manufactured by NOF CORPOLATION) as an organic peroxide, and the resultant mixture was banded and kneaded on a roll of an 8 inch roll mill (manufactured by Nippon Roll MFG. Co., Ltd.) operating with a front roll at a surface temperature of 50° C. and a rotational rate of 16 rpm and a back roll at a surface temperature of 50° C. and a rotational speed of 18 rpm.

In the kneading, the mixture was given three cuts right and left and rounded six times to provide a sheet-like rubber composition of 2.2 to 2.5 mm in thickness.

The resultant sheet of rubber composition was crosslinked by using a 100 t press-forming machine (KMF100-1E, manufactured by Koutaka Kougyo Shyo) under a condition of a metal mold temperature of 170° C. for 10 minutes to provide a sheet of crosslinked shaped article of 2 mm in thickness, 15 cm in length, and 15 cm in width (A-2). The sheet of crosslinked article (A-2) was used to measure tensile strength at break (TB), elongation at break (EB), and hardness (HA).

The obtained sheet of crosslinked article (A-2) was also crosslinked by using a 100 t press-forming machine (KMF100-1E, manufactured by Koutaka Kougyo Shyo) under a condition of a metal mold temperature of 170° C. for 20 minutes to provide a crosslinked article (A-3) 12.5 mm in thickness and 29 mm in diameter. The crosslinked article (A-3) was used to measure compression set.

The combined amount of each component contained in the rubber composition, and evaluation of the rubber composition and the crosslinked article are shown in Table 1.

Examples 2 to 13

Production of Ethylene/Propylene/Non-Conjugated Polyene Copolymers (B) to (M)

Ethylene/propylene/non-conjugated polyene copolymers (B) to (M) were each produced in the same manner as in Example 1 except that the kind of catalysts used for copolymerization, the kind and amount of monomers introduced in the polymerizer were changed as shown in Table 1. Physical properties of each obtained copolymer are shown in Table 1. In the table, ENB means ethylidene norbornene.

In Table 1, the abbreviations for catalyst mean the following compounds.

E1:
di(p-chlorophenyl)methylene(cyclopentadienyl)(octamethyloctahydrodibenzofluorenyl)zirconium dichloride E2:
di(p-tolyl)methylene(cyclopentadienyl)(octamethyloctahydrodibenzofluorenyl)zirconium dichloride E3: triphenylcarbenium tetrakis(pentafluorophenyl)borate MAO: methylaluminoxane (Production of Crosslinked Shaped Article)

Rubber blends (B-1) to (M-1) and crosslinked articles (B-2) to (M-2), and (B-3) to (M-3) were produced in the same manner as in Example 1 except that the obtained ethylene/α-olefin/non-conjugated polyene copolymers (B) to (M) were used in place of the copolymer (A), and physical properties thereof were measured. The result is also shown in Table 1.

TABLE 1

| | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|
| copolymer | A | B | C | D | E | F | G | H | I | J | K | L | M |
| polymerizing agent | E1/E3 | E1/E3 | E1/E3 | E1/E3 | E2/MAO | E2/MAO | E2/MAO | E2/MAO | E2/MAO | E2/MAO | E2/MAO | E2/MAO | E2/MAO |
| <physical property of copolymer> | | | | | | | | | | | | | |
| ethylene/α-olefin [molar ratio] | 55/45 | 60/40 | 66/34 | 67/33 | 56/44 | 48/52 | 53/47 | 64/36 | 60/40 | 59/41 | 62/38 | 60/40 | 61/39 |
| ethylene content [wt %] | 54.3 | 59.2 | 64.4 | 65.4 | 55.6 | 47.7 | 52.9 | 63.2 | 59.3 | 55.8 | 61.0 | 59.0 | 58.7 |
| ENB content [wt %] | 0.8 | 1.4 | 2.0 | 2.1 | 1.5 | 1.0 | 0.6 | 0.6 | 0.8 | 4.7 | 1.7 | 1.3 | 3.6 |
| VNB content [wt %] | 0.8 | 1.4 | 2.0 | 2.1 | 1.5 | 1.0 | 0.6 | 0.6 | 0.8 | 4.7 | 1.7 | 1.3 | 1.0 |
| Total diene content [wt %] | 2.2 | 2.4 | 2.9 | 2.2 | 2.7 | 1.8 | 2.0 | 2.4 | 1.0 | 1.0 | 3.1 | 3.9 | 4.6 |
| [η][dl/g] | 2.2 | 2.4 | 2.9 | 2.2 | 2.7 | 1.8 | 2.0 | 2.4 | 3.9 | 4.1 | 104.1 | 124.1 | 2.2 |
| P value($\eta^*_{(\omega=0.1)}/\eta^*_{(\omega=100)}$) | 45.0 | 92.7 | 152.5 | 94.4 | 29.1 | 7.7 | 7.0 | 10.5 | 4.1 | 3.7 | 3.9 | 2.5 | 31.4 |
| P/([η])$^{2.9}$ | 4.4 | 7.3 | 7.0 | 9.6 | 1.7 | 1.4 | 1.0 | 0.8 | 4.5 | 28.4 | 9.9 | 7.7 | 3.3 |
| VNB content × 6 | 4.8 | 8.4 | 11.9 | 12.6 | 9.1 | 6.1 | 3.5 | 3.4 | 0.04 | 0.06 | 0.02 | 0.02 | 6.0 |
| LCB$_{1000C}$ | 0.07 | 0.10 | 0.11 | 0.10 | 0.07 | 0.03 | 0.03 | 0.03 | 75300 | 79800 | 289000 | 368000 | 0.05 |
| Mw | 171000 | 216000 | 241000 | 194000 | 178000 | 143000 | 130000 | 157000 | 0.21 | 0.21 | 0.12 | 0.10 | 199000 |
| 1-0.07 × Ln(Mw) | 0.16 | 0.14 | 0.13 | 0.15 | 0.15 | 0.17 | 0.18 | 0.16 | 4.7 | 31.4 | 39.9 | 39.1 | 0.15 |
| Mw × VNB content/100/120.2 | 11.4 | 25.2 | 39.9 | 33.9 | 22.5 | 12.0 | 6.4 | 7.4 | 4.7 | 31.4 | 39.9 | 39.1 | 16.5 |
| Mw × diene content/100/120.2 | 11.4 | 25.2 | 39.9 | 33.9 | 22.5 | 12.0 | 6.4 | 7.4 | 1.10 | 1.11 | 1.51 | 1.52 | 44.7 |
| Log{$\eta^*_{(\omega=0.01)}$}/Log{$\eta^*_{(\omega=10)}$} | 1.40 | 1.49 | 1.53 | 1.50 | 1.31 | 1.17 | 1.14 | 1.19 | 1.54 | 2.17 | 1.68 | 1.62 | 1.32 |
| 0.0753 × VNB-IV + 1.42 | 1.55 | 1.64 | 1.74 | 1.75 | 1.66 | 1.58 | 1.52 | 1.52 | | | | | 1.58 |
| <tensile test> | | | | | | | | | | | | | |
| hardness (Duro-A) | 58 | 59 | 65 | 65 | 60 | 58 | 56 | 62 | 56 | 63 | 59 | 58 | 60 |
| M100[MPa] | 1.51 | 1.58 | 2.28 | 2.34 | 1.75 | 1.39 | 1.23 | 2.08 | 1.32 | 2.09 | 1.65 | 1.58 | 1.78 |
| TB[MPa] | 11.8 | 11.5 | 17.5 | 17.8 | 13.8 | 10.8 | 10.0 | 15.7 | 10.7 | 15.8 | 13.0 | 12.4 | 12.1 |
| EB[%] | 486 | 398 | 345 | 299 | 415 | 518 | 585 | 598 | 584 | 231 | 387 | 385 | 332 |
| tensile product | 5735 | 4577 | 6038 | 5322 | 5727 | 5594 | 5850 | 9389 | 6249 | 3650 | 5031 | 4774 | 4017 |
| <crosslinking density> | | | | | | | | | | | | | |
| ×10$^{19}$[/cc] | 2.0 | 2.5 | 3.2 | 3.5 | 2.6 | 2.0 | 1.5 | 1.8 | 1.8 | 4.1 | 2.9 | 2.8 | 3.2 |
| <Cs> | | | | | | | | | | | | | |
| 150° C. × 22 h[%] | 15 | 12 | 11 | 10 | 11 | 14 | 20 | 16 | 15 | 8 | 10 | 11 | 9 |
| <anti-heat-aging property> | | | | | | | | | | | | | |
| 170° C. × 168 h | | | | | | | | | | | | | |
| Hardness (Duro-A) | 55 | 58 | 66 | 66 | 61 | 52 | 52 | 58 | 52 | 68 | 60 | 59 | 66 |
| TB[MPa] | 4.0 | 5.8 | 9.8 | 9.1 | 5.4 | 1.2 | 1.3 | 2.7 | 0.8 | 7.5 | 8.8 | 8.4 | 8.0 |
| EB[%] | 315 | 265 | 245 | 200 | 305 | 363 | 251 | 485 | 287 | 162 | 251 | 248 | 137 |
| tensile product | 1260 | 1537 | 2401 | 1820 | 1647 | 436 | 326 | 1310 | 230 | 1215 | 2209 | 2083 | 1096 |
| ΔH | −3 | −1 | 1 | 1 | 1 | −6 | −4 | −4 | −4 | 5 | 1 | 1 | 6 |
| AR(%)TB | 34 | 50 | 56 | 51 | 39 | 11 | 13 | 17 | 7 | 47 | 68 | 68 | 66 |
| AR(%)EB | 65 | 67 | 71 | 67 | 73 | 70 | 43 | 81 | 49 | 70 | 65 | 64 | 41 |
| AR(%)/tensile product | 22 | 34 | 40 | 34 | 29 | 8 | 6 | 14 | 4 | 33 | 44 | 44 | 27 |

Comparative Examples 1 to 7

Rubber blends (N-1) to (T-1) and crosslinked articles (N-2) to (T-2), and (N-3) to (T-3) were produced in the same manner as in Example 1 except that ethylene/α-olefin/non-conjugated polyene copolymers (N) to (T) which were ethylene-propylene-VNB copolymer or ethylene/propylene/VNB/ENB copolymer were used in place of the copolymer (A), and physical properties thereof were measured. The physical properties of the ethylene/α-olefin/non-conjugated polyene copolymers (N) to (T) and those measured by using the rubber blends (N-1) to (T-1) and crosslinked forms (N-2) to (T-2), and (N-3) to (T-3) are shown in Table 2.

For the copolymers (N) to (S), catalysts used in copolymerization are also shown in Table 2. The abbreviations for catalyst in Table 2 mean the following compounds.

E4:
Titanium, [N-(1,1-dimethylethyl)-1,1-dimethyl-1-[1,2,3,3a,8a-.eta)-1,5,6,7-tetrahydoro-2-methyl-s-indacen-1-yl]silanaminato (2-)-.kappa.N][(1,2,3,4,eta)-1,3-pentadiene]-, stereoisomer E5: ethoxyvanadium oxydichloride $VOCl_2(OC_2H_5)$ E6: vanadium oxytrichloride $VOCl_3$
E7: diethylaluminum chloride $Al(C_2H_5)_2Cl$
E8: ethylaluminum sesquichloride $Al_2(C_2H_5)_3Cl_3$
E3: triphenylcarbenium tetrakis(pentafluorophenyl)borate

TABLE 2

| | Comp. example 1 | Comp. example 2 | Comp. example 3 | Comp. example 4 | Comp. example 5 | Comp. example 6 | Comp. example 7 |
|---|---|---|---|---|---|---|---|
| copolymer | N | O | P | Q | R | S | T |
| polymerizing agent | E5/E8 | E6/E7/E8 | E4/E3 | E4/E3 | E4/E3 | E4/E3 | |
| <physical property of copolymer> | | | | | | | |
| ethylene/α-olefin [molar ratio] | 71/29 | 59/41 | 56/44 | 48/52 | 68/32 | 52/48 | 49/51 |
| ethylene content [wt %] | 67.2 | 58.6 | 55.0 | 44.5 | 64.0 | 47.0 | 44.5 |
| ENB content [wt %] | 4.7 | | 2.3 | 7.6 | 5.4 | 9.5 | 8.9 |
| VNB content [wt %] | | 1.5 | | | | 0.4 | 0.3 |
| total diene content [wt %] | 4.7 | 1.5 | 2.3 | 7.6 | 5.4 | 9.9 | 9.2 |
| [η][dl/g] | 3.3 | 1.9 | 2.2 | 1.9 | 3.4 | 1.6 | 2.4 |
| P value($\eta^*_{(\omega=0.1)}/\eta^*_{(\omega=100)}$) | 63.2 | 33.6 | 17.2 | 17.6 | 57.7 | 43.3 | 51.5 |
| P/[η]$^{2.9}$ | 1.9 | 5.1 | 1.8 | 2.8 | 1.7 | 10.9 | 4.1 |
| VNB content × 6 | 0.0 | 9.1 | 0.0 | 0.0 | 0.0 | 2.3 | 1.8 |
| $LCB_{1000C}$ | 0.04 | 0.15 | 0.08 | 0.09 | 0.03 | 0.30 | 0.04 |
| Mw | 320000 | 208000 | 153000 | 152000 | 310000 | 423000 | 243000 |
| 1-0.07 × Ln(Mw) | 0.11 | 0.14 | 0.16 | 0.16 | 0.11 | 0.09 | 0.13 |
| Mw × VNB content/100/120.2 | 0.0 | 26.3 | 0.0 | 0.0 | 0.0 | 13.4 | 6.1 |
| Mw × diene content/100/120.2 | 125.1 | 26.3 | 29.3 | 96.1 | 139.3 | 347.7 | 186.0 |
| Log{$\eta^*_{(\omega=0.01)}$}/Log{$\eta^*_{(\omega=10)}$} | 1.38 | 1.35 | 1.24 | 1.27 | 1.37 | 1.41 | 1.41 |
| 0.0753 × VNB-IV + 1.42 | 1.42 | 1.66 | 1.42 | 1.42 | 1.42 | 1.48 | 1.47 |
| <tensile test> | | | | | | | |
| hardness (Duro-A) | 64 | 55 | 58 | 58 | 65 | 58 | 58 |
| M100[MPa] | 2.15 | 1.39 | 1.04 | 1.15 | 2.20 | 1.48 | 1.09 |
| TB[MPa] | 16.1 | 9.0 | 6.9 | 8.5 | 16.4 | 10.3 | 8.5 |
| EB[%] | 487 | 452 | 690 | 552 | 441 | 364 | 445 |
| tensile product | 7841 | 4068 | 4761 | 4692 | 7232 | 3749 | 3783 |
| <crosslinking density> | | | | | | | |
| ×10$^{19}$[/cc] | 1.8 | 2.1 | 0.9 | 1.7 | 1.9 | 2.1 | 2.0 |
| <Cs> | | | | | | | |
| 150° C. × 22 h[%] | 21 | 14 | 37 | 20 | 18 | 15 | 17 |
| <anti-heat-aging property> | | | | | | | |
| 170° C. × 168 h | | | | | | | |
| hardness (Duro-A) | 70 | 62 | 60 | 68 | 71 | 75 | 72 |
| TB[MPa] | 8 | 2.0 | 2.7 | 3.5 | 7.1 | 4.3 | 3.4 |
| EB[%] | 132 | 143 | 168 | 98 | 114 | 61 | 68 |
| tensile product | 1056 | 286 | 454 | 343 | 809 | 262 | 231 |
| ΔH | 6 | 7 | 2 | 10 | 6 | 17 | 14 |
| AR(%)/TB | 50 | 22 | 39 | 41 | 43 | 42 | 40 |
| AR(%)/EB | 27 | 32 | 24 | 18 | 26 | 17 | 15 |
| AR(%)/tensile product | 13 | 7 | 10 | 7 | 11 | 7 | 6 |

Preparation Example 1

Production of Ethylene-Propylene-VNB Copolymer (S-1)

Into a continuous polymerizer of 1 L in volume made of SUS via a supply port thereof were continuously added dehydrated and purified hexane at a rate of 1.5 L/h, a hexane solution (5 mmol/L) of triisobutylaluminum at a rate of 0.1 L/h (0.5 mmol/h), a hexane solution (0.01 mmol/L) of di(p-chlorophenyl)methylene (cyclopentadienyl) (octamethyloctahydrodibenzofluorenyl) zirconium dichloride at a rate of 0.03 L/h (0.0003 mmol/h), and a toluene solution (0.025 mmol/L) of triphenylcarbenium tetrakis(pentafluorophenyl) borate at a rate of 0.06 L/h (0.0015 mmol/h). Simultaneously via another supply port of the polymerizer were continuously added ethylene at a rate of 50 g/h, propylene at a rate of 38 g/h, 5-vinyl-2-norbornene (VNB) at a rate of 6.1 g/h, and hydrogen at a rate of 0.3 NL/h to fill the polymerizer with the liquid phase, and continuous polymerization was carried out under a condition of a polymerization temperature of 95° C., a total pressure of 3.6 MPaG, and a residence time of 30 min.

The polymerization solution containing ethylene/propylene/VNB copolymer produced in the polymerizer was continuously exhausted via an outlet provided at the bottom of the polymerizer, and conducted to a connection pipe heated at its jacket portion by steam of 10 kg/cm² in order to keep constant the temperature of the polymerization solution, the polymerization solution being combined with methanol which is a catalyst-deactivating agent injected at a rate of 0.15 L/h via a supply port provided just before the connection pipe.

The polymerization solution in the connection pipe heated by the steam was continuously sent to a flash tub by controlling the opening of a pressure control valve provided at the end of the connection so that the pressure in the polymerizer was kept to be constantly 3.6 MPaG. The pressure in the polymerizer was kept to be constantly 3.6 MPaG by the pressure control valve. Resultant ethylene-propylene-VNB copolymer (S-1) had 55.6% by weight of the structural unit derived from ethylene, 1.5% by weight of the structural unit derived from VNB, and intrinsic viscosity [η] of 2.0 dl/g. Physical properties of the copolymer are shown in Table 3.

Reference Examples 1 to 4

Properties of Ethylene/Propylene/VNB Copolymer (S-1) as Crosslinked Shaped Article The obtained ethylene-propylene-VNB copolymer (S-1) in Preparation example 1 was formed into a sheet of 2 mm in thickness by press using a 50 t press-forming machine (KMF50-1E, manufactured by KOHTAKI Corporation) at a temperature of 100° C. for 4 minutes, and this sheet was cut into a shape measuring 100 mm×100 mm×2 mm to prepare samples. The obtained uncrosslinked samples were used to measure their physical properties, which are shown in Table 4 (Reference example 1).

Crosslinking process was carried out for obtained uncrosslinked samples by irradiating them with electron beam by using an electron beam crosslinking apparatus (manufactured by NHV Corporation, EPS800-35) at an acceleration voltage of 800 kV with doses of 20 kGy (Reference example 2), 60 kGy (Reference example 3), and 100 kGy (Reference example 4), which correspond to electric currents of 2.2 mA, 5.8 mA, and 9.4 mA, respectively. Physical properties after crosslinking are shown in Table 4.

Reference Examples 5 to 12

Sheet-like samples were prepared in the same manner as in Reference examples 1 to 4 except that ethylene/propylene/ENB copolymer (S'-1) or ethylene-propylene-VNB copolymer (S'-2) having properties shown in Table 1 were used in place of the ethylene-propylene-VNB copolymer (S-1), and physical properties were measured for the uncrosslinked samples and the samples crosslinked by electron-beam-irradiation. The result is shown in Table 2. For the copolymers (S'-1) and (S'-2), catalysts used in copolymerization are also shown in Table 3.

TABLE 3

| copolymer | Preparation example 1 S-1 | S'-1 | S'-2 |
|---|---|---|---|
| polymerizing agent | E1/E3 | E4/E3 | E6/E7/E8 |
| <physical property of copolymer> | | | |
| ethylene/propylene [molar ratio] | 66/34 | 66/34 | 67/33 |
| ethylene content [mass %] | 55.6 | 55.0 | 58.6 |
| ENB content [mass %] | | 2.3 | |
| VNB content [mass %] | 1.5 | | 1.5 |
| Mw | 130000 | 153000 | 208000 |
| Mw × VNB content/100/120.2 | 16.2 | 0.0 | 26.0 |
| [η] [dl/g] | 2.0 | 2.2 | 1.9 |
| P value ($\eta^*_{(\omega=0.1)}/\eta^*_{(\omega=100)}$) | 7.0 | 17.2 | 33.6 |
| P value/([η]$^{2.9}$) | 1.0 | 1.8 | 5.1 |
| VNB content × 6 | 9.0 | 0 | 9.0 |
| LCB$_{1000C}$ | 0.03 | 0.08 | 0.15 |
| 1 − 0.07 × Ln (Mw) | 0.18 | 0.16 | 0.14 |

In Table 3, the abbreviations for catalyst mean the following compounds.

E1: di(p-chlorophenyl)methylene(cyclopentadienyl)(octamethyloctahydrodibenzofluorenyl)zirconium dichloride E3: triphenylcarbenium tetrakis(pentafluorophenyl)borate E4: titanium, [N-(1,1-dimethylethyl)-1,1-dimethyl-1-[1,2,3,3a,8a-.eta.)-1,5,6,7-tetrahydoro-2-methyl-s-indacen-1-yl]silanaminato (2-)-.kappa.N][(1,2,3,4-,eta)-1,3-pentadiene]-,stereoisomer E6: vanadium oxytrichloride VOCl$_3$ E7: diethylaluminum chloride Al(C$_2$H$_5$)$_2$Cl E8: ethylaluminum sesquichloride Al$_2$(C$_2$H$_5$)$_3$Cl$_3$

TABLE 4

| copolymer | S-1 | | | | S'-1 | | | | S'-2 | | | |
|---|---|---|---|---|---|---|---|---|---|---|---|---|
| <polymer characteristics> | | | | | | | | | | | | |
| Ethylene [mass %] | 55.6 | | | | 55 | | | | 58.6 | | | |
| ENB [mass %] | | | | | 2.3 | | | | | | | |
| VNB [mass %] | 1.5 | | | | | | | | 1.5 | | | |
| [η][dl/g] | 1.97 | | | | 2.16 | | | | 1.92 | | | |
| <irradiation condition> | | | | | | | | | | | | |
| scheduled surface dose (kGy) | 0 | 20 | 60 | 100 | 0 | 20 | 60 | 100 | 0 | 20 | 60 | 100 |
| <vulcanized rubber characteristics> | | | | | | | | | | | | |
| hardness (Duro-A) | 40 | 48 | 49 | 50 | 42 | 44 | 45 | 45 | 40 | 45 | 46 | 48 |
| M100[MPa] | unmeasurable (chuck | 0.76 | 0.82 | 1.34 | unmeasurable | 0.64 | 0.74 | 0.8 | unmeasurable (chuck | 0.71 | 0.81 | 0.97 |
| M200[MPa] | | 0.87 | 1.12 | 2.89 | surable — | 0.81 | 0.93 | | | — | 1.00 | 1.15 |
| M300[MPa] | | 0.94 | 2.01 | 4.12 | (chuck — | 0.83 | 1 | | | — | 1.15 | 2.10 |

TABLE 4-continued

| copolymer | | S-1 | | | | S'-1 | | | | S'-2 | | |
|---|---|---|---|---|---|---|---|---|---|---|---|---|
| TB[MPa] | broken) | 1.8 | 2.3 | 4.3 | broken) | 0.65 | 2.4 | 1.3 | broken) | 1.4 | 1.8 | 2.3 |
| EB[%] | | 1240 | 540 | 320 | | 2030 | 950 | 490 | | 1500 | 640 | 340 |
| <compression set> | | | | | | | | | | | | |
| Cs(70° C. × 22 h)[%] | | 51 | 21 | 14 | | 66 | 37 | 28 | | 61 | 30 | 21 |
| <crosslinking density> | | | | | | | | | | | | |
| ×10$^{19}$[/CC] | unmeasurable (dissolved) | 0.6 | 5.2 | 13.6 | unmeasurable (dissolved) | unmeasurable (dissolved) | 0.7 | 2.3 | unmeasurable (dissolved) | 0.4 | 3.5 | 9.1 |

Example 14

Crosslinked (Electron-Beam-Crosslinked) Shaped Article of Rubber Composition (X-1)

Thirty parts by mass of the ethylene-propylene-VNB copolymer (S-1) obtained in Preparation example 1, 70 parts by mass of styrene-butadiene rubber (SBR 1502), 5 parts by mass of zinc oxide (ZnO#1-zinc oxide of Second grade, manufactured by Hakusuitech Co., Ltd.) as a crosslinking aid, one part by mass of stearic acid (stearic acid, Tsubaki series, manufactured by NOF CORPOLATION) as a processing auxiliary agent, 40 parts by mass of carbon black (Asahi#60, manufactured by ASAHI CARBON CO., LTD.) were kneaded by a Bambury mixer, Model BB-2 (manufactured by KOBE STEEL, LTD.). In the kneading process, the copolymer (S-1) and the styrene-butadiene rubber were masticated for 0.5 minutes, and after adding the zinc oxide, the stearic acid, and the carbon black, they were kneaded for 2 more minutes. Then, a ram was raised to be cleaned, followed by kneading for one minute. Next, they were banded and kneaded on a roll of the 8 inch roll mill (manufactured by Nippon Roll MFG. Co., Ltd.) operating with a front roll at a surface temperature of 50° C. and a rotational rate of 16 rpm and a back roll at a surface temperature 50° C. and a rotational rate of 18 rpm.

In the kneading, the mixture was given three cuts right and left and rounded six times to provide a sheet-like rubber composition (X-1) of 2 mm in thickness. This was cut into a sample of rubber composition (X-1) measuring 200 mm×200 mm×2 mm.

The obtained sample of rubber composition (X-1) was crosslinked by irradiation with electron beam with a dose of 60 kGy. Physical properties after crosslinking are shown in Table 5.

Example 15

Crosslinked (Electron-Beam-Crosslinked) Shaped Article of Rubber Composition (X-2)

Rubber composition (X-2) and a sample thereof were prepared in the same manner as in Example 14 except that the blended amount of the ethylene-propylene-VNB copolymer (S-1) obtained in Preparation example 1 was changed to 50 parts by mass, and that of styrene-butadiene rubber (SBR 1502) to 50 parts by mass.

The obtained sample of rubber composition (X-2) was crosslinked by irradiation with electron beam with dose of 60 kGy. Physical properties after crosslinking are shown in Table 5.

Comparative Examples 8 to 12

Crosslinked (Electron-Beam-Crosslinked) Shaped Article of Rubber Composition

In Example 1, samples of rubber composition were produced in the same manner as in Example 14 except that the blended amount of resin components was as shown in Table 3. Physical properties after crosslinking are shown in Table 5.

TABLE 5

| | (peroxide-crosslinking) | | | | | | |
|---|---|---|---|---|---|---|---|
| | Example 14 | Example 15 | Comp. example 8 | Comp. example 9 | Comp. example 10 | Comp. example 11 | Comp. example 12 |
| <formulation of resin component> | | | | | | | |
| S-1 | 30 | 50 | | | | | |
| S'-1 | | | 0 | 30 | 50 | | |
| S'-2 | | | | | | 30 | 50 |
| SBR 1502 | 70 | 50 | 100 | 70 | 50 | 70 | 50 |
| <irradiation condition> | | | | | | | |
| scheduled surface dose (kGy) | 60 | 60 | 60 | 60 | 60 | 60 | 60 |
| <vulcanized rubber characteristics> | | | | | | | |
| hardness (Duro-A) | 67 | 68 | 64 | 66 | 68 | 66 | 67 |
| M100[MPa] | 2.56 | 3.01 | 2.22 | 2.54 | 3.13 | 2.67 | 3.45 |

TABLE 5-continued (peroxide-crosslinking)

|  | Example 14 | Example 15 | Comp. example 8 | Comp. example 9 | Comp. example 10 | Comp. example 11 | Comp. example 12 |
|---|---|---|---|---|---|---|---|
| M200[MPa] | 7.12 | 7.67 | 6.07 | 7.03 | 7.78 | 8.12 | 8.23 |
| M300[MPa] | 12.76 | 13.21 | 12.52 | 12.88 | 13.48 | 14.02 | 14.98 |
| TB[MPa] | 21.5 | 20.4 | 22.6 | 18.3 | 15.8 | 19.4 | 17.0 |
| EB[%] | 420 | 400 | 440 | 400 | 330 | 370 | 310 |
| <dynamic fatigue test> stroke 50% | | | | | | | |
| load at break [N] | 17.4 | 18.1 | 16.7 | 18.6 | 19.8 | 19.1 | 21.3 |
| number of cycle at break | 8760 | 6321 | 10460 | 1680 | 1060 | 1250 | 980 |
| stroke 100% | | | | | | | |
| load at break [N] | 32.8 | 33.8 | 31.4 | 37.3 | 39.7 | 38.7 | 41.3 |
| number of cycle at break | 430 | 340 | 530 | 110 | 65 | 75 | 50 |
| stroke 145% | | | | | | | |
| load at break [N] | 47.6 | 49.3 | 45.1 | 60.8 | 67.1 | 62.1 | 69.8 |
| number of cycle at break | 68 | 48 | 90 | 6 | 3 | 3 | 2 |

The above-described result shows that in Examples 14 and 15 containing the ethylene/α-olefin/non-conjugated polyene (S) specified in the present invention and diene rubber (styrene-butadiene rubber) (T), the rubber compositions were more suitably crosslinked by electron beam and kept excellent crosslinking characteristics possessed by diene rubber, and the crosslinked shaped articles had excellent mechanical properties, in comparison to Comparative examples 8 to 12 containing other ethylene/α-olefin/non-conjugated polyenes. Further, since the crosslinking shaped products of Examples 14 and 15 of the present application contained ethylene/α-olefin/non-conjugated polyene, they exhibited weatherability superior to styrene-butadiene rubber.

Example 16

Crosslinked (Peroxide-Crosslinked) Shaped Article of Rubber Composition (X-3)

Thirty parts by mass of the ethylene-propylene-VNB copolymer (S-1) obtained in Preparation example 1, 70 parts by mass of styrene-butadiene rubber (SBR 1502), 5 parts by mass of zinc oxide (ZnO#1.zinc oxide of Second grade, manufactured by Hakusuitech Co., Ltd.) as a crosslinking aid, one part by mass of stearic acid (stearic acid, Tsubaki series, manufactured by NOF CORPOLATION) as a processing auxiliary agent, 40 parts by mass of carbon black (Asahi#60, manufactured by ASAHI CARBON CO., LTD.) were kneaded by a Bambury mixer, Model BB-2 (manufactured by KOBE STEEL, LTD.) to provide a rubber blend. In the kneading process, the copolymer (S-1) and the styrene-butadiene rubber were masticated for 0.5 minutes, and after adding the zinc oxide, the stearic acid, and the carbon black, they were kneaded for 2 more minutes. Then, a ram was raised to be cleaned, followed kneading for one minute to obtain a rubber blend.

To the obtained rubber blend was added 3.4 parts by mass of a 40% dilution of dicumyl peroxide (PERCUMYL D-40, manufactured by NOF CORPOLATION) as an organic peroxide, and resultant mixture was banded and kneaded on a roll of the 8 inch roll mill (manufactured by Nippon Roll MFG. Co., Ltd.) operating with a front roll at a surface temperature of 50° C. and a rotational rate of 16 rpm and a back roll at a surface temperature 50° C. and a rotational rate of 18 rpm.

In the kneading, the mixture was given three cuts right and left and rounded six times to obtain a sheet-like rubber composition (X-3) of 2 mm in thickness. This was cut into a sample of rubber composition (X-3) measuring 200 mm×200 mm×2 mm.

The obtained sheet-like shape sample of rubber composition (X-3) was crosslinked by using a 100 t press-forming machine (KMF100-1E, manufactured by Koutaka Kougyo Shyo) at a metal mold temperature of 170° C. for 10 minutes. Physical properties after crosslinking are shown in Table 6.

Example 17

Crosslinked (Peroxide-Crosslinked) Shaped Article of Rubber Composition (X-4)

A sheet-like sample of rubber composition (X-4) was produced and crosslinked in the same manner as in Example 16 except that in Example 16, the blended amount of the ethylene-propylene-VNB copolymer (S-1) obtained in Preparation example 1 was changed to 50 parts by mass, and the blended amount of styrene-butadiene rubber (SBR 1502) to 50 parts by mass. Physical properties after crosslinking are shown in Table 6.

Comparative Examples 13 to 17

Crosslinked (Peroxide-Crosslinked) Shaped Article of Rubber Compositions

Samples of rubber composition were produced and crosslinked in the same manner as in Example 16 except that in Example 16, the amount of resin component was as shown in Table 6. Physical properties after crosslinking are shown in Table 6.

TABLE 6

(peroxide-crosslinking)

| | Example 16 | Example 17 | Comp. example 13 | Comp. example 14 | Comp. example 15 | Comp. example 16 | Comp. example 17 |
|---|---|---|---|---|---|---|---|
| <formulation of resin component> | | | | | | | |
| S-1 | 30 | 50 | | | | | |
| S'-1 | | | 0 | 30 | 50 | | |
| S'-2 | | | | | | 30 | 50 |
| SBR 1502 | 70 | 50 | 100 | 70 | 50 | 70 | 50 |
| <blending of peroxide> | | | | | | | |
| dicumyl peroxide | 3.4 | 3.4 | 3.4 | 3.4 | 3.4 | 3.4 | 3.4 |
| <vulcanized rubber characteristics> | | | | | | | |
| hardness (Duro-A) | 69 | 71 | 65 | 67 | 69 | 68 | 70 |
| M100[MPa] | 5.04 | 6.43 | 4.12 | 4.98 | 6.78 | 5.12 | 7.98 |
| M200[MPa] | 13.45 | 14.67 | 11.87 | 13.23 | 14.11 | 15.21 | — |
| M300[MPa] | — | — | 20.12 | — | — | — | — |
| TB[MPa] | 18.8 | 16.7 | 25.8 | 17.7 | 14.3 | 18.4 | 15.2 |
| EB[%] | 290 | 230 | 320 | 280 | 210 | 250 | 180 |
| <dynamic fatigue test> stroke 50% | | | | | | | |
| load at break [N] | 27.1 | 29.1 | 26.2 | 27.4 | 30.1 | 29.4 | 32.1 |
| number of cycle at break | 520 | 460 | 810 | 390 | 150 | 320 | 120 |
| stroke 100% | | | | | | | |
| load at break [N] | 41.8 | 46.1 | 41.2 | 43.2 | 51.2 | 45.1 | 54.1 |
| number of cycle at break | 40 | 28 | 45 | 25 | 10 | 17 | 7 |
| stroke 145% | | | | | | | |
| load at break [N] | 70.8 | 73.1 | 70.4 | 72.1 | 80.1 | 75.1 | 83.1 |
| number of cycle at break | 1 | 1 | 1 | 1 | 1 | 1 | 1 |

The above-described result shows that in Examples 16 and 17 containing the ethylene/α-olefin/non-conjugated polyene (S) specified in the present invention and diene rubber (styrene-butadiene rubber) (T), the rubber compositions exhibited good crosslinking properties, and crosslinked shaped product had excellent dynamic fatigue resistance mechanical properties, in comparison to Comparative examples 14 to 17 containing other ethylene/α-olefin/non-conjugated polyenes. Further, since the crosslinking shaped articles of Examples 16 and 17 contained ethylene/α-olefin/non-conjugated polyene, they exhibited weatherability superior to styrene-butadiene rubber.

Preparation Example 2

Production of Ethylene-Propylene-VNB Copolymer (A)

Into a continuous polymerizer of 1 L in volume made of SUS via a supply port thereof were continuously added dehydrated and purified hexane at a rate of 1.5 L/h, a hexane solution of triisobutylaluminum (5 mmol/L) at a rate of 0.1 L/h (0.5 mmol/h), a hexane solution (0.01 mmol/L) of di(p-chlorophenyl)methylene (cyclopentadienyl)(octamethyloctahydrodibenzofluorenyl)zirconium dichloride (E1 in Table 7) at a rate of 0.03 L/h (0.0003 mmol/h), and a toluene solution (0.025 mmol/L) of triphenylcarbenium tetrakis (pentafluorophenyl)borate (E3 in Table 7) at a rate of 0.06 L/h (0.0015 mmol/h). Simultaneously via another supply port of the polymerizer were added ethylene at a rate of 50 g/h, propylene at a rate of 38 g/h, 5-vinyl-2-norbornene (VNB) at a rate of 6.1 g/h, and hydrogen at a rate of 0.3 NL/h to fill the polymerizer with the liquid phase, and continuous polymerization was carried out under a condition of a polymerization temperature of 95° C., a total pressure of 3.6 MPaG, and a residence time of 30 min.

The polymerization solution containing the ethylene/propylene/VNB copolymer produced in the polymerizer was continuously exhausted via an outlet provided at the bottom of the polymerizer, and conducted to a connection pipe heated at its jacket portion by steam of 10 kg/cm$^2$ in order to keep constant the temperature of the polymerization solution, the polymerization solution being combined with methanol which was a catalyst-deactivating agent injected at a rate of 0.15 L/h via a supply port provided just before the connection pipe.

The polymerization solution in the connection pipe heated by the steam was continuously sent to a flash tub by controlling the opening of a pressure control valve provided at the end of the connection pipe so that the pressure in the polymerizer was kept to be constantly 3.6 MPaG. The pressure in the polymerizer was kept to be constantly 3.6 MPaG by the pressure control valve. Resultant ethylene-propylene-VNB copolymer (A-1) had 55.6% by weight of the structural unit derived from ethylene, 1.5% by weight of the structural unit derived from VNB, and intrinsic viscosity [η] of 2.0 dl/g. The physical properties are shown in Table 7.

Ethylene/Propylene/Non-Conjugated Polyene Copolymers (A-2 to A-4)

Ethylene/propylene/non-conjugated polyene copolymers (A-2 to A-4) used in the following Examples and Comparative examples were those which had characteristics shown in Table 7 below.

TABLE 7

| copolymer | A-1 | A-2 | A-3 | A-4 |
|---|---|---|---|---|
| polymerizing agent | E1/E3 | E6/E7/E8 | E5/E8 | E4/E3 |
| <physical property of copolymer> | | | | |
| [η] [dl/g] | 2.0 | 1.9 | 4.5 | 3.35 |
| ethylene content [wt %] | 55.6 | 58.6 | 57 | 67.2 |
| ENB content [wt %] | — | — | 7.3 | 4.7 |
| VNB content [wt %] | 1.5 | 1.5 | — | — |
| ML (1 + 4) 100° C. | 45 | 38 | — | — |
| ML (1 + 4) 125° C. | — | — | 74 | 51 |
| oil extension amount (phr) | — | — | 48 | 40 |

In Table 7, the abbreviations for catalyst mean the following compounds.

E1: di(p-chlorophenyl)methylene (cyclopentadienyl) (octamethyloctahydrodibenzofluorenyl) zirconium dichloride
E3: triphenylcarbenium tetrakis(pentafluorophenyl)borate
E5: ethoxyvanadium oxydichloride $VOCl_2(OC_2H_5)$
E6: vanadium oxytrichloride $VOCl_3$
E7: diethylaluminum chloride $Al(C_2H_5)_2Cl$
E8: ethylaluminum sesquichloride $Al_2(C_2H_5)_3Cl_3$ Example 18

In a first stage, 100 parts by weight of the ethylene-propylene-VNB copolymer (A-1) obtained from Preparation example 2 was kneaded for 30 seconds by using the Bambury mixer, Model BB-2 (manufactured by KOBE STEEL, LTD.), to which were subsequently added all of the remaining blending compositions in the first stage in Table 2, in other words, 5 parts by weight of a carbon black (MAF carbon black, Seast116 (manufactured by TOKAI CARBON CO., LTD.)), 45 parts by weight of a powdered silica (Ultrasil360, specific surface area of 50 m²/g, manufactured by Degussa-Huls AG), 1.5 parts by weight of a silane-coupling agent (γ-methacryloxypropyltrimethoxysilane, A174, manufactured by NUC Corporation), 4 parts by weight of an antioxidant (4,4-dicumyldiphenyleneamine, NOCRAC CD (manufactured by OUCHI SHINKO CHEMICAL INDUSTRIAL CO., LTD.)), and 55 parts by weight of a paraffin-based oil (Diana process PW-380 (Idemitsu Kosan Co., Ltd.)), and these compositions were kneaded for 2 minutes. Then, a ram was raised to be cleaned, and they were kneaded for one more minute and exhausted at about 165° C. to provide a blend of the first stage. This kneading was carried out at a filling rate of 75%.

Then in a second stage, the blend obtained in the first stage was banded on a roll of the 8 inch roll mill (manufactured by Nippon Roll MFG. Co., Ltd., operating with a front roll at a surface temperature of 50° C. and a rotational rate of 16 rpm and a back roll at a surface temperature of 50° C. and rotational rate of 18 rpm), and to the blend were added 2 parts by weight of a hydrosilyl-group (SiH group)-containing compound (compound represented by $(CH_3)_3SiO—(SiH(CH_3)—O—)_6—Si(CH_3)_2—O—Si(C_6H_6)_2—O—Si(CH_3)_3$, Shin-Etsu Chemical Co., Ltd.), and 0.4 parts by weight of a reaction control agent (3,5-dimethyl-1-hexyl-3-ol, Shin-Etsu Chemical Co., Ltd.), followed by kneading for 10 minutes, and then 0.2 parts by weight of a platinum-based catalyst (chloroplatinic acid+a complex of $[CH_2=CH(Me)SiO]_4$, Shin-Etsu Chemical Co., Ltd.) was added, followed by kneading for 5 more minutes, to provide an uncrosslinked rubber blend which was a kneaded material.

This kneaded material was sheeted into a sheet-like shape and pressed at 40° C. for 6 minutes by using a 50-ton press-forming machine to prepare an uncrosslinked rubber sheet of 2 mm in thickness. Then, the uncrosslinked rubber sheet was left in HAV (hot air vulcanization tub) in 200° C. atmosphere for 5 minutes to fabricate a crosslinked (hot-air-crosslinked) sheet without pressing. This was used for the scratch resistance test.

In addition, the above uncrosslinked rubber sheet was pressed at 160° C. for 10 minutes to prepare a vulcanized sheet of 2 mm in thickness. This was used for the tensile test, the hardness test, and the heat-aging-resistance test.

The above-mentioned uncrosslinked rubber blend which was a kneaded material was also shaped into a block by using a metal mold of 29 mm in diameter and 12.5 mm in height and was heated in the metal mold at 160° C. for 15 minutes to prepare a block-like crosslinked shaped article. This was used for the compression set (CS) measurement.

The result is shown in Table 8.

Examples 19 to 21 and Comparative Examples 18 to 20

Uncrosslinked rubber blends and uncrosslinked rubber sheets were fabricated in the same way as in Example 18 except that in Example 18 the kind and the quantity of each blend to be blended in the first stage and the second stage were as in Table 8.

Then by using the obtained uncrosslinked rubber sheets, crosslinked sheets were fabricated by hot-air-crosslinking in the same manner as in Example 18. These were used for the scratch resistance test.

The obtained uncrosslinked rubber sheets were also used to fabricate crosslinked sheets by press-crosslinking in the same manner as in Example 18 except that the fabrication was carried out at 160° C. for 10 minutes in Examples 19, 20, and Comparative example 18, as was the case with Example 18, and at 170° C. for 15 minutes in Example 21 and Comparative examples 19 and 20. These sheets were used for the tensile test, the hardness test, and the heat-aging-resistance test.

The above uncrosslinked rubber blends were also shaped into a block by using a metal mold of 29 mm in diameter and 12.5 mm in height and were heated in the metal mold at 160° C. for 15 minutes in Example 19 and 20, and 170° C. for 20 minutes in Example 21 and Comparative examples 19 and 20, to prepare block-like crosslinked articles. These were used for the compression set (CS) measurement.

The result is shown in Table 8.

TABLE 8

| | | | Example 18 | Example 19 | Example e20 | Comp. example 18 | Example 21 | Comp. example 19 | Comp. example 20 |
|---|---|---|---|---|---|---|---|---|---|
| Blended composition | First stage | copolymer A-1 | 100 | 100 | 100 | | 100 | | |
| | | copolymer A-2 | | | | 100 | | 100 | |
| | | copolymer A-3 | | | | | | | 150 |

TABLE 8-continued

|  |  |  | Example 18 | Example 19 | Example e20 | Comp. example 18 | Example 21 | Comp. example 19 | Comp. example 20 |
|---|---|---|---|---|---|---|---|---|---|
|  | zinc oxide | 1) |  |  |  |  | 5 | 5 | 5 |
|  | stearic acid |  |  |  |  |  | 1 | 1 | 1 |
|  | carbon black | 2) | 5 | 5 | 5 | 5 | 5 | 5 | 5 |
|  | powdered silica | 3) | 45 | 45 | 45 | 45 | 45 | 45 | 45 |
|  | silane coupling agent | 4) | 1.5 | 1.5 | 1.5 | 1.5 | 1.5 | 1.5 | 1.5 |
|  | antioxidant A | 5) |  |  |  |  | 4 | 4 | 4 |
|  | antioxidant B | 6) | 4 | 4 | 4 | 4 |  |  |  |
|  | antioxidant C | 7) | 2 | 2 | 2 | 2 | 2 | 2 | 2 |
|  | paraffin-based oil | 8) | 55 | 55 | 55 | 55 | 55 | 55 | 5 |
| Second | dicumyl peroxide | 9) |  |  |  |  | 5.1 | 5.1 | 5.1 |
| stage | ZMA | 10) |  |  |  |  | 2 | 2 | 2 |
|  | hydrosilyl group-containing compound | 11) | 2 | 2.5 | 3 | 3 |  |  |  |
|  | platinum-based catalyst | 12) | 0.2 | 0.2 | 0.2 | 0.2 |  |  |  |
|  | reaction inhibitor | 13) | 0.4 | 0.4 | 0.4 | 0.4 |  |  |  |
| <physical properties of crosslinked rubber> |  |  |  |  |  |  |  |  |  |
| M100[MPa] |  |  | 1.54 | 1.60 | 1.69 | 1.51 | 1.78 | 1.58 | 1.61 |
| M200[MPa] |  |  | 3.89 | 3.95 | 4.01 | 3.78 | 4.15 | 3.84 | 4.01 |
| M300[MPa] |  |  | 6.95 | 7.22 | 7.69 | 6.89 | 8.01 | 7.64 | 7.78 |
| TB[MPa] |  |  | 14.3 | 15.2 | 16.3 | 12.8 | 16.4 | 12.7 | 15.6 |
| EB[%] |  |  | 640 | 550 | 490 | 490 | 430 | 430 | 430 |
| HA[duro-A hardness] |  |  | 53 | 55 | 55 | 54 | 53 | 54 | 53 |
| <anti-heat-aging property> |  |  |  |  |  |  |  |  |  |
| $A_R (T_B)$ |  |  | 100 | 100 | 105 | 115 | 100 | 108 | 132 |
| $A_R (E_B)$ |  |  | 100 | 97 | 95 | 86 | 100 | 90 | 82 |
| <dynamical property> |  |  |  |  |  |  |  |  |  |
| 1 Hz-tanδ |  |  | 0.049 | 0.042 | 0.031 | 0.051 | 0.035 | 0.047 | 0.052 |
| 10 Hz-tanδ |  |  | 0.068 | 0.055 | 0.049 | 0.071 | 0.051 | 0.060 | 0.060 |
| <property of hot-air-crosslinked (HAV) rubber > |  |  |  |  |  |  |  |  |  |
| Scratch resistance |  |  | A | A | A | A | D | D | D |

1) hydrozincite: zinc oxide (manufactured by Hakusuitech Co., Ltd.)

2) MAF carbon black: SEAST 116 (manufactured by TOKAI CARBON CO., LTD.)

3) powdered silica: Ultrasil360, specific surface area 50 $m^2/g$ (manufactured by Degussa-Huls AG)

4) γ-methacryloxypropyltrimethoxysilane (manufactured by NUC Corporation: A174)

5) 2-mercaptobenzimidazole (manufactured by OUCHI SHINKO CHEMICAL INDUSTRIAL CO., LTD.: NOCRAC MB)

6) 4,4-dicumyldiphenyleneamine (manufactured by OUCHI SHINKO CHEMICAL INDUSTRIAL CO., LTD.: NOCRAC CD)

7) tetrakis-[methylene-3-(3',5'-di-t-butyl-4'-hydroxyphenyl)propionate]methane(manufactured by Ciba Specialty Chemicals Corporation: Irganox1010)

8) paraffin-based oil: Diana process PW-380 (manufactured by Idemitsu Kosan Co., Ltd.)

9) dicumyl peroxide: Kayacumyl D-40C (manufactured by Kayaku Akzo Corporation)

10) ZMA: zinc methacrylate (Kawaguchi Chemical Industry Co., LTD.)

11) manufactured by Shin-Etsu Chemical Co., Ltd.: X-93-1346 (($CH_3$)$_3$SiO—(SiH($CH_3$)—O—)$_6$—Si($CH_3$)$_2$—O—Si($C_6H_6$)$_2$—O—Si($CH_3$)$_3$)

12) manufactured by Shin-Etsu Chemical Co., Ltd.: X-93-1410 (chloroplatinic acid + complex of [$CH_2$=CH(Me)SiO]$_4$)

13) manufactured by Shin-Etsu Chemical Co., Ltd.: X-93-1036(3,5 dimethyl-1-hexyl-3-ol)

The result in Table 8 demonstrates that in Examples 18 to 21, crosslinked shaped articles well balanced between mechanical strength and anti-vibration properties were obtained. This result is attributed to the fact that in Examples 18 to 21 which use ethylene-propylene-VNB copolymer (A-1) satisfying all requirements specified in the invention as a copolymer component, the copolymer (A-1) had fewer long-chain branches than previously well-known ethylene/α-olefin/non-conjugated polyene copolymers, and resultant crosslinking shaped articles had a uniform crosslinking structure.

Examples 22 and Comparative Examples 21 and 22

Uncrosslinked rubber blends and uncrosslinked rubber sheets were fabricated in the same manner as in Example 18 except that in Example 18, the kind and quantity of each blend to be blended in the first stage and the second stage were as in Table 9.

Resultant uncrosslinked rubber sheets were used to fabricate crosslinked sheets by press-crosslinking in the same manner as in Example 18 except that the fabrication was carried out at 170° C. for 10 minutes. These were used for the tensile test, the hardness test, and the heat-aging-resistance test.

The kneaded materials were shaped into a block in a metal mold of 29 mm in diameter and 12.5 mm in height and were heated in the metal mold at 170° C. for 15 minutes to prepare block-like crosslinked shaped articles. These were used for the compression set (CS) measurement.

The result is shown in Table 9.

TABLE 9

|  |  |  | Example 22 | Comp. example 21 | Comp. example 22 |
|---|---|---|---|---|---|
| blended composition | first stage | copolymer A-1 | 100 |  |  |
|  |  | copolymer A-2 |  | 100 |  |
|  |  | copolymer A-4 |  |  | 140 |
|  |  | zinc oxide 1) | 5 | 5 | 5 |
|  |  | stearic acid | 1 | 1 | 1 |
|  |  | carbon black 2) | 5 | 5 | 5 |
|  |  | powdered wet silica 3') | 30 | 30 | 30 |
|  |  | silane coupling agent 4) | 1.5 | 1.5 | 1.5 |
|  |  | antioxidant A 5) | 2 | 2 | 2 |
|  |  | paraffin-based oil 8) | 50 | 50 | 10 |
|  | Second stage | dicumyl peroxide 9) | 6.8 | 6.8 | 6.8 |
|  |  | ZMA 10) | 2 | 2 | 2 |
|  |  | sulfur | 0.2 | 0.2 | 0.2 |
| <physical properties of crosslinked rubber> | | | | | |
| M100 [MPa] | | | 1.15 | 1.21 | 1.19 |
| M200 [MPa] | | | 2.08 | 2.24 | 2.11 |
| M300 [MPa] | | | 3.42 | 3.68 | 3.57 |
| TB [MPa] | | | 18.4 | 15.8 | 21.0 |
| EB [%] | | | 580 | 450 | 700 |
| HA [Duro-A hardness] | | | 51 | 51 | 51 |
| <compression set> | | | | | |
| 150° C. × 70 h [%] | | | 23 | 22 | 31 |
| <anti-heat-aging property> | | | | | |
| $A_R (T_B)$ | | | 100 | 110 | 122 |
| $A_R (E_B)$ | | | 100 | 85 | 80 |
| <dynamical property> | | | | | |
| 1 Hz-tanδ | | | 0.014 | 0.018 | 0.023 |
| 10 Hz-tanδ | | | 0.021 | 0.024 | 0.043 |

1) hydrozincite: zinc oxide (manufacture by Hakusuitech Co., Ltd.)
2) MAF carbon black: SEAST 116 (manufactured by TOKAI CARBON CO., LTD.)
3') wet silica: HiSil 233, ratio surface area 150 m²/g (manufactured by PPG INDUSTRIES)
4) γ-methacryloxypropyltrimethoxysilane (manufactured by NUC Corporation: A174)
5) 2-mercaptobenzimidazole (manufactured by OUCHI SHINKO CHEMICAL INDUSTRIAL CO., LTD.: NOCRAC MB)
8) paraffin-based oil: Diana process PW-380 ( Idemitsu Kosan Co., Ltd.)
9) dicumyl peroxide: Kayacumyl D-40C (manufactured by Kayaku Akzo Corporation)
10) ZMA: zinc methacrylate (Kawaguchi Chemical Industry Co., LTD.)

The result in Table 9 demonstrates that in Example 22, a crosslinked shaped article well balanced between anti-heat-aging property and anti-vibration properties was obtained. This result is attributed to the fact that in Example 22 which used ethylene-propylene-VNB copolymer (A-1) satisfying all requirements specified in the invention as a copolymer component, the copolymer (A-1) has fewer long-chain branches than previously well-known ethylene/α-olefin/non-conjugated polyene copolymers, and obtained crosslinking shaped article had a uniform crosslinking structure.

INDUSTRIAL AVAILABILITY

The ethylene/α-olefin/non-conjugated polyene copolymer of the invention and the rubber compositions using the copolymer can be suitably used in various rubber applications and crosslinked rubber applications, for example, rubber for tires, o-ring, roll for industrial use, packing (for example capacitor packing), gasket, belts (for example, heat insulating belt, copying machine belt, and conveyance belt), horses such as hose for cars (for example, water hose, brake reservoir hose, radiator hose, and air hose), anti-vibration rubber, vibration isolating materials or vibration controlling materials (for example, engine mount and motor mount), muffler hanger, sponges (for example, weatherstrip sponge, heat insulating sponge, protection sponge, microfoaming sponge), cables (ignition cable, cabtire cable, and high tension cable), materials for wire cover (material for high-voltage wire, material for low-voltage wire cover, material for wire cover for vessels), glass run channel, color skin material, paper-feeding roll, roofing sheet and so on.

The crosslinked shaped article according to the invention can be used, without any limitation, for various products having rubber properties, and since it is particularly excellent in weatherability, it can also be suitably used for applications used outdoors for long period of time, such as tires and material for wire cover. In particular, the crosslinked shaped article according to the invention can be suitably used for tire members composing at least part of various tires. Examples of the members include tire inner liner, tire inner tube, tire flap, tire shoulder, tire bead, tire tread, tire sidewall, and so on.

The resin composition of the invention can be suitably used for producing crosslinked shaped articles and anti-vibration rubber products. Examples of the crosslinked shaped articles and anti-vibration rubber products include, for example, anti-vibration rubber for cars, muffler hanger for cars, anti-vibration rubber for railroads, anti-vibration rubber for industrial machines, quake-absorbing rubber for construction, engine mount, packing, bush, pad, gasket, air suspension, ring mount, shock absorbing stopper, fender, flexible joint, dynamic damper, and so on.

The invention claimed is:

1. An ethylene/α-olefin/non-conjugated polyene copolymer comprising structural units derived from ethylene (A), an α-olefin (B) of 3 to 20 carbon atoms, and a non-conjugated polyene (C) containing intramolecularly two or more partial structures in total selected from the group consisting of structures represented by Formulae (I) and (II),

[Chem. 1]

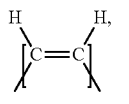
(I)

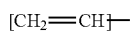
(II)

and satisfying the following requirements of from (i) to (v):

(i) a molar ratio of the ethylene/α-olefin is from 55/45 to 85/15;

(ii) a weight fraction of the structural unit derived from the non-conjugated polyene (C) is from 0.07% by weight to 10% by weight in 100% by weight of the ethylene/α-olefin/non-conjugated polyene copolymer;

(iii) a weight-average molecular weight (Mw) of the ethylene/α-olefin/non-conjugated polyene copolymer, the weight fraction of the structural unit derived from the non-conjugated polyene (C) (weight fraction of (C) (% by weight)), and a molecular weight of the non-conjugated polyene (C) (molecular weight of (C)) satisfy Formula (1), $4.5 \leq Mw \times$ weight fraction of $(C)/100/$molecular weight of $(C) \leq 40$      Formula (1);

(iv) a ratio of a complex viscosity $\eta^*_{(\omega=0.1)}$ (Pa·sec) at a frequency of $\omega=0.1$ rad/s to a complex viscosity $\eta^*_{(\omega=100)}$ (Pa·sec) at a frequency of $\omega=100$ rad/s, both obtained by linear viscoelastic (190° C.) rheometer, represented by $P(\eta^*_{(\omega=0.1)}/\eta^*_{(\omega=100)})$, an intrinsic viscosity represented by $[\eta]$, and the weight fraction of the structural unit derived from the non-conjugated polyene (C) (weight fraction of (C)) satisfy Formula (2), $P/([\eta]^{2.9}) \leq$ weight fraction of $(C) \times 6$      Formula (2); and (v) number of long-chain branches per 1000 carbon atoms represented by ($LCB_{1000C}$) and a natural logarithmic number of the weight-average molecular weight (Mw) represented by $[Ln(Mw)]$, obtained by using 3D-GPC, satisfy Formula (3), $LCB_{1000C} \leq 1-0.07 \times Ln(Mw)$      Formula (3)

and obtained by copolymerizing monomers in the presence of at least one kind of metallocene compound represented by Formula [A1],

[Chem. 2]

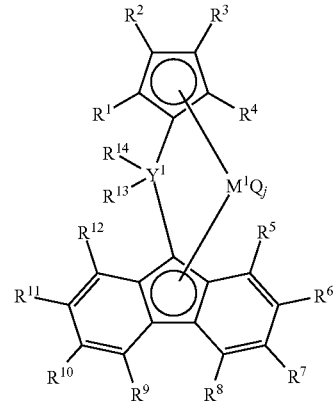
[A1]

[wherein $R^1$, $R^2$, $R^3$, $R^4$, $R^5$, $R^8$, $R^9$, and $R^{12}$ each independently represent a hydrogen atom, a hydrocarbon group, a silicon-containing group, or a heteroatom-containing group other than any silicon-containing group, and adjacent two groups among $R^1$ to $R^4$ may together form a ring;

$R^6$ and are the same atom or the same group selected from the group consisting of a hydrogen atom, a hydrocarbon group, a silicon-containing group, and a heteroatom-containing group other than any silicon-containing group, $R^7$ and $R^{10}$ are the same atom or the same group selected from the group consisting of a hydrogen atom, a hydrocarbon group, a silicon-containing group, and a heteroatom-containing group other than any silicon-containing group, $R^6$ and $R^7$ may together form a ring, and $R^{10}$ and $R^{11}$ may together form a ring, with the proviso that all of $R^6$, $R^7$, $R^{10}$, and $R^{11}$ are not a hydrogen atom simultaneously;

$R^{13}$ and $R^{14}$ each independently represent an aryl group;

$M^1$ represents a zirconium atom;

$Y^1$ represents a carbon atom or a silicon atom;

Q represents a halogen atom, a hydrocarbon group, a halogenated hydrocarbon group, a neutral conjugated or non-conjugated diene of 4 to 20 carbon atoms, or a neutral ligand coordinatable by an anionic ligand or a lone pair, and j represents an integer from 1 to 4, and when j is an integer from 2 or more, a plurality of Qs may be the same or different from each other].

2. A process for producing an ethylene/α-olefin/non-conjugated polyene copolymer comprising structural units derived from ethylene (A), an α-olefin (B) of 3 to 20 carbon atoms, and a non-conjugated polyene (C) containing intramolecularly two or more partial structures in total selected from the group consisting of structures represented by Formulae (I) and (II),

[Chem. 1]

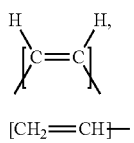
(I)

[CH$_2$=CH]— (II)

and satisfying the following requirements of from (i) to (v):

(i) a molar ratio of the ethylene/α-olefin is from 55/45 to 85/15;

(ii) a weight fraction of the structural unit derived from the non-conjugated polyene (C) is from 0.07% by weight to 10% by weight in 100% by weight of the ethylene/α-olefin/non-conjugated polyene copolymer;

(iii) a weight-average molecular weight (Mw) of the ethylene/α-olefin/non-conjugated polyene copolymer, the weight fraction of the structural unit derived from the non-conjugated polyene (C) (weight fraction of (C) (% by weight)), and a molecular weight of the non-conjugated polyene (C) (molecular weight of (C)) satisfy Formula (1), 4.5≤Mw×weight fraction of (C)/100/molecular weight of (C)≤40    Formula (1);

(iv) a ratio of a complex viscosity η*$_{(\omega=0.1)}$ (Pa·sec) at a frequency of ω=0.1 rad/s to a complex viscosity η*$_{(\omega=100)}$ (Pa·sec) at a frequency of ω=100 rad/s, both obtained by linear viscoelastic measurement (190° C.) by using a rheometer, represented by P(η*$_{(\omega=0.1)}$/η*$_{(\omega=100)}$), an intrinsic viscosity represented by [η], and the weight fraction of the structural unit derived from the non-conjugated polyene (C) (weight fraction of (C)) satisfy Formula (2), P/([η]$^{2.9}$)≤weight fraction of (C)×6    Formula (2); and (v) number of long-chain branches per 1000 carbon atoms represented by (LCB$_{1000C}$) and a natural logarithmic number of the weight-average molecular weight (Mw) represented by [Ln(Mw)], obtained by using 3D-GPC, satisfy Formula (3), LCB$_{1000C}$≤1−0.07×Ln(Mw)    Formula (3), the process comprising performing copolymerization in the presence of at least one kind of metallocene compound represented by Formula [A1] below to produce the ethylene/α-olefin/non-conjugated polyene copolymer,

[Chem. 3]

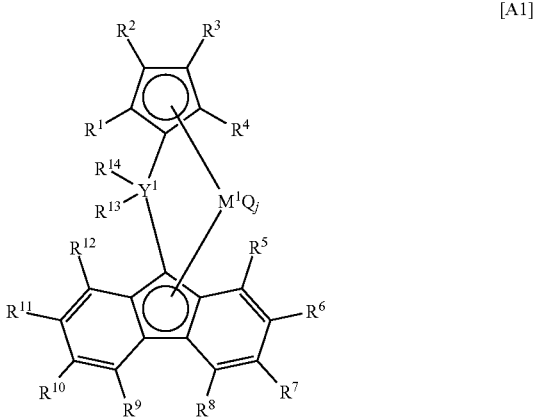
[A1]

[wherein R$^1$, R$^2$, R$^3$, R$^4$, R$^5$, R$^8$, R$^9$, and R$^{12}$ each independently represent a hydrogen atom, a hydrocarbon group, a silicon-containing group, or a heteroatom-containing group other than any silicon-containing group, and adjacent two groups among R$^1$ to R$^4$ may together form a ring;

R$^6$ and R$^{11}$ are the same atom or the same group selected from a hydrogen atom, a hydrocarbon group, a silicon-containing group, and a heteroatom-containing group other than any silicon-containing group, R$^7$ and R$^{10}$ are the same atom or the same group selected from hydrogen atom, a hydrocarbon group, a silicon-containing group, and a heteroatom-containing group other than any silicon-containing group, R$^6$ and R$^7$ may together form a ring, and R$^{10}$ and may together form a ring, with the proviso that all of R$^6$, R$^7$, R$^{10}$, and R$^{11}$ are not a hydrogen atom simultaneously;

R$^{13}$ and R$^{14}$ each independently represent an aryl group;

M$^1$ represents a zirconium atom;

Y$^1$ represents a carbon atom or a silicon atom;

Q represents a halogen atom, a hydrocarbon group, a halogenated hydrocarbon group, a neutral conjugated or non-conjugated diene of 4 to 20 carbon atoms, or a neutral ligand coordinatable by an anionic ligand or a lone pair, and j represents an integer from 1 to 4, and when j is an integer of 2 or more, a plurality of Qs may be the same or different from each other].

3. The process for producing the ethylene/α-olefin/non-conjugated polyene copolymer according to claim 2, wherein the process comprises continuously feeding to a reactor and copolymerizing ethylene (A), an α-olefin (B) of 3 to 20 carbon atoms, a non-conjugated polyene (C) containing intramolecularly two or more partial structures in total selected from the group consisting of structures represented by Formulae (I) and (II), and as necessary, a non-conjugated polyene (D) containing intramolecularly only one structure selected from the group consisting of structures represented by Formulae (I) and (II)

[Chem. 4]

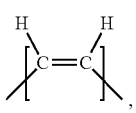
(I)

-continued

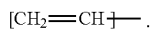  (II)

4. A thermoplastic resin composition comprising an ethylene/α-olefin/non-conjugated polyene copolymer comprising structural units derived from ethylene (A), an α-olefin (B) of 3 to 20 carbon atoms, and a non-conjugated polyene (C) containing intramolecularly two or more partial structures in total selected from the group consisting of structures represented by Formulae (I) and (II),

[Chem. 1]

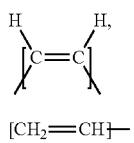  (I)

  (II)

and satisfying the following requirements of from (i) to (v):

(i) a molar ratio of the ethylene/α-olefin is from 55/45 to 85/15;
(ii) a weight fraction of the structural unit derived from the non-conjugated polyene (C) is from 0.07% by weight to 10% by weight in 100% by weight of the ethylene/α-olefin/non-conjugated polyene copolymer;
(iii) a weight-average molecular weight (Mw) of the ethylene/α-olefin/non-conjugated polyene copolymer, the weight fraction of the structural unit derived from the non-conjugated polyene (C) (weight fraction of (C) (% by weight)), and a molecular weight of the non-conjugated polyene (C) (molecular weight of (C)) satisfy Formula (1), 4.5≤Mw×weight fraction of (C)/100/molecular
        weight of (C)≤40          Formula (1);

(iv) a ratio of a complex viscosity $\eta^*_{(\omega=0.1)}$ (Pa·sec) at a frequency of ω=0.1 rad/s to a complex viscosity $\eta^*_{(\omega=100)}$ (Pa·sec) at a frequency of ω=100 rad/s, both obtained by linear viscoelastic measurement (190° C.) by using a rheometer, represented by $P(\eta^*_{(\omega=0.1)}/\eta^*_{(\omega=100)})$, an intrinsic viscosity represented by [η], and the weight fraction of the structural unit derived from the non-conjugated polyene (C) (weight fraction of (C)) satisfy Formula (2), $P/([\eta]^{2.9})$≤weight fraction of (C)×6     Formula (2); and (v) number of long-chain branches per 1000 carbon atoms represented by ($LCB_{1000C}$) and a natural logarithmic number of the weight-average molecular weight (Mw) represented by [Ln(Mw)], obtained by using 3D-GPC, satisfy Formula (3), $LCB_{1000C}$≤1−0.07×Ln(Mw)        Formula (3), and an organic peroxide,
wherein the content (mol) of the organic peroxide satisfies Formula (7), content (mol) of organic peroxide×number of oxygen-oxygen bonds per molecule in organic peroxide≤weight fraction of (C)/molecular weight of (C)×100      Formula (7)

(wherein a weight fraction of (C) represents the weight fraction (% by weight) of the structural unit derived from the non-conjugated polyene (C) in the ethylene/α-olefin/non-conjugated polyene copolymer, and the molecular weight of (C) represents a molecular weight of the non-conjugated polyene (C)).

5. A crosslinked shaped article obtained by crosslinking a rubber composition (X) comprising an ethylene/α-olefin/non-conjugated polyene copolymer (S) comprising structural units derived from ethylene (A), an α-olefin (B) of 3 to 20 carbon atoms, and a non-conjugated polyene (C) containing intramolecularly two or more partial structures in total selected from the group consisting of structures represented by Formulae (I) and (II),

[Chem. 1]

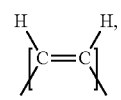  (I)

  (II)

and satisfying the following requirements of from (i) to (v):

(i) a molar ratio of the ethylene/α-olefin is from 55/45 to 85/15;
(ii) a weight fraction of the structural unit derived from the non-conjugated polyene (C) is from 0.07% by weight to 10% by weight in 100% by weight of the ethylene/α-olefin/non-conjugated polyene copolymer;
(iii) a weight-average molecular weight (Mw) of the ethylene/α-olefin/non-conjugated polyene copolymer, the weight fraction of the structural unit derived from the non-conjugated polyene (C) (weight fraction of (C) (% by weight)), and a molecular weight of the non-conjugated polyene (C) (molecular weight of (C)) satisfy Formula (1), 4.5≤Mw×weight fraction of (C)/100/molecular
        weight of (C)≤40          Formula (1);

(iv) a ratio of a complex viscosity $\eta^*_{(\omega=0.1)}$ (Pa·sec) at a frequency of ω=0.1 rad/s to a complex viscosity $\eta^*_{(\omega=100)}$ (Pa·sec) at a frequency of ω=100 rad/s, both obtained by linear viscoelastic measurement (190° C.) by using a rheometer, represented by $P(\eta^*_{(\omega=0.1)}/\eta^*_{(\omega=100)})$, an intrinsic viscosity represented by [η], and the weight fraction of the structural unit derived from the non-conjugated polyene (C) (weight fraction of (C)) satisfy Formula (2), $P/([\eta]^{2.9})$≤weight fraction of (C)×6     Formula (2); and (v) number of long-chain branches per 1000 carbon atoms represented by ($LCB_{1000C}$) and a natural logarithmic number of the weight-average molecular weight (Mw) represented by [Ln(Mw)], obtained by using 3D-GPC, satisfy Formula (3), $LCB_{1000C}$≤1−0.07×Ln(Mw)        Formula (3), and a rubber component (T) selected from the group consisting of diene rubber, butyl rubber, and halogenated butyl rubber, in a mass ratio of (S)/(T)=5/95-50/50.

6. The crosslinked shaped article according to claim 5 obtained by crosslinking the rubber compositions (X) by irradiation with electron beam.

7. The crosslinked shaped article according to claim 5, wherein the conjugated polyene (C) comprises 5-vinyl-2-norbornene (VNB).

8. The crosslinked shaped article according to claim 5, wherein the rubber component (T) comprises one or more kinds selected from the group consisting of natural rubber, isoprene rubber, styrene-butadiene copolymer rubber, butadiene rubber, butyl rubber, and halogenated butyl rubber.

9. The crosslinked shaped article according to claim 5, wherein the rubber component (T) comprises styrene-butadiene copolymer rubber.

10. A process for producing a crosslinked shaped article comprising the step of crosslinking a rubber composition (X) comprising an ethylene/α-olefin/non-conjugated polyene copolymer (S) comprising structural units derived from ethylene (A), an α-olefin (B) of 3 to 20 carbon atoms, and a non-conjugated polyene (C) containing intramolecularly two or more partial structures in total selected from the group consisting of structures represented by Formulae (I) and (II),

[Chem. 1]

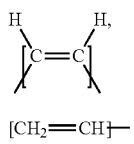
(I)

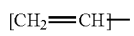
(II)

and satisfying the following requirements of from (i) to (v):

(i) a molar ratio of the ethylene/α-olefin is from 55/45 to 85/15;

(ii) a weight fraction of the structural unit derived from the non-conjugated polyene (C) is from 0.07% by weight to 10% by weight in 100% by weight of the ethylene/α-olefin/non-conjugated polyene copolymer;

(iii) a weight-average molecular weight (Mw) of the ethylene/α-olefin/non-conjugated polyene copolymer, the weight fraction of the structural unit derived from the non-conjugated polyene (C) (weight fraction of (C) (% by weight)), and a molecular weight of the non-conjugated polyene (C) (molecular weight of (C)) satisfy Formula (1), $$4.5 \leq Mw \times \text{weight fraction of } (C)/100/\text{molecular weight of } (C) \leq 40 \quad \text{Formula (1);}$$

(iv) a ratio of a complex viscosity $\eta^*_{(\omega=0.1)}$ (Pa·sec) at a frequency of ω=0.1 rad/s to a complex viscosity $\eta^*_{(\omega=100)}$ (Pa·sec) at a frequency of ω=100 rad/s, both obtained by linear viscoelastic measurement (190° C.) by using a rheometer, represented by P($\eta^*_{(\omega=0.1)}$/$\eta^*_{(\omega=100)}$), an intrinsic viscosity represented by [η], and the weight fraction of the structural unit derived from the non-conjugated polyene (C) (weight fraction of (C)) satisfy Formula (2), $$P/[\eta]^{2.9} \leq \text{weight fraction of } (C) \times 6 \quad \text{Formula (2); and}$$

(v) number of long-chain branches per 1000 carbon atoms represented by ($LCB_{1000C}$) and a natural logarithmic number of the weight-average molecular weight (Mw) represented by [Ln(Mw)], obtained by using 3D-GPC, satisfy Formula (3), $$LCB_{1000C} \leq 1 - 0.07 \times Ln(Mw) \quad \text{Formula (3),}$$

and a rubber component (T) selected from the group consisting of diene rubber, butyl rubber, and halogenated butyl rubber, in a mass ratio of (S)/(T)=5/95-50/50.

11. The process for producing a crosslinked shaped article according to claim 10, wherein the crosslinking step is performed by irradiation with electron beam.

12. A tire member using the crosslinked shaped article according to claim 5.

13. A tire tread using the crosslinked shaped article according to claim 5.

14. A tire sidewall using the crosslinked shaped article according to claim 5.

15. A tire comprising one or more kinds of tire members selected from the group consisting of a tire inner liner, a tire inner tube, a tire flap, a tire shoulder, a tire bead, a tire tread, and a tire sidewall, the members being composed of the crosslinked shaped article according to claim 5.

16. A resin composition comprising:

(S) 100 parts by weight of an ethylene/α-olefin/non-conjugated polyene copolymer comprising structural units derived from ethylene (A), an α-olefin (B) of 3 to 20 carbon atoms, and a non-conjugated polyene (C) containing intramolecularly two or more partial structures in total selected from the group consisting of structures represented by Formulae (I) and (II),

[Chem. 1]

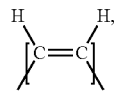
(I)

(II)

and satisfying the following requirements of from (i) to (v):

(i) a molar ratio of the ethylene/α-olefin is from 55/45 to 85/15;

(ii) a weight fraction of the structural unit derived from the non-conjugated polyene (C) is from 0.07% by weight to 10% by weight in 100% by weight of the ethylene/α-olefin/non-conjugated polyene copolymer;

(iii) a weight-average molecular weight (Mw) of the ethylene/α-olefin/non-conjugated polyene copolymer, the weight fraction of the structural unit derived from the non-conjugated polyene (C) (weight fraction of (C) (% by weight)), and a molecular weight of the non-conjugated polyene (C) (molecular weight of (C)) satisfy Formula (1), $$4.5 \leq Mw \times \text{weight fraction of } (C)/100/\text{molecular weight of } (C) \leq 40 \quad \text{Formula (1);}$$

(iv) a ratio of a complex viscosity $\eta^*_{(\omega=0.1)}$ (Pa·sec) at a frequency of ω=0.1 rad/s to a complex viscosity $\eta^*_{(\omega=100)}$ (Pa·sec) at a frequency of ω=100 rad/s, both obtained by linear viscoelastic measurement (190° C.) by using a rheometer, represented by P($\eta^*_{(\omega=0.1)}$/$\eta^*_{(\omega=100)}$), an intrinsic viscosity represented by [η], and the weight fraction of the structural unit derived from the non-conjugated polyene (C) (weight fraction of (C)) satisfy Formula (2), $$P/[\eta]^{2.9} \leq \text{weight fraction of } (C) \times 6 \quad \text{Formula (2); and}$$

(v) number of long-chain branches per 1000 carbon atoms represented by ($LCB_{1000C}$) and a natural logarithmic number of the weight-average molecular weight (Mw) represented by [Ln(Mw)], obtained by using 3D-GPC, satisfy Formula (3), $$LCB_{1000C} \leq 1 - 0.07 \times Ln(Mw) \quad \text{Formula (3)},$$

(E) 5-90 parts by weight of a powdered silica and/or a powdered silicate salt having a specific surface area within the range of 5-500 $m^2/g$;

and, as crosslinking agents, (G) 0.1-15 parts by weight of an organic peroxide; and/or (H) 0.1-100 parts by weight of a SiH group-containing compound comprising at least two SiH groups per molecule.

17. The resin composition according to claim 16, wherein the ethylene/α-olefin/non-conjugated polyene copolymer (S) has an intrinsic viscosity [η] of 1.0-4.0 dl/g measured in decalin at 135° C.

18. The resin composition according to claim 16, comprising (F) 0.1-20 parts by weight of an metal α,β-unsaturated carboxylate with respect to 100 parts by weight of the ethylene/α-olefin/non-conjugated polyene copolymer (S).

19. The resin composition according to claim 18, wherein the metal α,β-unsaturated carboxylate (F) comprises at least one kind selected from the group consisting of metal methacrylate and metal maleate.

20. The resin composition according to claim 16, comprising (J) a compound comprising at least one unsaturated hydrocarbon group and at least one hydrolysable silyl group, in an amount of less than $8 \times 10^{-6}$ mol per 1 $m^2$ of the surface area of the powdered silica and/or powdered silicate salt (E) having a specific surface area within the range of 5-500 $m^2/g$.

21. A crosslinked shaped article made of the resin composition according to claim 16.

22. An anti-vibration rubber product obtained by crosslinking the resin composition according to claim 16.

23. An anti-vibration rubber product according to claim 22 which is an anti-vibration rubber for an automobile use.

24. An anti-vibration rubber product according to claim 22 which is a muffler hanger for an automobile use.

25. An anti-vibration rubber product according to claim 22 which is an anti-vibration rubber for a railroad use.

26. An anti-vibration rubber product according to claim 22 which is an anti-vibration rubber for a use in an industrial machine.

27. An anti-vibration rubber product according to claim 22 which is a quake-absorbing rubber for construction.

* * * * *